US012713299B2

(12) United States Patent
Pathania et al.

(10) Patent No.: US 12,713,299 B2
(45) Date of Patent: Aug. 18, 2026

(54) ADAPTIVE SPECTRUM CONTROL

(71) Applicant: DISH Wireless L.L.C., Littleton, CO (US)

(72) Inventors: Amit Pathania, Great Falls, VA (US); Dhaval Mehta, Aldie, VA (US)

(73) Assignee: DISH Wireless L.L.C., Littleton, CO (US)

( * ) Notice: Subject to any disclaimer, the term of this patent is extended or adjusted under 35 U.S.C. 154(b) by 306 days.

(21) Appl. No.: 18/523,532

(22) Filed: Nov. 29, 2023

(65) Prior Publication Data

US 2025/0119887 A1 Apr. 10, 2025

Related U.S. Application Data

(60) Provisional application No. 63/588,968, filed on Oct. 9, 2023, provisional application No. 63/588,941, filed (Continued)

(51) Int. Cl.

*H04W 28/24* (2009.01)
*H04L 43/0894* (2022.01)
*H04W 16/10* (2009.01)
*H04W 28/08* (2023.01)

(Continued)

(52) U.S. Cl.

CPC ......... *H04W 28/24* (2013.01); *H04L 43/0894* (2013.01); *H04W 16/10* (2013.01);

(Continued)

(58) Field of Classification Search

CPC . H04W 28/24; H04W 16/10; H04W 28/0967; H04W 48/18; H04W 72/02;

(Continued)

(56) References Cited

U.S. PATENT DOCUMENTS 9,026,079 B2 5/2015 Raleigh et al.
10,772,101 B2 9/2020 Rong et al.

(Continued)

FOREIGN PATENT DOCUMENTS

EP 3648521 B1 4/2022
KR 20220015954 A 2/2022

(Continued)

OTHER PUBLICATIONS

Kulmar, et al., "Heuristic Radio Access Network Subslicing With User Clustering and Bandwidth Subpartitioning", Sensors, vol. 23, No. 4613, May 10, 2023, 25 pages.

*Primary Examiner* — Asad M Nawaz
*Assistant Examiner* — Najeeb Ansari
(74) *Attorney, Agent, or Firm* — Kilpatrick Townsend & Stockton LLP

(57) ABSTRACT

Methods and systems for network slice management and adaptive bandwidth allocation are provided. An example method includes assigning a first radio frequency band to multiple RAN slices of a network. Each one of the RAN slices is assigned to a network consumer, the first band includes a first BWS and a second BWS, the first BWS is configured to be allocatable to each one of the RAN slices, and the second BWS is configured to be allocatable to qualified RAN slices. The method further includes allocating a first allotment belonging to the first BWS to the identified RAN slice, monitoring continuously real-time bandwidth usage of the first BWS by the identified RAN slice, and determining whether the first allotment allocated to the identified RAN slice is sufficient to achieve predetermined QoS attributes of the identified RAN slice.

14 Claims, 30 Drawing Sheets

Related U.S. Application Data on Oct. 9, 2023, provisional application No. 63/588,954, filed on Oct. 9, 2023, provisional application No. 63/588,962, filed on Oct. 9, 2023.

(51) Int. Cl.

| | |
|---|---|
| ***H04W 48/18*** | (2009.01) |
| ***H04W 72/02*** | (2009.01) |
| ***H04W 72/0453*** | (2023.01) |
| ***H04W 72/543*** | (2023.01) |
| ***H04W 72/563*** | (2023.01) |

(52) U.S. Cl.

CPC ....... *H04W 28/0967* (2020.05); *H04W 48/18* (2013.01); *H04W 72/02* (2013.01); *H04W 72/0453* (2013.01); *H04W 72/543* (2023.01); *H04W 72/563* (2023.01)

(58) Field of Classification Search

CPC ........... H04W 72/0453; H04W 72/543; H04W 72/563; H04W 24/02; H04W 28/0268; H04L 43/0894; H04L 41/40; H04L 41/0896

See application file for complete search history.

(56) References Cited

U.S. PATENT DOCUMENTS

| | | | | |
|---|---|---|---|---|
| 11,115,292 | B2 | 9/2021 | Kidd et al. | |
| 11,540,298 | B2 | 12/2022 | Kotaru et al. | |
| 11,563,652 | B2 | 1/2023 | Seetharaman et al. | |
| 11,570,066 | B1 | 1/2023 | Viswambharan et al. | |
| 11,770,821 | B2 | 9/2023 | Li et al. | |
| 11,805,015 | B2 | 10/2023 | Sridhar et al. | |
| 2010/0280934 | A1 | 11/2010 | Kerr et al. | |
| 2018/0317133 | A1 | 11/2018 | Sciancalepore et al. | |
| 2019/0289534 | A1 | 9/2019 | Ryoo et al. | |
| 2020/0170052 | A1* | 5/2020 | Yang | H04W 28/26 |
| 2021/0067421 | A1 | 3/2021 | Kidd et al. | |
| 2021/0274508 | A1 | 9/2021 | Tanaka | |
| 2022/0124486 | A1* | 4/2022 | Andrews | H04W 12/71 |
| 2022/0200924 | A1 | 6/2022 | Lu et al. | |
| 2022/0303884 | A1 | 9/2022 | Chen et al. | |
| 2023/0052699 | A1 | 2/2023 | Ninglekhu et al. | |
| 2023/0059974 | A1 | 2/2023 | Turk et al. | |
| 2023/0189131 | A1 | 6/2023 | Huang et al. | |
| 2023/0209437 | A1 | 6/2023 | Mody et al. | |
| 2023/0239778 | A1 | 7/2023 | Doostnejad | |
| 2023/0269136 | A1 | 8/2023 | Gupta et al. | |
| 2024/0121199 | A1 | 4/2024 | Krishan | |
| 2024/0414594 | A1* | 12/2024 | Venkob | H04W 72/53 |
| 2025/0081028 | A1 | 3/2025 | Huang et al. | |
| 2025/0106881 | A1* | 3/2025 | Panchal | H04W 72/543 |

FOREIGN PATENT DOCUMENTS

| | | | |
|---|---|---|---|
| WO | 2021234673 | A1 | 11/2021 |
| WO | 2022125879 | A1 | 6/2022 |
| WO | 2023283102 | A1 | 1/2023 |
| WO | 2024219766 | A1 | 10/2024 |

* cited by examiner

400D

| | Consumer Priority Indicator | RAN Slice ID | QoS Priority Indicator | QoS Requirement (e.g., Maximum Throughput Requirement) | Coverage Requirement |
|---|---|---|---|---|---|
| Network Consumer 1 | Normal | 1 | Band 1: Common<br>Band 2: Common | No guarantee | Normal Outdoor |
| Network Consumer 2 | Privileged | 2 | Band 1: Common + Preferred<br>Band 2: Common + Preferred | Guaranteed during load (e.g., 5 Mbps) | Normal Outdoor |
| Network Consumer 3 | Premium | 3 | Band 1: Common + Preferred + Reserved<br>Band 2: Common<br>Band 3: Common + Reserved | Guaranteed at all times (e.g., 10 Mbps) | Extended Outdoor and Indoor |

| | Network Consumer | Assigned Band | Assigned BWS with QoS Priority Indicator | QoS Requirement (e.g., Maximum Throughput Requirement) | Coverage Requirement |
|---|---|---|---|---|---|
| RAN slice 1 | 1 | 1 | BWS 1 (Common) | No guarantee | Normal Outdoor |
| RAN slice 2 | 2 | 1 | BWS 1 (Common) + BWS 2 (Preferred) | Guaranteed during load (e.g., 5 Mbps) | Normal Outdoor |
| RAN slice 3 | 3 | 1 | BWS 1 (Common) + BWS 2 (Preferred) + BWS 3 (Reserved) | Guaranteed at all times (e.g., 10 Mbps) | Extended Outdoor and Indoor |

| | RAN Slice ID | Time Slot 1 (e.g., 12 am to 8 am) | Time Slot 2 (e.g., 8 am to 5 pm) | Time Slot 3 (e.g., 5 pm to 12 am) |
|---|---|---|---|---|
| Network Consumer 1 | 1 | Normal 402-1 | Normal 402-1 | Normal 402-1 |
| Network Consumer 2 | 2 | Privileged 402-2 | Normal 402-1 | Normal 402-1 |
| Network Consumer 3 | 3 | Normal 402-1 | Premium 402-3 | Privileged 402-2 |
| | 4 | Privileged 402-2 | Normal 402-1 | Normal 402-1 |

| | Network Consumer ID | Band 1 QoS Priority Indicators | | | Band 2 QoS Priority Indicators | | | Band 3 QoS Priority Indicators | | |
|---|---|---|---|---|---|---|---|---|---|---|
| | | Common | Preferred | Reserved | Common | Preferred | Reserved | Common | Preferred | Reserved |
| RAN Slice 1 | 1 | All Times | - | - | All Times | - | - | - | - | - |
| RAN Slice 2 | 2 | All Times | Time Slot 2 | - | All Times | Time Slot 2 | - | - | - | - |
| RAN Slice 3 | 3 | All Times | Time Slot 1 | - | All Times | - | Time Slot 1 | All Times | All Times | Time Slot 2 |

FIG. 6B

LAN 170

UE Class 1 (Content Type 1)
UE 101
UE 101
UE 101
...

UE Class 2 (Content Type2)
UE 101
UE 101
UE 101
...

UE Class 3 (Service Type 1)
UE 101
UE 101
UE 101
...

UE Class 4 (Service Type 2)
UE 101
UE 101
UE 101
...

...

722-1
722-2
722-3
722-4

RAN Slice 154

Slice-Specific Resource Allocation System 701

RAN Sub-Slice 721-1
Band 1 (common)

RAN Sub-Slice 721-2
Band 1 (preferred)

RAN Sub-Slice 721-3
Band 2 (common)

RAN Sub-Slice 721-4
Band 3 (preferred + reserved)

...

ADAPTIVE SPECTRUM CONTROL

CROSS REFERENCE TO RELATED APPLICATIONS

This application claims priority to U.S. Provisional Patent Application Nos. 63/588,941, 63/588,954, 63/588,962, and 63/588,968 filed on Oct. 9, 2023, the disclosures of which are incorporated by reference in their entirety for all purposes.

BACKGROUND

Network slicing is important in modern telecommunication networks. In an increasingly diverse, complex, and dynamic environment, network slicing is often used to allocate resources for provisioning network services to various network consumers. Network slicing typically involves the creation of multiple virtualized network slices within a single physical network infrastructure to allow for the isolation and customization of services to meet various consumer needs. Each network slice can operate as an independent, virtual network, tailored to the demands of different applications, user groups, or service types.

Currently, most resource allocation methods in network slicing involve manually configuring network slice and network operational parameters as well as provisioning resources and services for each network slice based on predetermined static allocation plans. These methods are typically set up during the initial deployment of the network and remain relatively fixed, which lacks the ability to adapt to changing demands and varying service requirements. For example, each network slice is assigned a fixed amount of bandwidth that remains constant regardless of the actual traffic demands. This rigid allocation can result in underutilized resources during periods of low traffic and potential congestion during peak usage. As another example, network functions and service chains for each network slice may be preconfigured and follow a fixed plan. These static service plans may not be optimized for the specific Quality of Service (QoS) requirements, varied individual applications, or different user groups, which compromises the overall efficiency of network performance and consumer satisfaction.

SUMMARY

In accordance with some embodiments of the present disclosure, a method is provided. In one example, the method includes assigning a first radio frequency band to a plurality of radio access network (RAN) slices of a network. Each one of the RAN slices is assigned to a network consumer, the first band comprises a first bandwidth segment (BWS) and a second BWS, the first BWS is configured to be allocatable to each one of the plurality of RAN slices, and the second BWS is configured to be allocatable to qualified RAN slices of the plurality of RAN slices. The method further includes allocating a first allotment to the identified RAN slice, in response to a request for bandwidth from an identified RAN slice of the plurality of RAN slices. The first allotment belongs to the first BWS. The method further includes monitoring, continuously, real-time bandwidth usage of the first BWS by the identified RAN slice and determining whether the first allotment allocated to the identified RAN slice is sufficient to achieve predetermined Quality of Service (QoS) attributes of the identified RAN slice.

In accordance with some embodiments of the present disclosure, a network slice management system is provided. In one example, the network slice management system includes one or more processors and a computer-readable storage media storing computer-executable instructions. The computer-executable instructions, when executed by the one or more processors, cause the network slice management system to assign a first radio frequency band to a plurality of RAN slices of the network. Each one of the RAN slices is assigned to a network consumer, the first band comprises a first BWS and a second BWS, the first BWS is configured to be allocatable to each one of the plurality of RAN slices, and the second BWS is configured to be allocatable to qualified RAN slices of the plurality of RAN slices. The instructions when executed by the one or more processors further cause the network slice management system to allocate a first allotment belonging to the first BWS to the identified RAN slice, in response to a request for bandwidth from an identified RAN slice of the plurality of RAN slices, monitor continuously real-time bandwidth usage of the first BWS by the identified RAN slice, and determine whether the first allotment allocated to the identified RAN slice is sufficient to achieve predetermined QoS attributes of the identified RAN slice.

In accordance with some embodiments, the present disclosure also provides a non-transitory machine-readable storage medium encoded with instructions, the instructions executable to cause one or more electronic processors of a system to perform any one of the methods described in the present disclosure.

BRIEF DESCRIPTION OF THE DRAWINGS

A further understanding of the nature and advantages of various embodiments may be realized by reference to the following figures. In the appended figures, similar components or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

FIG. 4D illustrates an example of a classification/assignment/allocation profile according to various embodiments.

FIG. 5B illustrates an example of a classification/assignment/allocation profile according to various embodiments.

FIG. 6A illustrates another example of a classification/assignment/allocation profile according to various embodiments.

FIG. 6B illustrates another example of classification/assignment/allocation profile according to various embodiments.

DETAILED DESCRIPTION

Figure 1:
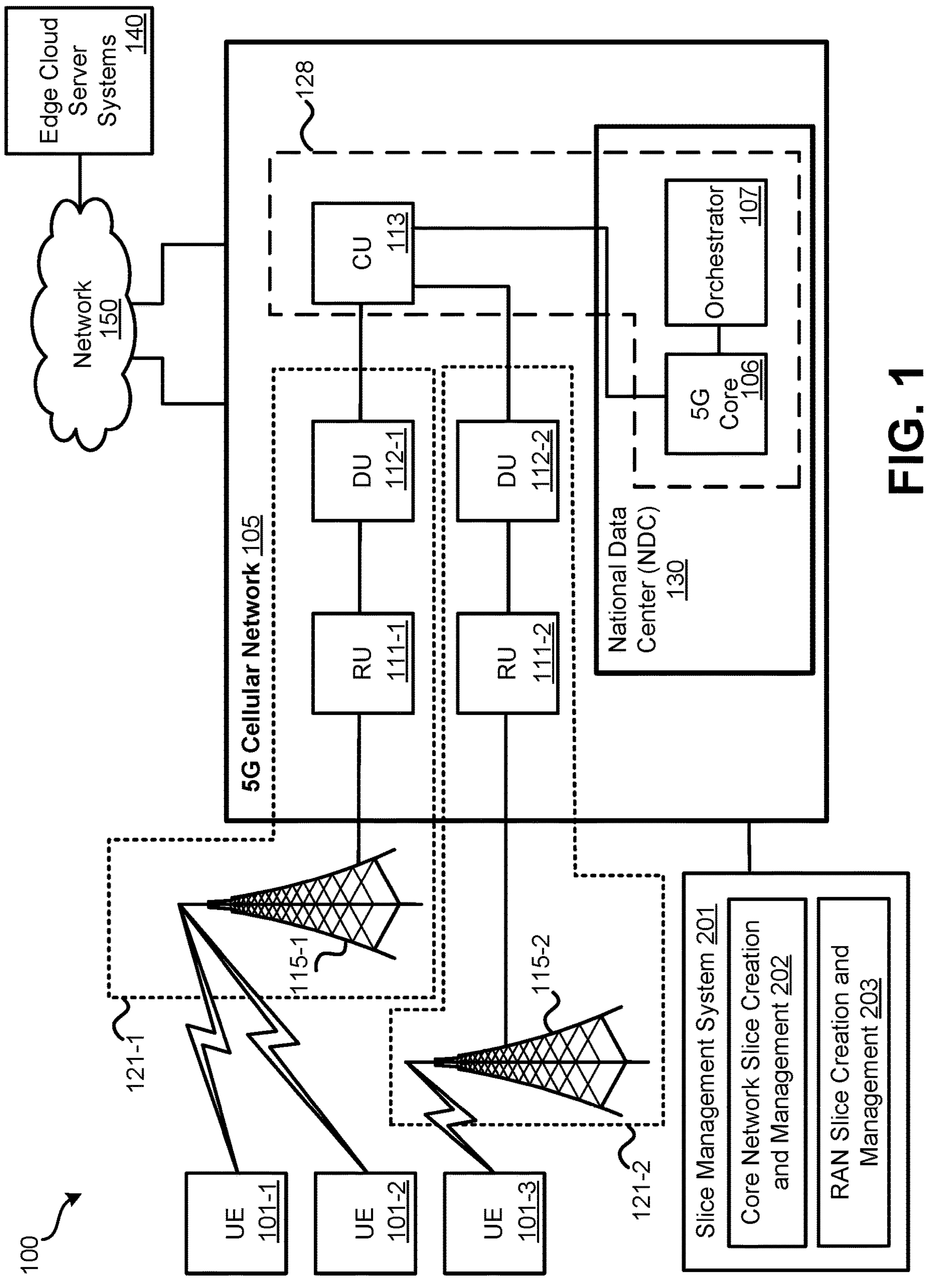
FIG. 1 is a schematic diagram illustrating an example of a wireless communications system according to various embodiments.

Cellular network slicing, such as 5G cellular network slicing, is an architecture that allows virtual independent networks to be present on a same physical network infrastructure. Various slices may be allocated differing resources that allow network slices to serve specific needs and applications. For example, a first network consumer (or client) may need to provide normal outdoor coverage and fair reliability for the users or user equipment (UE) associated with the first network consumer. A second network consumer may need normal outdoor coverage and reliability but guaranteed maximum throughput during load (e.g., the total usage of the spectrum reaches or exceeds a certain threshold or is experiencing a high level of demand). A third network consumer may need both normal outdoor coverage and extended indoor coverage with superior reliability and guaranteed throughput all the time.

A single network consumer may also have multiple user segments (i.e., multiple groups of users classified by UE type, service type, application type, user status, geographic location, etc.). For example, within a single network consumer, a first group of users may desire network resources that deliver certain Service Level Agreement (SLA) that enable reliable high-definition (HD) video streaming for user equipment (UE) associated with the first group of users. A second group of users may desire network resources that provide ultra-low latency communication between a cloud-based server system and the UE associated with the second group of users, such as users of Internet-of-Things (IoT) devices. A third group of users may desire network resources that provide ultra-low latency communication between a cloud-based server system and the UE associated with the third group of users, while also providing a video communication component to the third group of users. The number of UEs and QoS requirements for various user segments within one single network consumer may be different.

A single underlying physical network can have at least two (and, likely, many more) independent network slices operating on it, allowing each network consumer to meet specific QoS requirements needed for their particular one or more applications. However, as the number of clients that use a particular cellular network grows and the requested services diversify, the number of network slices that are defined and implemented on a single underlying physical cellular network may become large. For instance, thousands of network slices may be present on a single underlying physical cellular network. A particular network consumer (e.g., an entity, such as a company, that operates some number of UE for a particular application) may have one or more dedicated network slice or may operate UE on a shared network slice to realize various QoS attributes needed by the network consumer for one or more applications used or provided by the network consumer.

If a large number of network slices are present, it may be very challenging for a network administrator or operator to efficiently allocate network resources among the network slices during network service provisioning. The increasing proliferation of network slices within a single cellular network may introduce many intricacies, particularly regarding the allocation of network resources. As the number of network slices increases, the complexity of effectively distributing and processing finite network resources such as bandwidth and frequency bands also increases. Therefore, it is desirable for a systematic, automated, and intelligent method for network resource allocation.

In addition, accommodating diverse user segments within a single network consumer may also introduce challenges. Different user segments may demand different QoS attributes such as latency, throughput, and reliability. Thus, limited spectrum and network resources need to be optimally distributed among multiple user segments with varying demands. Therefore, it is further desirable for multi-layered, hierarchical, and adaptive resource allocation control mechanisms for network resource allocation.

The present disclosure provides systems, devices, and methods to address the above-mentioned challenges. According to some embodiments, a method is provided. The method generally includes performing network consumer intent orchestration and mapping to obtain consumer intents and establish a mapping between consumer expectations and corresponding QoS level for each network consumer, generating multiple network slices and respectively assigning the multiple network slices to multiple network consumers, executing an initial network slice configuration profile facilitate allocation of network resources among network consumers according to an initial network slice configuration profile, performing adaptive allocation processes to optimize the initial network configuration profile and generating an optimized network configuration profile. The adaptive allocation processes may further include adjusting band assignment, selection and/or combination of bands, and bandwidth share or allotment assignment for each network slice, according to various factors including but not limited to consumer priority indicator carried by each network consumer, QoS priority indicator carried by each band or a portion thereof, predetermined rules governing spectrum efficiency, traffic balance, and other QoS requirements, executing the optimized network configuration profile in an actual environment, and performing adaptive resource reallocation among network slices in the actual environment.

According to some embodiments of the present disclosure, a multi-layered and hierarchical method for adaptive network resource allocation is provided. The method generally includes generating multiple network sub-slices (also referred to as network slice segments) within one network slice. The network slice is assigned to a network consumer having a plurality of UE groups, the plurality of network sub-slices is respectively assigned to the plurality of UE groups of the network consumer, and each one of the UE groups comprises one or more UEs connected to the corresponding network sub-slice. The method further includes adaptively allocating resources at the network slice level, according to various factors such as the consumer priority indicator carried by each network consumer, the QoS priority indicator carried by each band or a portion thereof, etc. The method further includes adaptively allocating resources at the network sub-slice level, according to various factors such as UE priority indicator carried by each the UE of each network sub-slice, QoS priority indicator carried by each band or a portion thereof assigned to the network sub-slice, etc.

The methods presented in the disclosure provide a systematic and automated approach to efficiently allocate network resources among diverse network slices and consumer segments within a single network slice. By intelligently mapping consumer intents to specific QoS attributes and dynamically adjusting allocation based on priority indicators, the network efficiently utilizes limited resources to meet varying demands. The methods enable tailored QoS provisioning for each network consumer and user segment, ensuring that specific requirements such as latency, throughput, and reliability are met. The adaptive allocation processes and optimized RAN slice configuration profiles allow for continuous optimization of resource allocation based on real-time usage and changing conditions. This dynamic approach enhances spectral efficiency, minimizes interference, and balances traffic loads across network slices, resulting in improved overall network performance.

Further, the methods provide a scalable solution to the challenge of accommodating a large number of network slices. By intelligently orchestrating the allocation and reallocation of resources, the methods accommodate a growing number of slices while maintaining optimal service levels and resource utilization. The hierarchical and multi-layered approach to resource allocation allows for unified management and coordination of diverse user segments and network slices. Through the dynamic adjustment of network resources such as bandwidth allotments and adaptive allocation processes, implementation of the present methods could optimize network utilization and prevent wastage of valuable resources, leading to improved spectral efficiency and better overall network performance.

FIG. 1 is a schematic diagram illustrating an example of a wireless communications system 100 (hereinafter "system 100"). System 100 can include a 5G New Radio (NR) cellular network; other types of cellular networks, such as 6G, 7G, etc. may also be possible. System 100 can include: UE 101 (e.g., UE 101-1, UE 101-2, UE 101-3, etc.); base station 115; 5G cellular network 105 (herein after 5G network); radio units 111 ("RUs 111"); distributed units 112 ("DUs 112"); centralized unit 113 ("CU 113"); 5G core 106, orchestrator 107, and slice management system 201. FIG. 1 represents a component-level view. In an open radio access network (O-RAN), because components can be implemented as specialized software executed on general-purpose hardware, except for components that need to receive and transmit RF, the functionality of the various components can be shifted among different servers. For at least some components, the hardware may be maintained by a separate cloud-service provider, to accommodate where the functionality of such components is needed.

UE 101 can represent various types of end-user devices, such as smartphones, cellular modems, cellular-enabled computerized devices, sensor devices, gaming devices, access points (APs), any computerized device capable of communicating via a cellular network, etc. UE 101 may be able to access various applications, which may be executed at least in part remotely. For example, a cloud-based application may be executed, at least in part, at edge cloud server system 140. The application may be accessible via a web-based interface or a dedicated application executed by UE 101. Configuration and control of the cloud-based application may be managed by an administrator, such as via a user administration system.

Real-world implementations of system 100A can include many (e.g., thousands) of base stations and many CUs and 5G core 106. Base station 115 can include one or more antennas that allow RUs 111 to communicate wirelessly with UEs 101. RUs 111 can represent an edge of 5G network 105 where data is transitioned to wireless communication. The radio access technology (RAT) used by RU 111 may be 5G New Radio (NR), or some other RAT. The remainder of 5G network 105 may be based on an exclusive 5G architecture, a hybrid 4G/5G architecture, or some other cellular network architecture. Base station equipment 121 may include an RU (e.g., RU 111-1) and a DU (e.g., DU 112-1).

One or more RUs, such as RU 111-1, may communicate with DU 112-1. As an example, at a possible cell site, three RUs may be present, each connected with the same DU. Different RUs may be present for different portions of the spectrum. For instance, a first RU may operate on the spectrum in the citizens broadcast radio service (CBRS) band while a second RU may operate on a separate portion of the spectrum, such as, for example, band 71. One or more DUs, such as DU 112-1, may communicate with CU 113.

Collectively, an RU, DU, and CU create a gNodeB, which serves as the radio access network (RAN) 110 (FIG. 2A) of the 5G network 105. CU 113 can communicate with 5G core 139. The specific architecture of 5G network 105 can vary by embodiment. Edge cloud server systems outside of the 5G network 105 may communicate, either directly, via the Internet, or via some other network, with components of the 5G network 105. For example, DU 112-1 may be able to communicate with an edge cloud server system without routing data through CU 113 or 5G core 106. Other DUs may or may not have this capability.

While FIG. 1 illustrates various components of the 5G network 105, other embodiments of the 5G network 105 can vary the arrangement, communication paths, and specific components of the 5G network 105. While RU 111 may include specialized radio access componentry to enable wireless communication with UE 101, other components of 5G network 105 may be implemented using either specialized hardware, specialized firmware, and/or specialized software executed on a general-purpose server system. In an O-RAN arrangement, specialized software on general-purpose hardware may be used to perform the functions of components such as DU 112, CU 113, and 5G core 106. Functionality of such components can be co-located or located at disparate physical server systems. For example, certain components of 5G core 106 may be co-located with components of CU 113.

In a possible virtualized O-RAN implementation, CU 113, 5G core 106, and/or orchestrator 107 can be implemented virtually as software being executed by general-purpose computing equipment, such as in a data center of a cloud computing platform, as detailed herein. Therefore, depending on needs, the functionality of a CU, and/or 5G core may be implemented locally to each other and/or specific functions of any given component can be performed by physically separated server systems (e.g., at different server farms). For example, some functions of a CU may be located at a same server facility as where the DU is executed, while other functions are executed at a separate server system. In the illustrated embodiment of system 100A, cloud-based cellular network components 128 include CU 113, 5G core 106, and orchestrator 107. Such cloud-based cellular network components 128 may be executed as specialized software executed by underlying general-purpose computer servers. Cloud-based cellular network components 128 may be executed on a third-party cloud-based computing platform or a cloud-based computing platform operated by the same entity that operates the RAN. A cloud-based computing platform may have the ability to devote additional hardware resources to cloud-based cellular network components 128 or implement additional instances of such components when requested.

Kubernetes, or some other container orchestration platform, can be used to create and destroy the logical CU or 5G core units and subunits as needed for the 5G network 105 to function properly. Kubernetes allows for container deployment, scaling, and management. As an example, if cellular traffic increases substantially in a region, an additional logical CU or components of a CU may be deployed in a data center near where the traffic is occurring without any new hardware being deployed. (Rather, processing and storage capabilities of the data center would be devoted to the needed functions.) When the need for the logical CU or subcomponents of the CU no longer exists, Kubernetes can allow for removal of the logical CU. Kubernetes can also be used to control the flow of data (e.g., messages) and inject a flow of data to various components. This arrangement can allow for the modification of nominal behavior of various layers.

The deployment, scaling, and management of such virtualized components can be managed by orchestrator 107. Orchestrator 107 can represent various software processes executed by underlying computer hardware. Orchestrator 107 can monitor the 5G network 105 and determine the amount and location at which cellular network functions should be deployed to meet or attempt to meet service level agreements (SLAs) across slices of the cellular network.

Orchestrator 107 can allow for the instantiation of new cloud-based components of 5G network 105. As an example, to instantiate a new core function, orchestrator 107 can perform a pipeline of calling the core function code from a software repository incorporated as part of, or separate from, the 5G network 105; pulling corresponding configuration files (e.g., helm charts); creating Kubernetes nodes/pods; loading the related core function containers; configuring the core function; and activating other support functions (e.g., Prometheus, instances/connections to test tools).

Slice management system 201 can function as a component of cellular network 105 or can be external to cellular network 105 and be in communication with components, such as network 150. Slice management system 201 further includes a core network slice creation and management system 202 and a RAN slice creation and management system 203.

Slice management system 201 is configured to create multiple network slices. The network slice may be a core network slice and/or a RAN slice. A core network slice used herein refers to a virtualized portion of the core network infrastructure that operates as an independent and isolated network. The core network slices are created to serve specific services, applications, or user groups with distinct requirements. The core network slice encompasses virtualized network functions (VNFs) and services, such as authentication, routing, session management, and policy enforcement, which are deployed to meet the specific needs of the services or applications running within the core network slice. The RAN Slice used herein refers to a virtualized segment of the RAN, which includes the base stations, antennas, and other radio access elements. The RAN Slice operates as an independent network, allowing dedicated resources and services to be allocated to specific applications, user groups, or UEs. RAN slicing enables differentiated services with tailored QoS and connectivity parameters for different types of UE and applications. With respect to resource allocation, the core network slices are often used to allocate virtualized resources such as virtual machines, software-defined networking (SDN) resources, and cloud-based computing and storage resources, while the RAN slices are often used to allocate physical radio resources, including but not limited to radio frequency (RF) spectrum, antennas, transmission power, and signal processing. Further detail regarding the components of the slice management system 201 is provided in relation to FIGS. 2B-2C.

In some network slicing deployment examples according to the present disclosure, there can be a one-to-one correspondence between core network slices and RAN slices, and each core network slice is associated with and dedicated to a specific RAN slice, and vice versa. In such a scenario, the resources and functionalities within each core network slice and the corresponding RAN slice are tailored and optimized to meet the specific requirements of a particular network consumer, service, or application. In some embodiments, multiple core network slices may be associated with a single RAN slice, or vice versa, depending on requirements of the network operator and resource allocation configuration parameters, such as geography, proximity, network capacity, traffic patterns, and the level of isolation and customization.

In some embodiments, a network slice (e.g., core network slice or RAN slice) functions as a virtual network operating on the 5G network 105. The 5G network 105 is shared with some number of other network slices, such as hundreds or thousands of network slices. Communication bandwidth and computing resources of the underlying physical network can be reserved for individual network slices, thus allowing the individual network slices to reliably meet defined SLA parameters. By controlling the location and amount of computing and communication resources allocated to a network slice, the QoS and QoE for UE 101 can be varied on different slices. A network slice can be configured to provide sufficient resources for a particular application to be properly executed and delivered (e.g., gaming services, video services, voice services, location services, sensor reporting services, data services, etc.). Particular network slices may only be reserved in particular geographic regions. For instance, a first set of network slices may be present at RU 111-1 and DU 112-1, a second set of network slices, which may only partially overlap or may be wholly different from the first set, may be reserved at RU 111-2 and DU 112-2.

Further, particular cellular network slices may include some number of defined sub-slices or layers or segments. Each sub-slice within a network slice may be used to define QoS parameters and other network configurations for particular types of data. For instance, high-priority data sent by a UE 101 may be mapped to a sub-slice having relatively higher QoS parameters and network configurations than lower-priority data sent by the UE that is mapped to a second sub-slice having relatively less stringent QoS parameters and different network configurations.

Components such as DUs 112, CU 113, orchestrator 107, and 5G core 106 may include various software components that are required to communicate with each other, handle large volumes of data traffic, and are able to properly respond to changes in the network. In order to ensure not only the functionality and interoperability of such components, but also the ability to respond to changing network conditions and the ability to meet or perform above vendor specifications, significant testing must be performed.

Figure 2A:
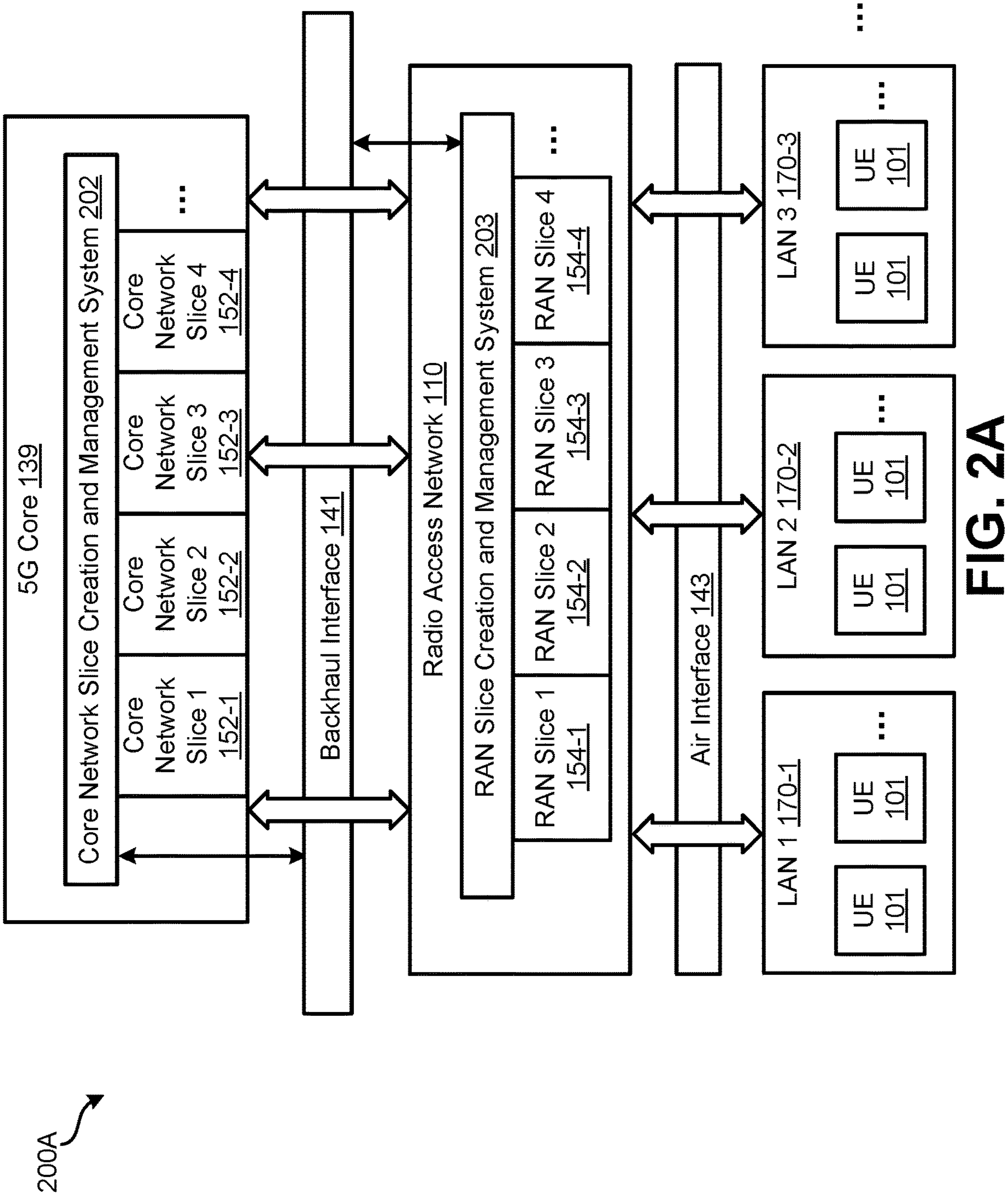
FIG. 2A is a schematic diagram illustrating an example communications system or network architecture according to various embodiments.

FIG. 2A is a schematic diagram illustrating an example communication system or network 200 (hereinafter "system 200A") according to various embodiments. In the illustrated example, system 200A includes, among other components, 5G core 139, backhaul interface 141, RAN 110, air interface 143, and multiple local area networks (LANs) 170. The 5G core 139 includes multiple core network slices 152 (e.g., core network slices 152-1, 152-2, 152-3, and 152-4) created and managed by the core network slice creation and management system 202 implemented on the 5G core 139. Likewise, the RAN 110 includes multiple RAN slices 154 (e.g., RAN slices 154-1, 154-2, 154-3, and 154-4) created and managed by the RAN slice creation and management system 203 implemented on the RAN 110. It should be noted that the number of the core network slices and RAN slices may vary depending on the specific requirements, and the correspondence between the core network slices 152 and the RAN slices 154 may also vary depending on specific strategies, service requirements, and network design considerations.

The core network slices 152 and the RAN slices 154 are in communication through the backhaul interface 141. The backhaul interface 141 may further include one or more transmission media, routing and switching elements, and packet processing and forwarding mechanisms. The backhaul interface 141 may operate on various network protocols like IP/MPLS, incorporate various security measures such as encryption, authentication, and integrity checks, and manage QoS to prioritize different types of network traffic. The backhaul interface 141 may also use synchronization mechanisms for precise timing and monitoring and management capabilities to track performance and utilization to facilitate data transmission between the 5G core 139 and the RAN 110 as well as between the core network slice(s) 152 and the corresponding RAN slice(s) 154.

The multiple LANs 170 (e.g., LAN 1 170-1. LAN 2 170-2, LAN 3 170-3) are in communication with the RAN 110 through the air interface 143. Each LAN 170 may correspond to a specific network consumer to which one or more UEs 101 are connected. In some embodiments, each LAN 170 is connected to one or more specific RAN slices 154, such that the UEs 101 associated with the corresponding network consumer share a common connection to the specific RAN slices 154. The network consumers may refer to individual users, organizations, enterprises, or any other entities that utilize network services and resources.

The air interface 143 combines various hardware and software components to allow for the use of different waveforms, and different transmission parameters of each of the waveforms (e.g., different numerology for some of the supported waveforms), different frame structures, as well as different protocols to facilitate data transmission between the UEs 101 connected to the LANs 170 and the RAN 110. The air interface 143 may include a waveform generation component responsible for generating the specific waveform used for transmitting data over the air. Different waveforms such as OFDM (Orthogonal Frequency Division Multiplexing) and CP-OFDM (Cyclic Prefix OFDM) may be generated. The air interface 143 may also include a modulation component responsible for modulating the data to be transmitted into the selected waveform. The air interface 143 may also include a numerology selection component that allows for the use of different numerology options to determine the subcarrier spacing within a frequency band and symbol durations for the waveforms. The air interface 143 may also include mechanisms for controlling the transmission power of the signals to adjust and optimize coverage. The air interface 143 may further include an access control component configured to enable multiple UEs 101 to share the same radio resources simultaneously, using multiple access techniques, such as Time Division Multiple Access (TDMA) or Orthogonal Frequency Division Multiple Access (OFDMA). The air interface 143 may also include link adaptation mechanisms to dynamically adjust the transmission parameters based on the channel conditions and quality of the link. The air interface 143 may operate in a collaborative manner with the slice management system 201 to perform resource allocation for the various network consumers and UEs 101.

Figure 2B:
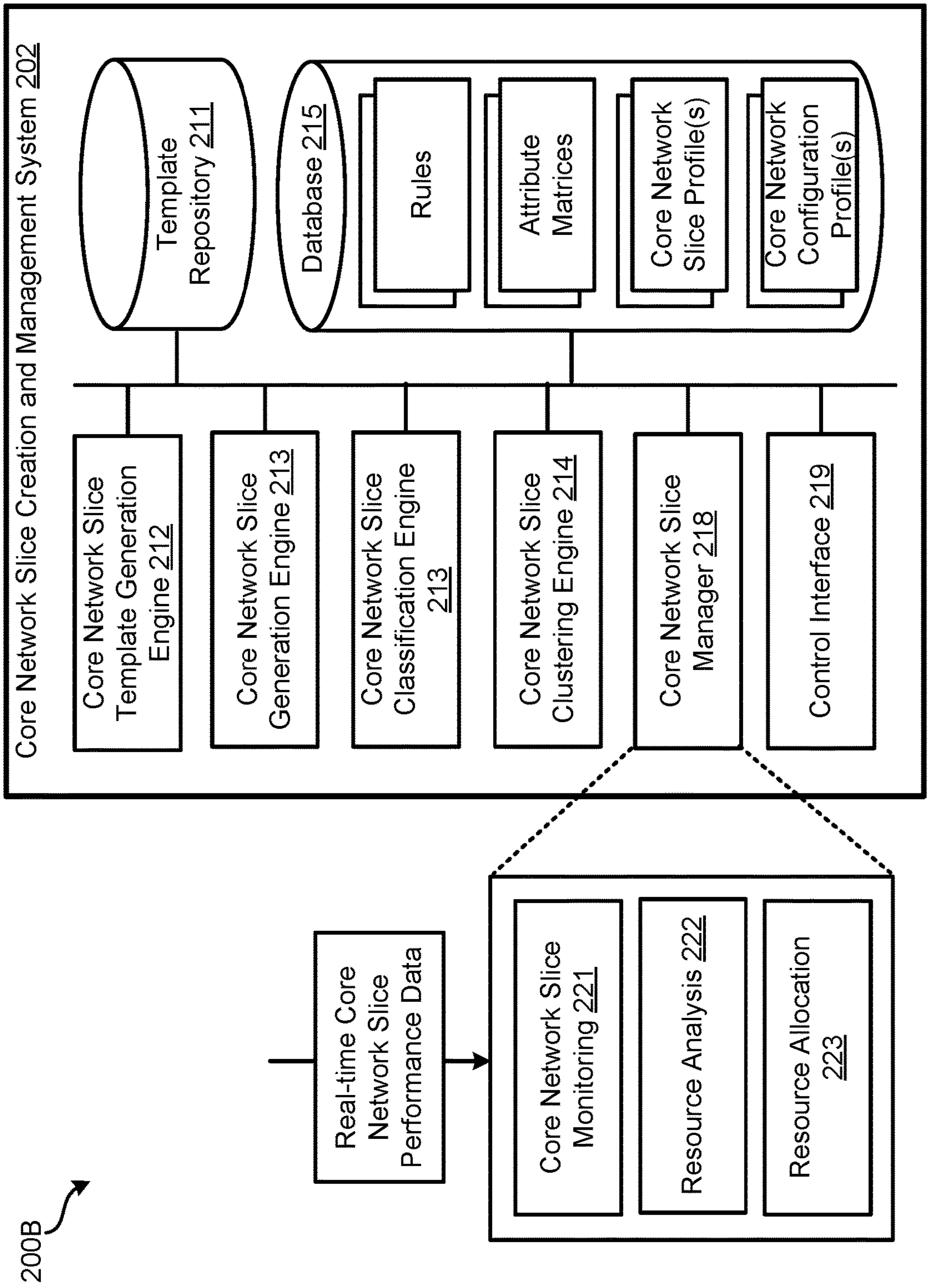
FIG. 2B is a schematic diagram illustrating another example communications system including a core network slice creation and management system, in accordance with various embodiments.

FIG. 2B is a schematic diagram illustrating another example communications system 200B including the core network slice creation and management system 202, in accordance with various embodiments. In the illustrated example, the core network slice creation and management system 202 includes, among other components, a core network slice template repository 211, a core network slice generation engine 212, a core network slice classification engine 213, a core network slice clustering engine 214, one or more databases 215, a core network slice manager 218, and a control interface 219. Each component of the core network slice creation and management system 202 may be implemented as hardware, software, or a combination of both. Hardware components may be physical devices or equipment used to support the functionalities of the core network slice creation and management system 202, including but not limited to servers, routers, switches, storage devices, and specialized networking hardware that handle data processing, storage, and communication tasks. Software components may be programs and applications responsible for running the various functionalities of the core network slice creation and management system 202, including but not limited to control logic, algorithms, databases, and user interfaces that manage core network slice creation, configuration, and optimization. The combination of hardware and software components may be implemented, such that the hardware provides the physical infrastructure and computational power, while the software provides the intelligence and control needed to manage each component of the core network slice creation and management system 202.

The core network slice template repository 211 is responsible for storing predetermined core network slice templates, each core network slice template representing specific configurations, service profiles, and network operational parameters. The core network slice templates act as standardized blueprints for creating new core network slices and streamlining the slice creation process. The core network slice templates may be encoded using machine-readable formats using structured data profiles. An example core network slice template may include multiple attributes to describe the core network slice, including but not limited to service type, QoS requirements such as bandwidth range, latency range, and buffering range, network function virtualization (NFV) services, security policies, connectivity and access policies, quality monitoring, SLA terms, and so on.

The core network slice generation engine 212 is responsible for generating new core network slices. New core network slices may be generated based on the existing core network slice templates stored in the core network slice template repository 211 or new core network slice templates. In some embodiments, a core network slice may be generated based on a predetermined RAN slice generated for a specific network consumer. In some embodiments, a core network slice may be characterized by a network consumer profile and a core network slice profile. The network consumer profile may include information of the network consumer associated with the core network slice, and the core network slice profile may include the core network slice template and the information included therein. In some embodiments, a core network slice configuration profile may be generated to map the network slice configuration data and resource allocation profile for the core network slices generated within the core network. For example, the resource allocation profile may include detailed information regarding resources assigned and allocated to each core network slice with respect to resource type, amount of resource, distributed load, priority, QoS parameters, SLA commitments, resource sharing, overload management, among others.

The core network slice classification engine 213 is responsible for tagging the core network slices and/or classifying the network slices, based on various attributes, service requirements, and characteristics. These tags or classifications may be used to identify and categorize the core network slices to enable efficient management, resource allocation, and service differentiation within the core network. In some embodiments, the core network slice classification engine 213 may use a combination of criteria, including but not limited to network consumer priority, service type, QoS parameters, resource demands, performance characteristics, SLAs, and network consumer profiles, among others, to classify the core network slices into distinct classes or categories. The tagging or classification performed by the core network slice classification engine 213 may allow network operators to prioritize resource allocation based on core network slice requirements, offer differentiated services to meet specific customer needs, and effectively manage network performance for enhanced user experience.

The core network slice clustering engine 214 is configured to group and organize core network slices into clusters based on their similarities, characteristics, and resource requirements. For example, the core network slice clustering engine 214 can perform clustering analysis to identify patterns and commonalities among the core network slices, analyzes the resource demands of individual core network slices and groups those with similar resource requirements into clusters, determine which network resources can be efficiently shared among core network slices within a cluster and which require isolation, and optimize the overall configuration and management of the core network slices.

The core network slice manager 218 is configured to monitor the performance of the core network slices and dynamically adjust reallocation of resources to core network slices. The core network slice manager 218 may automatically perform dynamic and adaptive reallocation of resources to core network slices to meet the predetermined core network slice configuration profile. In some embodiments, the core network slice manager 218 further includes a core network slice monitoring engine 221, a resource analysis engine 222, and a resource allocation engine 223. The core network slice monitoring engine 221 is responsible for receiving real-time core network slice performance data and resource utilization data from the 5G core 139. The real-time core network slice performance data may include latency (i.e., time delay experienced by data packets passing through the network slice), bandwidth usage, packet loss rate, throughput (i.e., the rate of data transmission/delivery), jitter, QoS metrics, service availability, among others. The real-time utilization data may include processing resource (e.g., CPU) utilization rate, memory consumption rate, storage usage, network traffic patterns, traffic load and congestion, resource allocation metrics, user experience metrics, among others.

The resource analysis engine 222 is configured to analyze the real-time core network slice performance data and resource utilization data in comparison to the predetermined core network slice configuration profile, and determine whether the actual performance and resource utilization of each core network slice align with the predetermined network configuration guidelines provided in the core network slice configuration profile. In some embodiments, the resource analysis engine 222 can reference the predetermined core network slice configuration profile, which defines the desired performance targets and resource allocation guidelines for each core network slice, compare the real-time performance and resource utilization data against the predetermined configuration profile, identify presence or absence of a deviation/anomaly of the performance or resource utilization for each core network slice, generate alerts or notifications to inform the network operators of any non-compliant core network slices, and provide recommendations for resource adjustments or service-level modifications to bring non-compliant core network slices back in line with the predetermined configuration profile. In some embodiments, the resource analysis engine 222 may leverage the capabilities of an Artificial Intelligence (AI) engine or a machine learning (ML) engine to augment the resource analysis and decision-making processes.

The resource allocation engine 223 is responsible for continuously and adaptively reallocating resources to bring non-compliant core network slices back in line with the predetermined configuration profile. The resource allocation engine 223 may operate autonomously to follow the recommendations generated by the resource analysis engine 222 and implement resource reallocation decisions without the need for manual intervention.

The control interface 219 is responsible for providing a means of communication and interaction between the core network slice creation and management system 202 and external entities, such as network administrators, operators, or other management systems. The control interface 219. Network administrators or operators may use the control interface 219 to create new core network slices, define their characteristics, allocate resources based on consumer profiles and performance requirements, and delete or modify existing core network slices when needed.

The database 215 may store and update data received, generated, and processed in the core network slice creation and management system 202. Examples of the data stored in database 215 include but are not limited to rules data, attribute matrices data, core network slice profiles, resource allocation data, performance metrics data, network consumer profiles, core network slice configuration profiles, and historical data thereof.

Figure 2C:
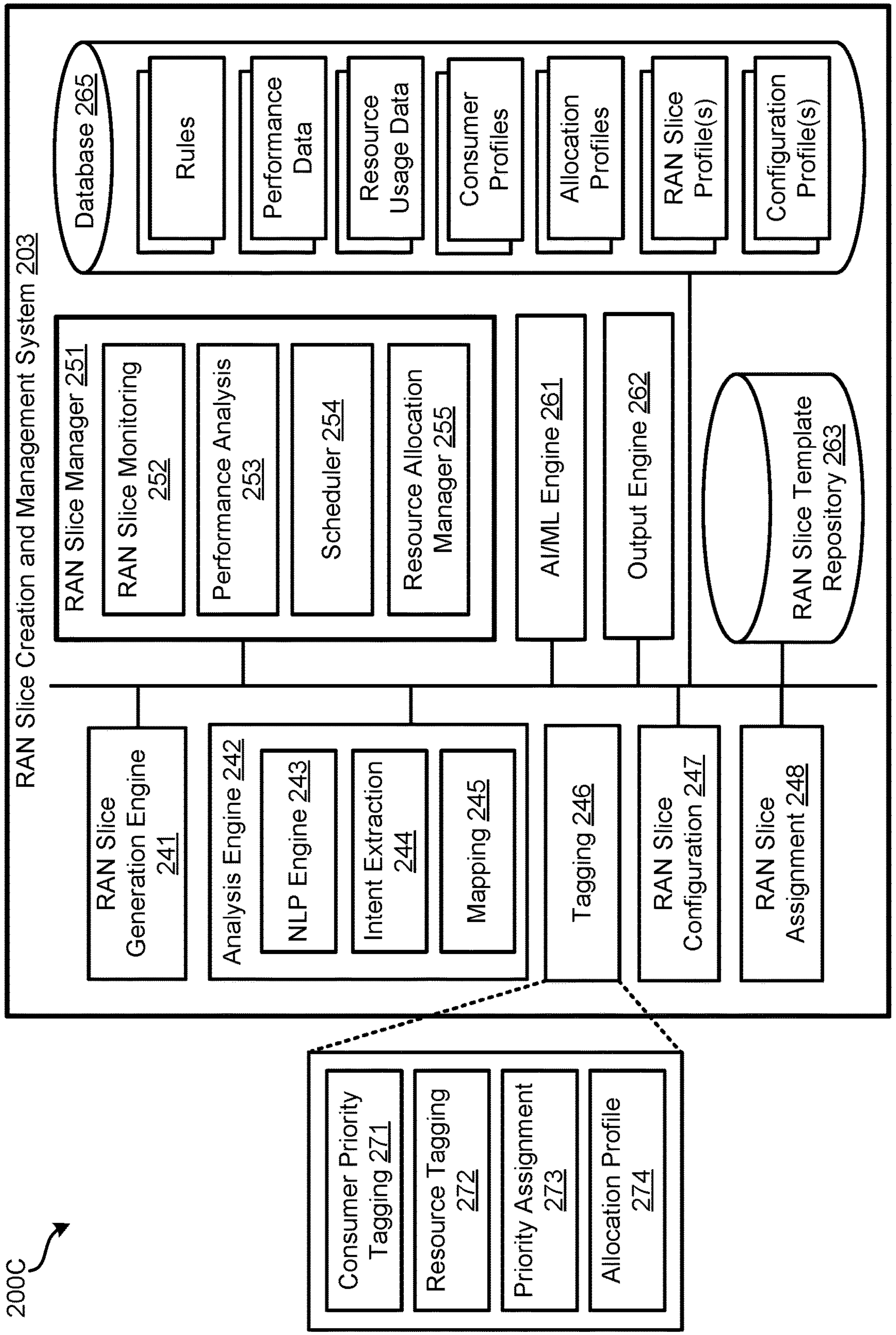
FIG. 2C is a schematic diagram illustrating another example communications system including a RAN slice creation and management system, in accordance with various embodiments.

FIG. 2C is a schematic diagram illustrating another example communications system 200C including the RAN slice creation and management system 203, in accordance with various embodiments. In the illustrated example, the RAN slice creation and management system 203 includes, among other components, a RAN slice generation engine 241, an analysis engine 242, a tagging engine 246, a RAN slice configuration engine 247, a RAN slice assignment engine, a RAN slice manager 251, an AI/ML engine 261, an output engine 262, a RAN slice template repository 263, one or more databases 265. Each component of the RAN slice creation and management system 203 may be implemented as hardware, software, or a combination of both.

The RAN slice generation engine 241 is responsible for generating a RAN slice 154 of the RAN 110 (FIG. 2A). The RAN slice generation engine 241 may generate new RAN slices based on network consumer profiles, performance requirements set forth in SLA, available RAN resources, among other factors. In some embodiments, the RAN slice generation engine 241 uses the RAN slice template repository 263 to retrieve predetermined/existing RAN slice templates. In some embodiments, a new RAN slice template may also be generated for new network consumers.

The analysis engine 242 is responsible for receiving input or request from network consumers, processing information included in the request or input to extract consumer intent regarding service and performance requirements, mapping the consumer intent with predetermined QoS attributes, and generating network consumer profiles. In some embodiments, the analysis engine 242 further includes, among other components, a natural language processing engine 243, an intent extraction engine 244, and a mapping engine 245. In some embodiments, the analysis engine 242 can leverage the AI/ML engine 261 (i.e., operating in a conjunctive manner) to augment the analysis process.

The natural language processing engine 243 is responsible for interpreting languages from the input or request from network consumers and other information from the network consumer profiles expressed in natural language. For example, the natural language processing engine 243 may process the SLA of the network consumer and interpret various performance and service requirements provided in the SLA, such as service-level objective, service type, number of users and UE, UE type, geographical location requirement, coverage area, time frame or time-of-day requirement, minimum data rate, latency threshold/range, reliability level, data caps, priority access, specific QoS metric, among others.

The intent extraction engine 244 is responsible for extracting consumer intent and identifying the specific requirements and preferences expressed by the network consumers. The intent extraction engine 244 may operate in conjunction with the natural language processing engine 243 to analyze the inputs or requests received from network consumers, which can be in various forms, such as natural language texts, data fields, or structured queries, identify and isolate information and data points relevant to the demands and performance expectations of the network consumers, and optionally generate a network consumer intent profile for each network consumer.

The mapping engine 245 is responsible for correlating and associating the extracted consumer intent (e.g., from the network consumer intent profile), obtained from the intent extraction engine 244, with the appropriate QoS attributes. The mapping engine 245 is configured to translate the requirements of the network consumers into specific technical configurations that align with the capabilities of the RAN infrastructure. In some embodiments, the mapping engine 245 may translate the extracted intent into structured data (e.g., in a form of a network consumer service configuration profile) that reflects the service configuration parameters applicable to the RAN slices. For example, the mapping engine 245 may map a data rate requirement to the appropriate bandwidth allocation settings and/or appropriate QoS attributes. In some embodiments, the mapping engine 245 also identifies the required resources, such as radio frequency bands, bandwidth parts, resource blocks, or time-frequency resources, among others, for fulfilling the extract intent of the network consumer. The mapping engine 245 can continuously adapt the mappings as consumer intent changes or as network conditions evolve over time.

The tagging engine 246 is responsible for classifying and differentiating the network consumers and the resources by assigning appropriate priority indicators. In some embodiments, the tagging engine 246 further includes a network consumer priority tagging module 271, a resource tagging module 272, a priority mapping and assignment module 273, and an allocation profile generation engine 274. The network consumer priority tagging module 271 is responsible for assessing and analyzing the characteristics of network consumers, including their service plans, SLAs, expressed intent, and desired QoS attributes from the network consumer profile, and applying specific algorithms and rules to determine the appropriate priority level for each network consumer based on the gathered information. The resource tagging module 272 is responsible for tagging various network resources, such as frequency bands, bandwidth parts, and time-frequency resources, with priority indicators. The resource tagging module 272 considers the priority levels assigned to network consumers and the specific requirements of the resources to ensure that resource allocation aligns with consumer priorities. The priority mapping and assignment module 273 is responsible for mapping and assigning the priority indicators to network consumers and resources. The priority mapping and assignment module 273 can apply specific mapping algorithms to establish a correlation between the priority level of network consumers and the corresponding priority level of resources.

In some embodiments, the tagging engine 246 may define and utilize multiple priority indicators to classify network consumers into distinct priority levels. For instance, a first level consumer priority tag or indicator may be assigned to network consumers requiring normal outdoor coverage and fair reliability, without guaranteed maximum throughput during load. A second level consumer priority indicator denotes a higher priority, signifying guaranteed maximum throughput during load for network consumers demanding normal outdoor coverage and higher reliability. A third level consumer priority indicator designates the highest priority, applicable to network consumers demanding extended outdoor coverage and excellent reliability with guaranteed maximum throughput at all times. The term "maximum throughput" used herein refers to the highest achievable data transmission rate or capacity and is used interchangeably with "maximum data rate" or "peak data rate."

The tagging engine 246 may also tag network resources such as frequency bands, bandwidth parts/portions/segments (BWP or BWS), and time-frequency resources with QoS priority indicators. The QoS priority indicator used herein refers to a specialized parameter or label assigned to network resources, such as frequency bands or BWPs, within a network communications system. The QoS priority indicator quantifies the relative importance or precedence of a particular network resource in terms of meeting specific QoS attributes/requirements. The "QoS priority indicators" are used interchangeably with "resource allocation priority indicators" in the present disclosure.

In some embodiments, the tagging engine 246 may partition the operable frequency spectrum into multiple frequency bands or BWPs and then tag each band or BWP with a QoS priority indicator. For instance, a band or BWP tagged with a first level QoS priority indicator indicates that it is shared among all network consumers in a relatively equal manner without any guaranteed maximum throughput. On the other hand, a band or BWP that carries a second level QoS priority indicator, which holds a higher priority than the first, signifies that it will be prioritized for qualified network consumers, and the maximum throughput is assured during periods of load. Furthermore, a band or BWP that carries a third level QoS priority indicator, with an even higher priority than the second, denotes that it will be reserved exclusively for qualified network consumers (e.g., network consumers linked with the third consumer priority indicator), and the maximum throughput is guaranteed at all times. This tagging of network resources allows efficient allocation and differentiation of resources based on priority levels to ensure optimal network performance for different consumer requirements.

In some embodiments, the priority mapping and assignment module 273 can automatically and intelligently allocate network resources to network consumers by matching the consumer priority indicators with the QoS priority indicators according to predetermined matching rules. Other factors such as geographical location of the network consumer and the RAN infrastructure, network traffic conditions, load balancing, service type, and classification, may also be considered to optimize resource partition and distribution.

The allocation profile generation engine 274 is responsible for generating a classification/assignment/allocation profile (hereinafter "allocation profile") that captures the results of the classification, tagging, mapping, assignment, allocation, and reallocation processes. The allocation profile may document the assigned priority indicators, resource allocations, and mappings between network consumers and network resources. The allocation profiles may be timely updated to reflect changes in the network consumers and the network resources.

The RAN slice configuration engine 247 is responsible for configuring RAN slices and network operational parameters aiming at meeting the QoS attributes, based on the allocation profile. In some embodiments, the RAN slice configuration engine 247 generates a RAN slice instance that adheres to a predetermined RAN slice template. The RAN slice instance functions as a precise realization of a RAN slice and includes pertinent network operational parameters configured to attain the specific QoS attributes for a given RAN slice.

In some embodiments, the RAN slice configuration engine 247 utilizes the priority indicators and resource assignments present in the allocation profile to determine the appropriate network operational parameters for each RAN slice. As network consumers are associated with specific priority levels through the allocation profile, the RAN slice configuration engine 247 uses this information to customize the configuration of each RAN slice, for example, specifying network operational parameters that are used to manage and control frequency bands, bandwidth parts/portions/segments, band allotments, time slots, geographic locations, coverage areas, load balancing rules, spectral efficiency thresholds, security protocols, among others. Additional network operational parameters included in the RAN slice instance and the RAN slice configuration profile may include transmission power level, handover threshold, cell reselection parameters, scheduling policies, error correction and recovery settings, carrier aggregation, multiple-input multiple-output (MIMO) settings, mobility management parameters, among others.

The RAN slice assignment engine 248 is responsible for assigning the RAN slices to network consumers, based on their respective network consumer profiles, QoS attributes/requirements, priority indicators, as well as allocation profiles. The RAN slice assignment engine 248 ensures that network consumers with higher priority levels, as indicated in the allocation profile, are given preference in resource allocation. The prioritization allows for differentiated network services and QoS tailored to the needs of various network consumers.

In some embodiments, multiple RAN slices may be assigned to one network consumer. Multi-RAN slicing is particularly beneficial for enterprises or industries with diverse service requirements. For example, an enterprise consumer might require different levels of coverage, capacity, and latency for different types of applications and devices within their network. By assigning multiple RAN slices to the enterprise consumer, each slice can be optimized for specific use cases to provide an optimal user experience and efficient resource usage. As another example, multi-RAN slicing can support scenarios where a network consumer operates across multiple geographical locations. Each location might have varying network conditions and requirements, and by assigning separate RAN slices to each location, the network operator/administrator can tailor the service and resource allocation for each specific area.

The RAN slice manager 251 is responsible for continuously monitoring the performance of RAN slices and dynamically adjusting resource allocation (i.e., performing reallocation of resources) during network service provisioning, in a test environment or an actual environment. In some embodiments, the RAN slice manager 251 includes, among other components, a RAN slice monitoring module 252, a performance analysis module 253, a scheduler 254, and a resource allocation manager 255.

The RAN slice monitoring module 252 is responsible for constantly observing the operational status and performance metrics of each RAN slice, collecting real-time performance and resource usage data related to network traffic, throughput, latency, packet error rates, and other key performance indicators (KPIs), tracking how well each RAN slice is performing in meeting its objectives and adhering to the SLAs of the associated network consumers.

The performance analysis module 253 is responsible for processing the performance data and resource usage data collected by the RAN slice monitoring module 252 and performing analysis and assessment of the overall performance of each RAN slice. The performance analysis module 253 may compare the observed performance against the predetermined RAN network configuration profile and SLAs to identify any deviations, discrepancies, or potential areas for improvement.

The scheduler 254 is responsible for adjusting/reconfiguring network operational parameters to reallocate network resources and reduce deviations, discrepancies, aiming at meeting the QoS attributes and service requirements according to the predetermined RAN slice configuration profile. The scheduler 254 may dynamically adjust resource allocation throughout a day or a period of time to align with changing traffic loads and usage patterns. For example, during peak hours, when network traffic is high, the scheduler can allocate more resources to meet increased demand for a specific network slice. Conversely, during off-peak hours, when traffic is low, the scheduler can reallocate resources to optimize utilization. If any deviations or discrepancies from the predetermined RAN slice configuration profile or SLAs are detected, the scheduler 254 may be automatically triggered to perform dynamic resource reallocation. For example, the resource reallocation process may involve adaptively reallocating resources among RAN slices to ensure that the overall satisfaction of service requirements for all network consumers is above a threshold level. For example, if one RAN slice is experiencing high congestion or performance degradation, the scheduler 254 can reallocate resources from other less-utilized RAN slices to balance the load and maintain optimal performance across the network.

The resource allocation manager 255 is responsible for following specific priority rules to reallocate resources between or among RAN slices based on the priority indicators of the network consumers associated with the RAN slices. For example, the resource allocation manager 255 may map the consumer priority indicators assigned to network consumers with the corresponding QoS priority indicators tagged to network resources, such as frequency bands, BWPs, and time-frequency resources. The resource allocation manager 255 may establish a priority hierarchy that determines the order of preference for resource allocation. Higher-priority RAN slices with network consumers that carry higher consumer priority indicators are given precedence over lower-priority RAN slices. When a higher-priority RAN slice requires additional resources or experiences increased demand, the resource allocation manager 255 may dynamically reallocate resources from lower-priority slices to meet the requirements of the higher-priority RAN slice and optimizes the allocation to maintain a balance among RAN slices and maximize overall network performance. The resource allocation manager 255 also considers load balancing while reallocating resources to prevent RAN slices from becoming overloaded or underutilized. The resource allocation manager 255 automatically operates to perform adaptive resource allocation with reference to the predetermined RAN slice configuration profile, aiming at maintaining compliance with service-level objectives, service types, and other specific requirements specified in the consumer network profile.

In some embodiments, the resource allocation manager 255 may operate in conjunction with the AI/ML engine 261 to optimize resource allocation decisions. In one example scenario, a network operator deploys multiple RAN slices to serve different network consumers with varying service requirements. The resource allocation manager 255 continuously collects real-time resource usage data and performance data. The real-time resource usage data and performance data may include bandwidth usage data, latency measurement data, packet loss rate data, signal strength data, signal-to-noise ratio (SNR) data, signal-to-interference-plus-noise ratio (SINR) data, CPU and memory usage data, network traffic pattern data, Quality of Experience (QoE) scores, radio resource management metrics (e.g., the number of active users, handover success rates, and interference levels, health status, etc.), spectral efficiency, band usage efficiency, scheduling fairness level (e.g., proportional fairness index, throughput variation, queen length, delay measurement, rate of successful requests, etc.), among other performance metrics. The AI/ML engine 261 processes and extracts relevant features from the collected data. These features may include network congestion levels, user mobility patterns, application types, time-of-day patterns, and historical resource usage. The AI/ML engine 261 may use the extracted features to train one or more ML models, using various techniques such as neural networks, decision trees, or reinforcement learning algorithms. The training process involves learning from historical data to recognize patterns and correlations between resource allocation decisions and network performance outcomes. Once the AI/ML models are trained, the resource allocation manager 255 may operate in conjunction with the AI/ML engine 261 to predict future network conditions and consumer demands based on incoming performance data. The AI/ML engine 261 can predict resource requirements for each RAN slice and network consumer. The resource allocation manager 255 may leverage the predictions from the AI/ML engine to dynamically and adaptively allocate resources among RAN slices in real time. The AI/ML engine 261 may further provide recommendations on how to adjust resource allocations based on the predictions. The AI/ML engine 261 may continuously update the AI/ML models to adapt to changing network conditions and consumer behavior.

The database 265 serves as a repository responsible for storing, managing, and updating various data and profiles utilized by the RAN slice creation and management system 203, including but not limited to, rules and policies such as priority rules and security rules, real-time and historical performance data and resource usage data regarding RAN slices, network consumer profiles, allocation profiles, RAN slice instances, RAN slice configuration profiles, among others.

In some embodiments, the RAN slice creation and management system 203 may generate a RAN slice configuration profile, which includes an allocation profile specifying how resources such as frequency bands, bandwidth parts, time-frequency resources are distributed among multiple RAN slices. The RAN slice configuration profile may further include data related to priority indicators, throughput requirements, latency thresholds, and other relevant QoS attributes from the RAN slice templates as well as configured network operational parameters from the RAN slice instances for each RAN slice.

In some embodiments, the RAN slice creation and management system 203 may generate an initial RAN slice configuration. The initial RAN slice configuration profile is executed and tested in a controlled environment that simulates network conditions of a real or actual service-provisioning environment. This test environment allows the RAN slice creation and management system 203 to evaluate the performance of the RAN slices under different scenarios and resource allocations. During the testing phase, the RAN slice creation and management system 203 employs optimization algorithms and techniques to fine-tune the resource allocation among RAN slices to maximize network efficiency and meet service requirements for each network consumer. For example, the initial RAN slice configuration profile may include an initial allocation profile that specifies an initial bandwidth of the band assigned to the RAN slices. The initial RAN slice configuration profile is executed in a testing environment to test whether the initial bandwidth of the band is appropriate for meeting the QoS attributes/requirement for each one of the RAN slices in a particular time slot and meeting a minimum overall band usage efficiency (e.g., total bandwidth usage is 70-90% of the overall bandwidth). Adaptive resource allocation may be performed during the testing to adjust the selection and assignment of bands for the RAN slices, adjust the combination of bands for the RAN slices, adjust the total bandwidth allocated to each RAN slice, adjust bandwidth allotment of a band to each RAN slice, and so on. The initial RAN slice configuration profile is optimized to generate an optimized RAN slice configuration profile to reflect the optimal resource allocation determined during testing.

The optimized RAN slice configuration profile includes the adjusted/reconfigured network operational parameters based on the resource allocation optimization results during testing. The optimized RAN slice configuration profile represents the efficient resource allocation plan for the RAN slices. The optimized RAN slice configuration profile may be used for deployment in the actual service provisioning environment. Accordingly, the RAN slices are dynamically and adaptively allocated with the right resources to meet the varying demands of network consumers while maintaining overall network efficiency.

Figure 3A:
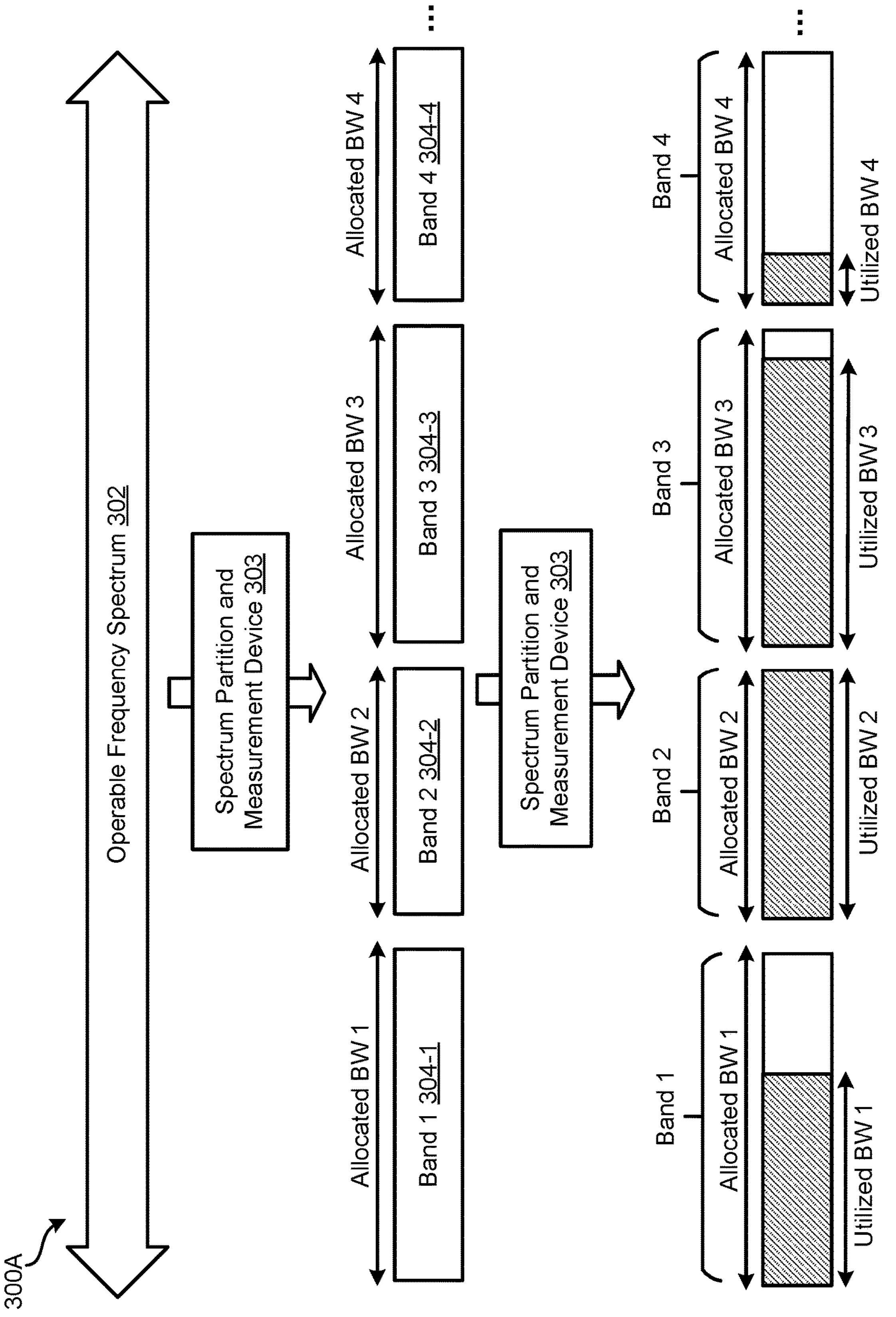
FIG. 3A is a schematic diagram illustrating a process for spectrum/frequency resource allocation, in accordance with various embodiments.

FIG. 3A is a schematic diagram illustrating a process 300A for spectrum/frequency resource allocation, in accordance with various embodiments. In the illustrated example, the process 300A includes dividing, partitioning, or segmenting an operable radio frequency spectrum 302 into multiple smaller radio frequency bands 304 (hereinafter "bands"), through use of a spectrum partition and measurement device 303. The spectrum partition and measurement device 303 may be a part of the 5G core 139 and/or the slice management system 201 (shown in FIG. 1), or a combination of hardware or software components of the 5G core 139 and/or the slice management system 201 as described above.

The spectrum partition and measurement device 303 may further include one or more of the following components: a frequency filter, a frequency mixer, a bandwidth allocator, a switching and routing mechanism, a spectrum analyzer, among others. The frequency filter may isolate specific frequency ranges from the operable radio frequency spectrum to create distinct bands. The frequency mixer may be used to combine different frequency signals and perform frequency translation to create new bands by combining existing ones or down-convert signals to lower frequencies to fit within a designated band. The bandwidth allocator is used to determine the size of each partitioned frequency band and allocate the appropriate bandwidth to each band. The switching and routing mechanism is used to facilitate the routing of RF signals between different frequency bands and manage the data flow between bands. The spectrum analyzer measures and monitors the frequency spectrum to identify and analyze the bandwidth usage of different bands and generates bandwidth usage data for each band.

As illustrated in FIG. 3A, at least four bands 304-1, 304-2, 304-3, and 304-4 are generated. Each band 304 has an allocated bandwidth. The allocated bandwidth for each band may be the same or different from each other. During network service provisioning, the values of the utilized bandwidth of each band can be measured and monitored by the spectrum partition and measurement device 303. For example, the utilized bandwidth of band 1 304-1 is less than the allocated bandwidth, indicating that the allocated bandwidth of band 1 304-1 is not fully used. This could occur if the network consumer associated with band 1 is not currently generating enough traffic to fully use the allocated bandwidth. The utilized bandwidth may be the same as the allocated bandwidth (e.g., band 2 304-2), indicating the band is fully used by the network consumers associated therewith. The ability to monitor and measure the utilized bandwidth of each band allows for efficient resource allocation and optimization to ensure that network resources are utilized effectively to meet the demands of different network consumers and applications.

Figure 3B:
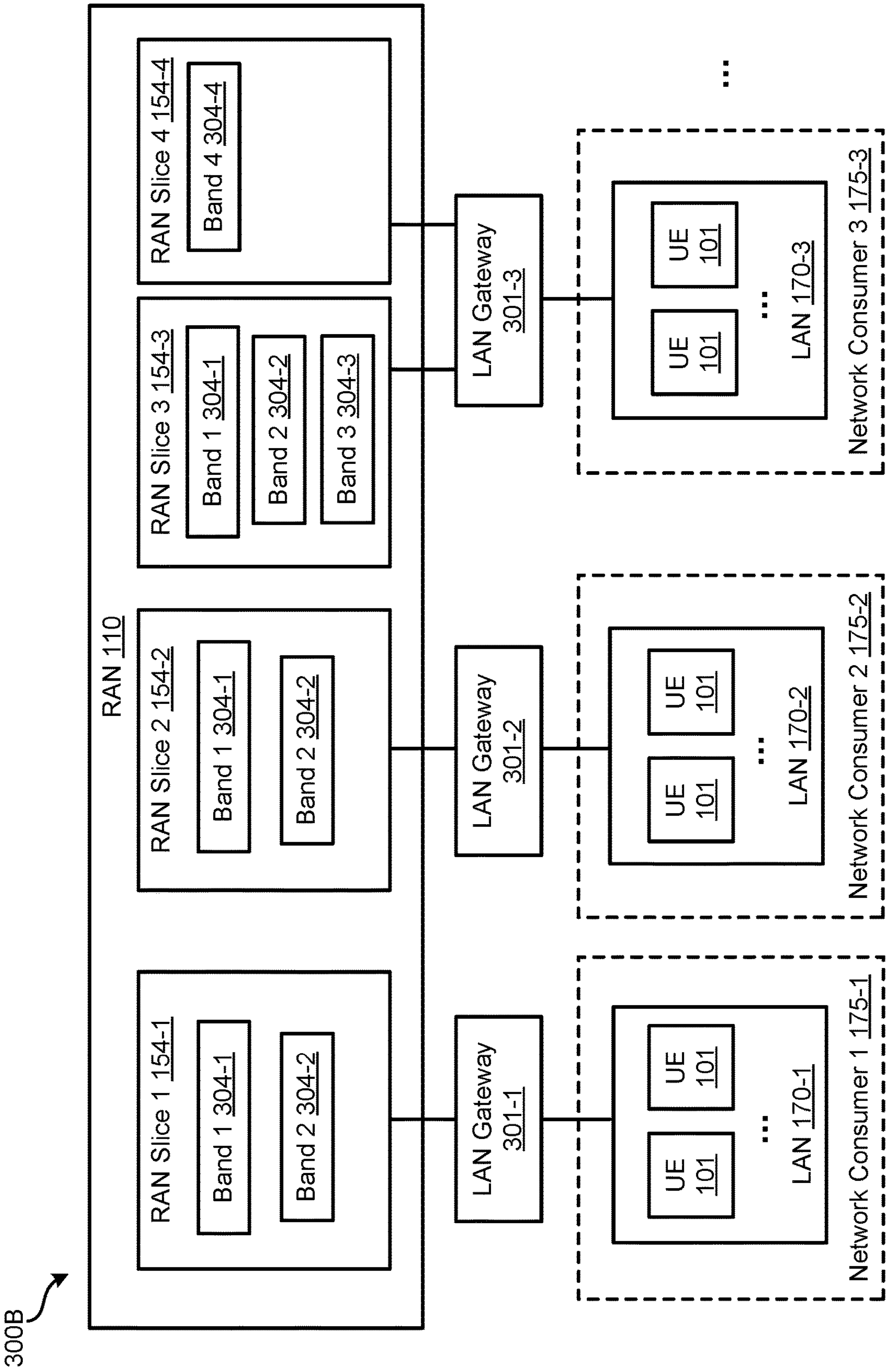
FIG. 3B is a schematic diagram illustrating a system for resource allocation according to various embodiments.

FIG. 3B is a schematic diagram illustrating a communications system 300B for resource allocation according to various embodiments. In the illustrated example, the communications system 300B includes, among other components, RAN 110, multiple LAN gateways 301 (e.g., 301-1, 301-2, and 301-3), and multiple LANs 170 (e.g., 170-1, 170-2, and 170-3). The RAN 110 includes multiple RAN slices 154 (e.g., RAN slice 1 denoted as 154-1, RAN slice 2 denoted as 154-2, RAN slice 3 denoted as 154-3, and RAN slice 4 denoted as 154-4). Each RAN slice 154 may have one or more bands 304 assigned thereto. For example, band 1 and band 2 are assigned to RAN slice 1, band 1 and band 2 are assigned to RAN slice 2, band 1, band 2, and band 3 are assigned to RAN slice 3, and band 4 is assigned to RAN slice 4. Multiple bands may be assigned to the same RAN slice, which allows the RAN slice to utilize multiple frequency bands simultaneously and aggregate the available bandwidth to achieve higher data rates and increased network capacity. The total number of bands and the allocated bandwidth of each band may be dynamically and adaptively adjusted, for example, by the RAN slice creation and management system 203, based on real-time network conditions as well as the performance requirements of the network consumers (e.g., from the related RAN slice instance and/or RAN slice configuration profile).

One or more RAN slices 154 may be assigned to a particular network consumer 175. For example, RAN slice 1 is assigned to network consumer 1 denoted as 175-1, RAN slice 2 is assigned to network consumer 2 denoted as 175-2, and RAN slices 3 and 4 are both assigned to network consumer 3 denoted as 175-3. The UEs 101 belonging to each network consumer 175 can access the RAN 110 through the corresponding LAN 170 and the LAN gateway 301. The LAN gateway 301 serves as a connection point between the LAN 170 and the RAN 110 and facilitates the communication and data exchange between the UEs 101 and the RAN slice(s) 154 associated with each network consumer 175. In some embodiments, the LAN gateway 301 may include various components such as router, switcher, network address translation (NAT) server, firewall, virtual private network (VPN) server, dynamic host configuration protocol (DHCP) server, proxy server, traffic monitoring and analysis server, among others to facilitate network traffic isolation between the different RAN slices 154 that are assigned to each network consumer 175. Through use of the combination of RAN slicing, band partitioning, band assignment and aggregation, each RAN slice 154 serves as a separate virtual network within the RAN 110 to allow for independent management and control of the network resources for each network consumer 175.

Figure 4A:
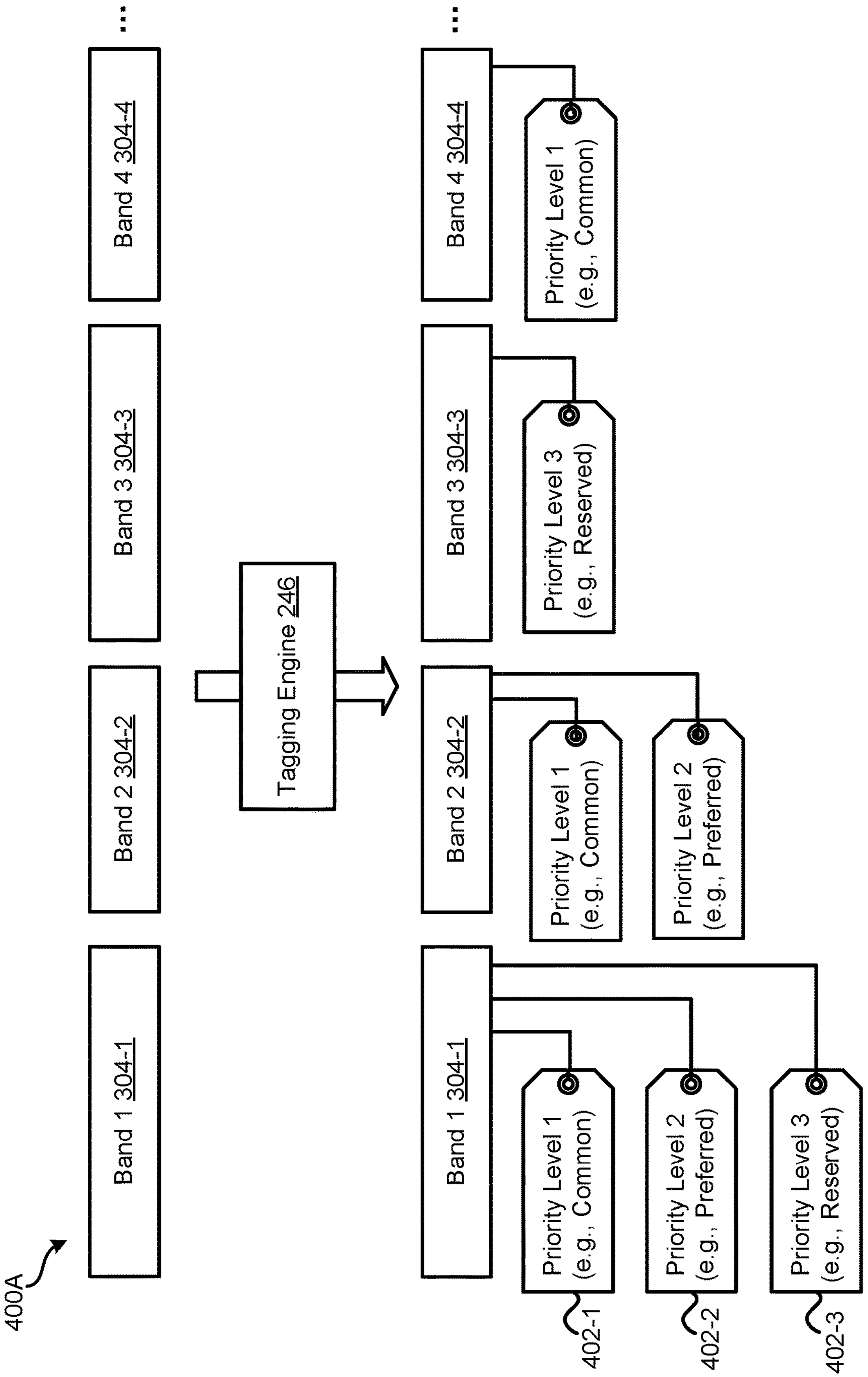
FIG. 4A illustrates an example process for resource classification according to various embodiments.

FIG. 4A illustrates an example process 400A for resource tagging according to various embodiments. In the illustrated example, the various bands 304 are classified, for example, using the tagging engine 246, based on the "frequency band QoS class indicators" or "QoS priority indicators." Each band 304 may be tagged with one or more of these priority indicators, denoted as tags 402. The tags 402 represent different priority levels of the bands 304. For example, band 1 (304-1) may be tagged with three indicators: "QoS priority indicator 1" (402-1) representing the first priority level (common), indicating that band 1 is shared among multiple normal network consumers. "QoS priority indicator 2" (402-2) represents the second priority level (preferred), which takes precedence over priority level 1. According to a predetermined rule, when the utilized bandwidth of band 1 reaches or exceeds a predetermined threshold, the whole or a portion of band 1 will be allocated to privileged network consumers to ensure their QoS satisfaction (e.g., a required maximum throughput). "QoS priority indicator 3" (402-3) denotes the third priority level (reserved), which has priority over both level 1 and level 2. Under another predetermined rule, band 1 or a portion thereof, is reserved exclusively for premium network consumers to guarantee satisfaction of their QoS attributes/requirements at all times. It should be noted that the classification and tagging described in the above example is for illustrative purposes only, and other possible ways of classification (e.g., more than three priority levels) are within the scope of the present disclosure.

Figure 4B:
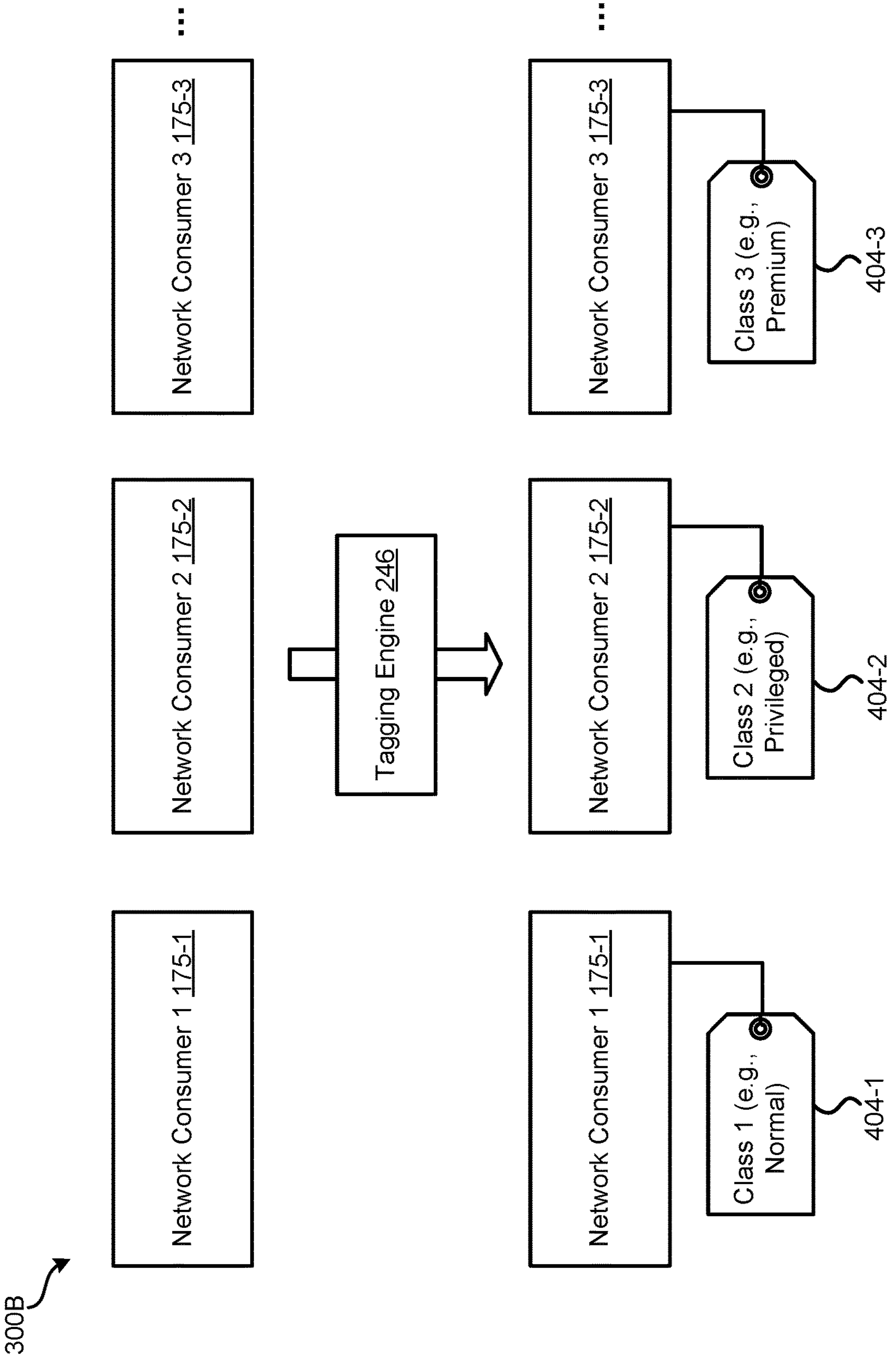
FIG. 4B illustrates an example process for network consumer classification according to various embodiments.

FIG. 4B illustrates an example process 400B for network consumer classification according to various embodiments. In the illustrated example, various network consumers 175 are classified, for example, using the tagging engine 246, based on the "network consumer class indicators" or "consumer priority indicators." Each network consumer 175 is tagged with one of these indicators, denoted as tag 404, for a particular time slot. The tags 404 represent different priority levels of the network consumers 175. For example, network consumer 1 (175-1) may be tagged with "consumer priority indicator 1" (404-1) representing the first priority level (normal), network consumer 2 (175-2) may be tagged with "consumer priority indicator 2 (404-2) representing the second priority level (preferred), and network consumer 3 (175-3) may be tagged with "consumer priority indicator 3 (404-3) representing the third priority level (reserved). The priority indicators follow a hierarchical order, where "consumer priority indicator 3" takes precedence over "consumer priority indicator 2," which, in turn, takes precedence over "consumer priority indicator 1." In one example implementation, predetermined rules govern the resource allocation process based on these consumer priority levels. In some embodiments, network consumers tagged with "consumer priority indicator 1" share the bandwidth of a specific band. In some embodiments, when the utilized bandwidth of the band exceeds a predetermined threshold, the bandwidth will be allocated, either wholly or partially, to network consumers tagged with "consumer priority indicator 2." This allocation ensures their QoS satisfaction, such as achieving the required maximum throughput. In some embodiments, the band or a portion thereof can be exclusively reserved for network consumers tagged with "consumer priority indicator 3" to guarantee their QoS satisfaction. It should be emphasized that the classification and tagging process described herein are merely illustrative, and alternative methods, accommodating additional priority levels or variations, are also within the scope of this disclosure.

Figure 4C:
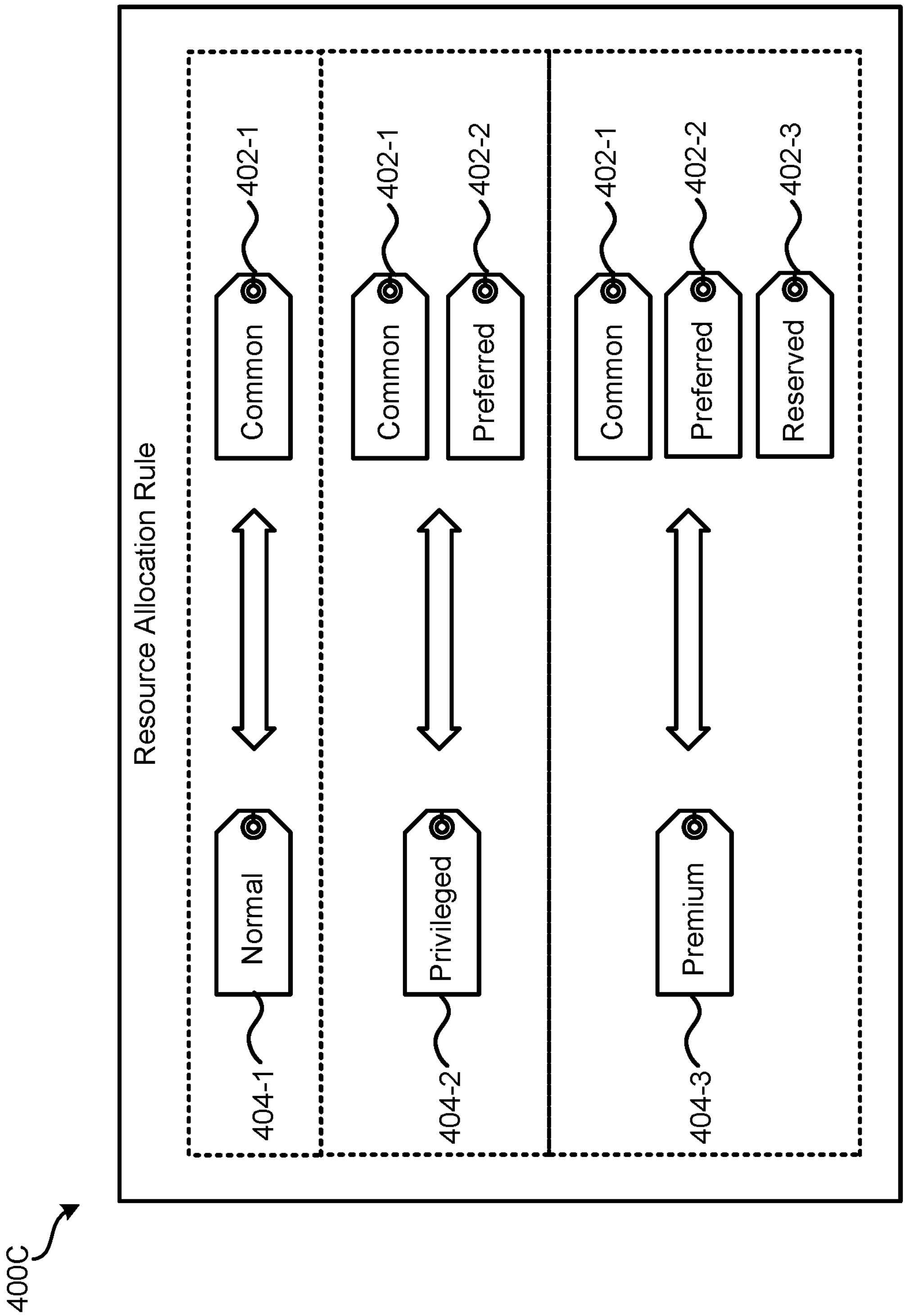
FIG. 4C illustrates an example rule for resource allocation according to various embodiments.

FIG. 4C illustrates an example of rule 400C for resource allocation according to various embodiments. Rule 400C may be stored in database 265 of the RAN slice creation and management system 203 of FIG. 2C. In the illustrated example, rule 400C defines different associations between the consumer priority indicators 404 and the QoS priority indicators 402 and establishes a mapping between them. For example, consumer class indicator 1 corresponds to QoS priority indicator 1, which indicates that network consumers tagged with consumer class indicator 1 will share the bandwidth of a specific band assigned to other network consumers. However, QoS guarantees are not provided during peak load conditions. Similarly, consumer class indicator 2 corresponds to both QoS priority indicator 1 and QoS priority indicator 2. In this scenario, network consumers tagged with consumer class indicator 2 will share the bandwidth of a designated band along with other network consumers. However, during periods of high bandwidth utilization, more bandwidth resources will be allocated to these network consumers at the expense of those with lower consumer priority levels (e.g., consumer priority indicator 1). Consumer priority indicator 3 corresponds to QoS priority indicator 1, QoS priority indicator 2, and QoS priority indicator 3. This signifies that the band, or a specific portion of it, can be exclusively reserved for these network consumers. In this case, bandwidth resources are guaranteed for network consumers with consumer class indicator 3, even if other network consumers experience peak demand or congestion. It should be noted that this correspondence rule is just an illustrative example, and different mappings and associations between consumer priority indicators and QoS priority indicators can be defined depending on the specific requirements and policies of the network.

FIG. 4D illustrates an example of an allocation profile 400D according to various embodiments. The allocation profile 400D, which contains the associations between consumer priority indicators and QoS priority indicators, can be stored in the database 265 of the RAN slice creation and management system 203, as depicted in FIG. 2C. The allocation profile 400D may serve as a reference and guideline for the resource allocation process during network service provisioning for different network consumers. The RAN slice creation and management system 203 can access and utilize the allocation profile 400D to determine the appropriate QoS priority level based on the consumer priority indicators assigned to each network consumer and apply the corresponding QoS policies and resource allocation rules to meet the specific QoS requirements of the network consumers, such that fair and efficient resource utilization across network consumers can be achieved.

In the illustrated allocation profile 400D, the resource allocation for the RAN slices and the associated bands is described based on the consumer priority indicators and QoS priority indicators. Network consumer 1 is assigned to RAN slice 1, which is allocated band 1 and band 2. Network consumer 2 is assigned to RAN slice 2, which is also allocated band 1 and band 2. Network consumer 3 is assigned to RAN slice 3, which is allocated band 1, band 2, and band 3.

Each network consumer is tagged with a specific consumer priority indicator that represents their priority level and QoS attributes/requirements. Network consumer 1 is tagged with the first consumer priority indicator (normal), indicating normal outdoor coverage and no guaranteed maximum throughput. Network consumer 2 is tagged with the second consumer priority indicator (privileged), indicating normal outdoor coverage and a guaranteed maximum throughput of 5 Mbps during load. Network consumer 3 is tagged with the third consumer priority indicator (premium), indicating extended outdoor and indoor coverage and a guaranteed maximum throughput of 10 Mbps at all times.

The predetermined rules in the allocation profile 400D further specify the qualification of the network consumers for bandwidth allocation, based on their consumer priority indicators and QoS priority indicators. For example, band 1 and band 2, carrying the first level QoS priority indicator (common), are allocatable to network consumer 1. Band 1 and band 2, carrying both the first level QoS priority indicator (common) and the second level QoS priority indicator (preferred), are allocatable to network consumer 2. Band 1, carrying the first level QoS priority indicator (common), the second level QoS priority indicator (preferred), and the third level QoS priority indicator (reserved), is allocatable to network consumer 3. Band 2, carrying the first level QoS priority indicator (common), is also allocatable to network consumer 3. Band 3, carrying the first level QoS priority indicator (common) and the third level QoS priority indicator (reserved), is exclusively allocatable to network consumer 3.

Figure 4E:
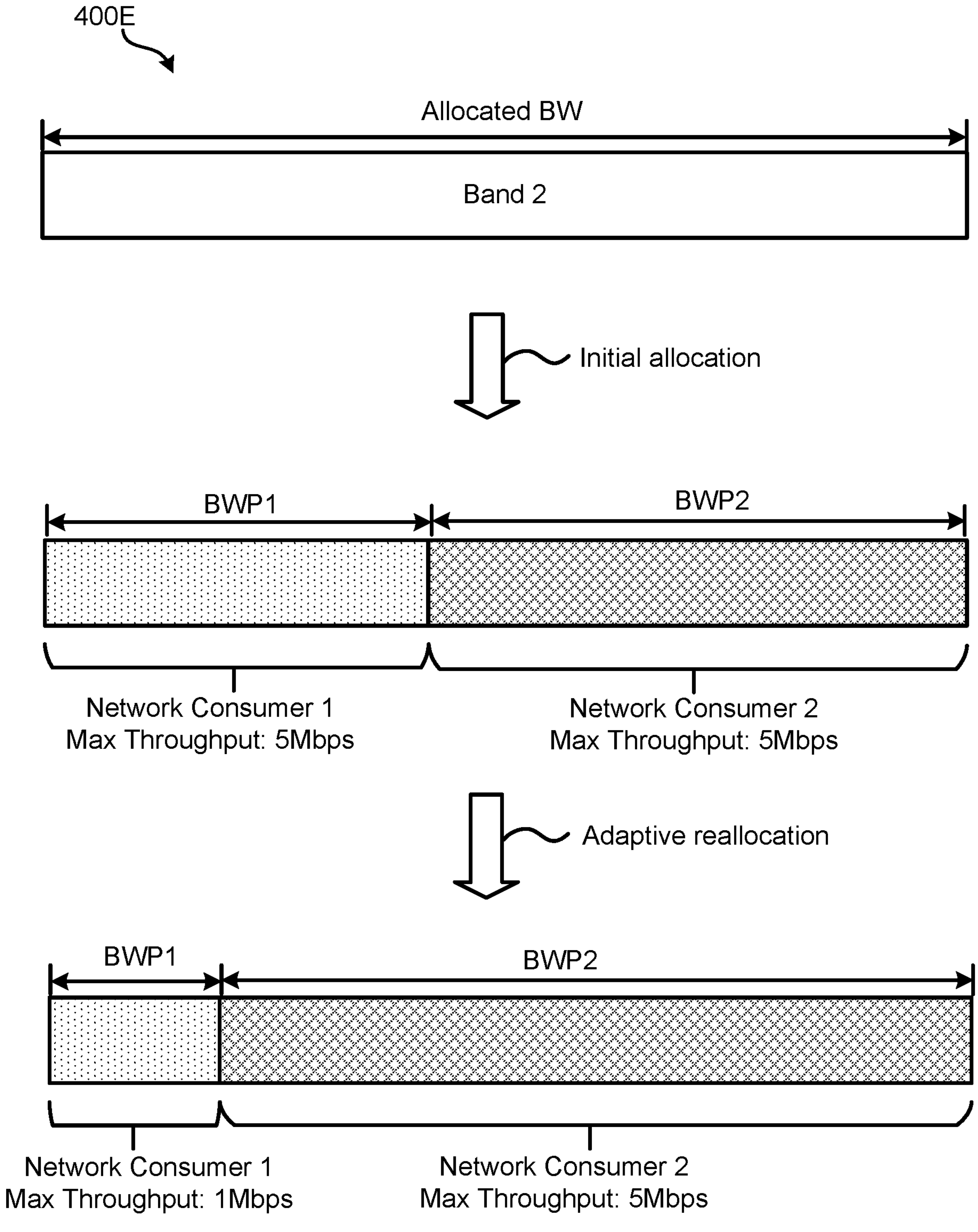
FIG. 4E illustrates an example of bandwidth allocation process according to various embodiments.

FIG. 4E illustrates an example of a resource allocation process 400E according to various embodiments. The resource allocation process 400E may follow the allocation profile 400D, which establishes the correspondences between the consumer priority indicators and QoS priority indicators for each network consumer and the associated bands. In the illustrated example, band 2 is shared by network consumer 1 carrying the first consumer priority indicator (normal) and network consumer 2 carrying the second consumer priority indicator (privileged). Initially, an allocation process is performed to divide band 2 into two portions: BWP1 and BWP2. BWP1 is allocated to network consumer 1, and BWP2 is allocated to network consumer 2. This initial allocation ensures that both network consumers can achieve their maximum throughput of 5 Mbps. When the total bandwidth usage of band 2 reaches or exceeds a predetermined threshold (e.g., 90% of the total bandwidth of band 2), network consumer 2 demands more bandwidth to maintain its guaranteed maximum throughput. In response to the demand by network consumer 2, an adaptive reallocation process is triggered. During this process, additional bandwidth from band 2 is reallocated to network consumer 2, increasing the size of BWP1, at the expense of network consumer 1, reducing the size of BWP2. This reallocation allows network consumer 2 to still achieve its guaranteed maximum throughput of 5 Mbps, even when the overall bandwidth usage of band 2 is at its limit.

Figure 4F:
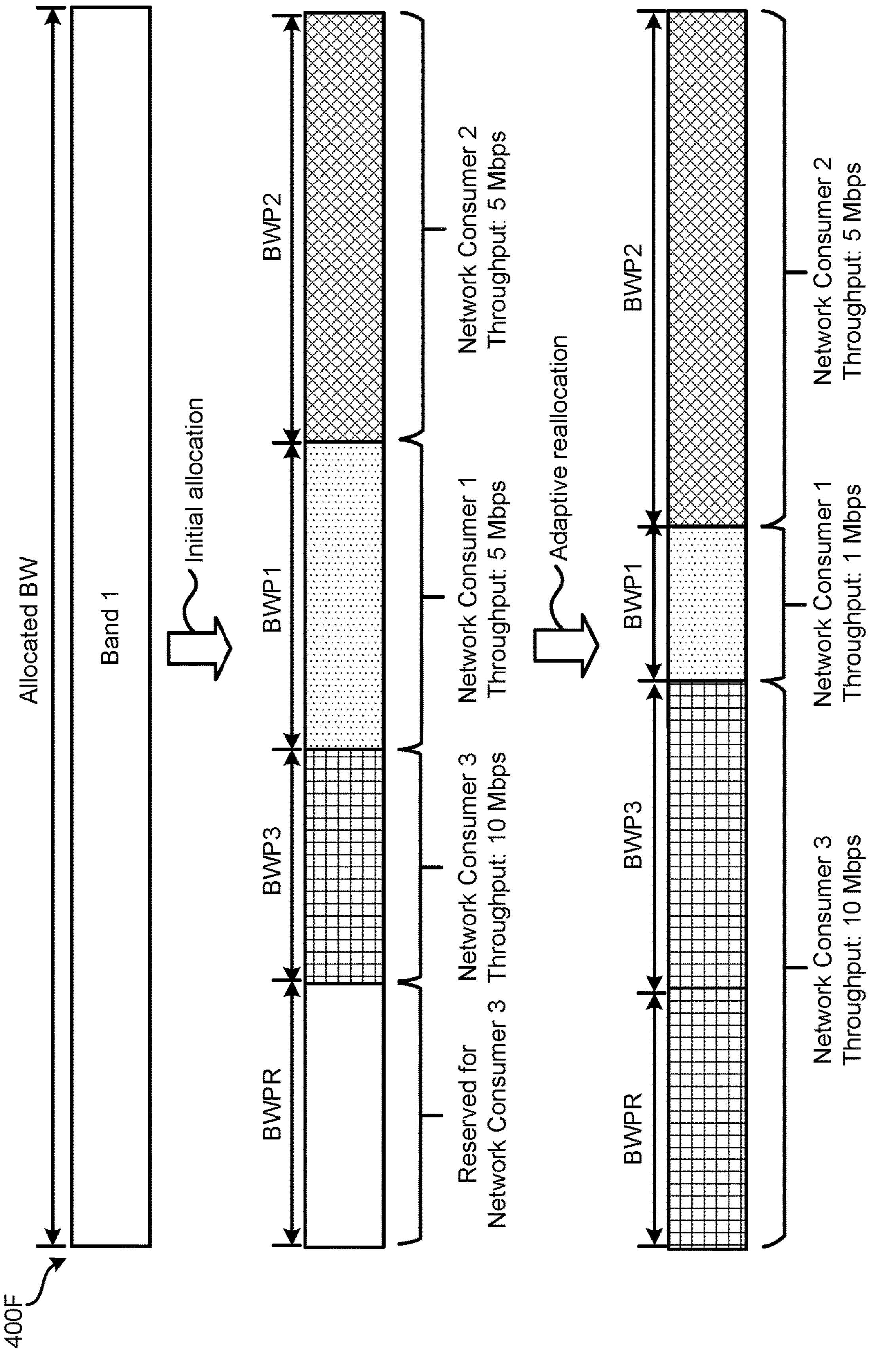
FIG. 4F illustrates another example of bandwidth allocation process according to various embodiments.

FIG. 4F illustrates another example of a resource allocation process 400F according to various embodiments. The resource allocation process 400F may follow the allocation profile 400D. In the illustrated example, the allocation of band 1 is shared among three network consumers with different consumer priority indicators: network consumer 1 (normal), network consumer 2 (privileged), and network consumer 3 (premium). Initially, an allocation process divides band 1 into four portions: BWP1, BWP2, BWP3, and BWPR. BWP1 is allocated to network consumer 1, BWP2 is allocated to network consumer 2, and BWP3 is allocated to network consumer 3. Additionally, a portion of band 1, BWPR, is reserved exclusively for network consumers tagged with the third consumer priority indicator (reserved).

This initial allocation may allow all three network consumers to achieve their respective maximum throughput requirements (e.g., 5 Mbps for network consumers 1 and 2, and 10 Mbps for network consumer 3). However, when the utilized bandwidth of band 1 reaches or exceeds a predetermined level (i.e., the difference between the allocated bandwidth and the reserved portion BWPR), network consumer 3 demands more bandwidth to maintain its guaranteed maximum throughput of 10 Mbps. In response to the demand from network consumer 3, an adaptive reallocation process is initiated. During this process, the reserved portion of band 1 (i.e., BWPR) is allocated to network consumer 3 to meet its demand. If the reserved portion BWPR is insufficient, additional bandwidth from band 1 may also be reallocated to network consumer 3. Moreover, if network consumer 2 demands more bandwidth, additional bandwidth from band 1 may be reallocated to network consumer 2, further impacting network consumer 1.

The reallocation process may result in increased bandwidth allocated to network consumer 3 (i.e., the sum of BWPR and increased BWP3), increased bandwidth allocated to network consumer 2 (i.e., increased BWP2), and reduced bandwidth allocated to network consumer 1 (i.e., reduced BWP1). This reallocation ensures that network consumer 3 maintains its guaranteed maximum throughput of 10 Mbps at all times, and network consumer 2 maintains its guaranteed maximum throughput of 5 Mbps, even when the overall bandwidth usage of band 1 is at its limit.

Figure 5A:
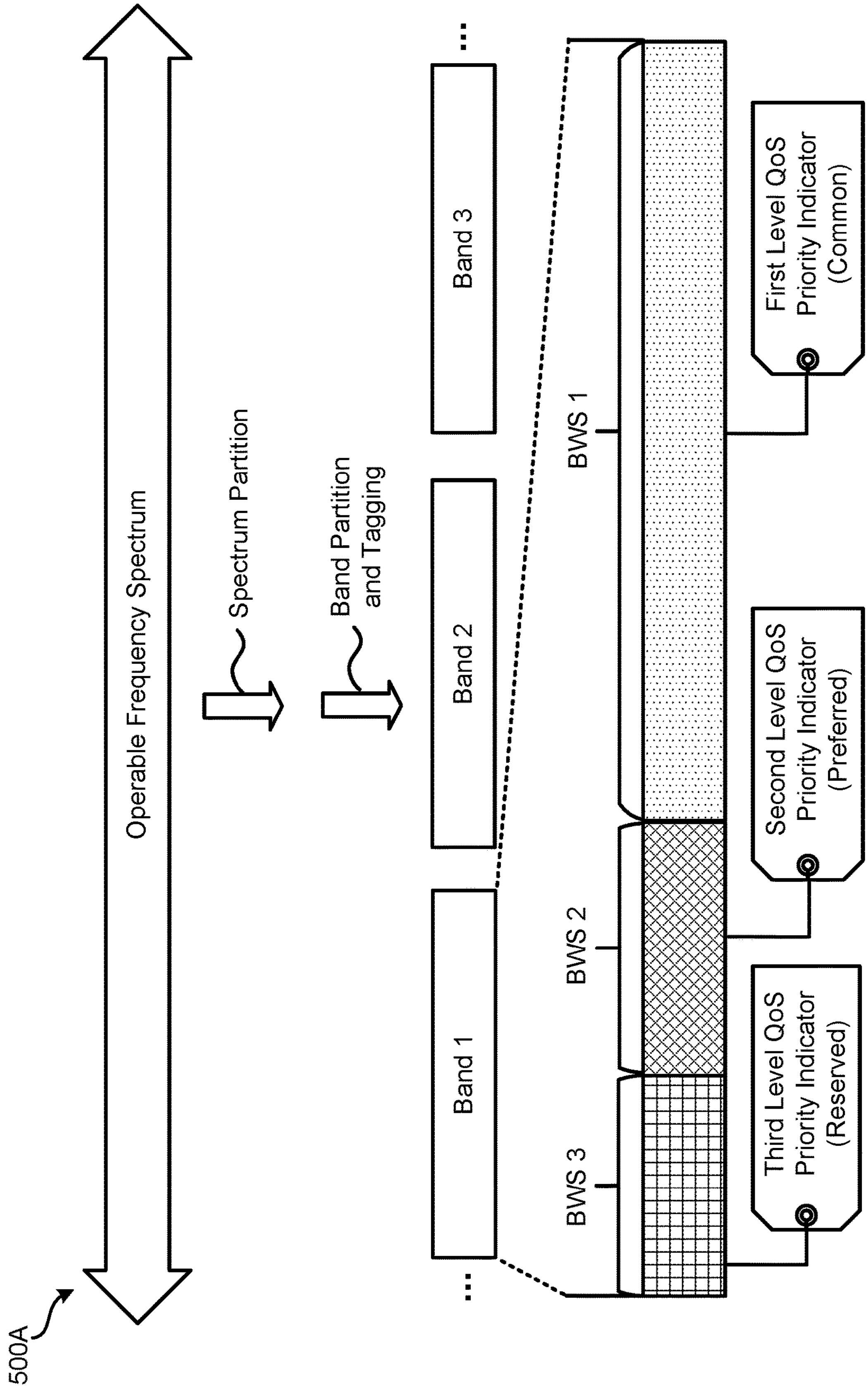
FIG. 5A illustrates another example of bandwidth allocation process according to various embodiments.

FIG. 5A illustrates another example of a resource allocation process 500A according to various embodiments. In the illustrated example, the resource allocation process 500A includes a spectrum partition process, where the operable frequency spectrum is divided into multiple bands: band 1, band 2, and band 3. Following the spectrum partition process, a band partition and tagging process is performed to further divide each band into multiple bandwidth segments (BWS) or bandwidth portions (BWP). BWS and BWP are used interchangeably in the present disclosure. The multiple BWS may include BWS1, BWS2, and BWS3. Each BWS is then tagged with a specific QoS priority indicator, which indicates the priority level of the bandwidth segment for resource allocation. For example, BWS1 carries the first level QoS priority indicator (common). This means that BWS1 is allocatable to and sharable by all RAN slices (e.g., network consumers carrying the first level consumer priority indicator (normal)). These network consumers, with normal priority, will utilize and share the bandwidth segment according to their demand. BWS2, on the other hand, carries the second level QoS priority indicator (preferred). BWS2 is only allocatable to qualified RAN slices (e.g., network consumers carrying the second level of consumer priority indicator (privileged)). During periods of high load, BWS2 will be allocatable to the second class of network consumers to guarantee the maximum throughput requirements on demand. BWS3 carries the third level QoS priority indicator (reserved) and is exclusively reserved for and allocatable to a certain group of qualified RAN slices (e.g., network consumers carrying the third level consumer priority indicator (premium)). The RAN slices associated with premium network consumers will always receive the guaranteed maximum throughput allocated to BWS3. Predetermined priority rules may govern the assignment of each BWS to the corresponding network consumers based on their priority levels and QoS requirements under predefined conditions.

FIG. 5B illustrates an example of an allocation profile 500B according to various embodiments. The allocation profile 500B is similar to the allocation profile 400D. In the illustrated example, network consumer 1 is assigned to RAN slice 1, network consumer 2 is assigned to RAN slice 2, and network consumer 3 is assigned to RAN slice 3. Band 1 is assigned to RAN slices 1, 2, and 3. In particular, BWS 1 of band 1 is assigned to RAN slices 1, 2, and 3, BWS 2 of band 1 is assigned to RAN slices 2 and 3, and BWS 3 is assigned to RAN slices 3. BWS1 carries the first level QoS priority indicator (common), BWS2 carries the second level QoS priority indicator (preferred), and BWS3 carries the third level QoS priority indicator (reserved).

A predetermined rule applicable to the allocation profile 500B may specify the dynamic allocation of BWPs and adjustment of bandwidth for each RAN slice based on the QoS priority indicators associated with each RAN slice. For example, BWS1 carrying the first level QoS priority indicator (common) is shared by RAN slices 1, 2, and 3. BWS2 carrying the second level QoS priority indicator (preferred) is allocatable to RAN slices 2 and 3 under conditions. Band 3 carrying the third level QoS priority indicator (reserved), is reserved exclusively for RAN slice 3 and is allocatable to RAN slice 3 one demand.

Figure 5C:
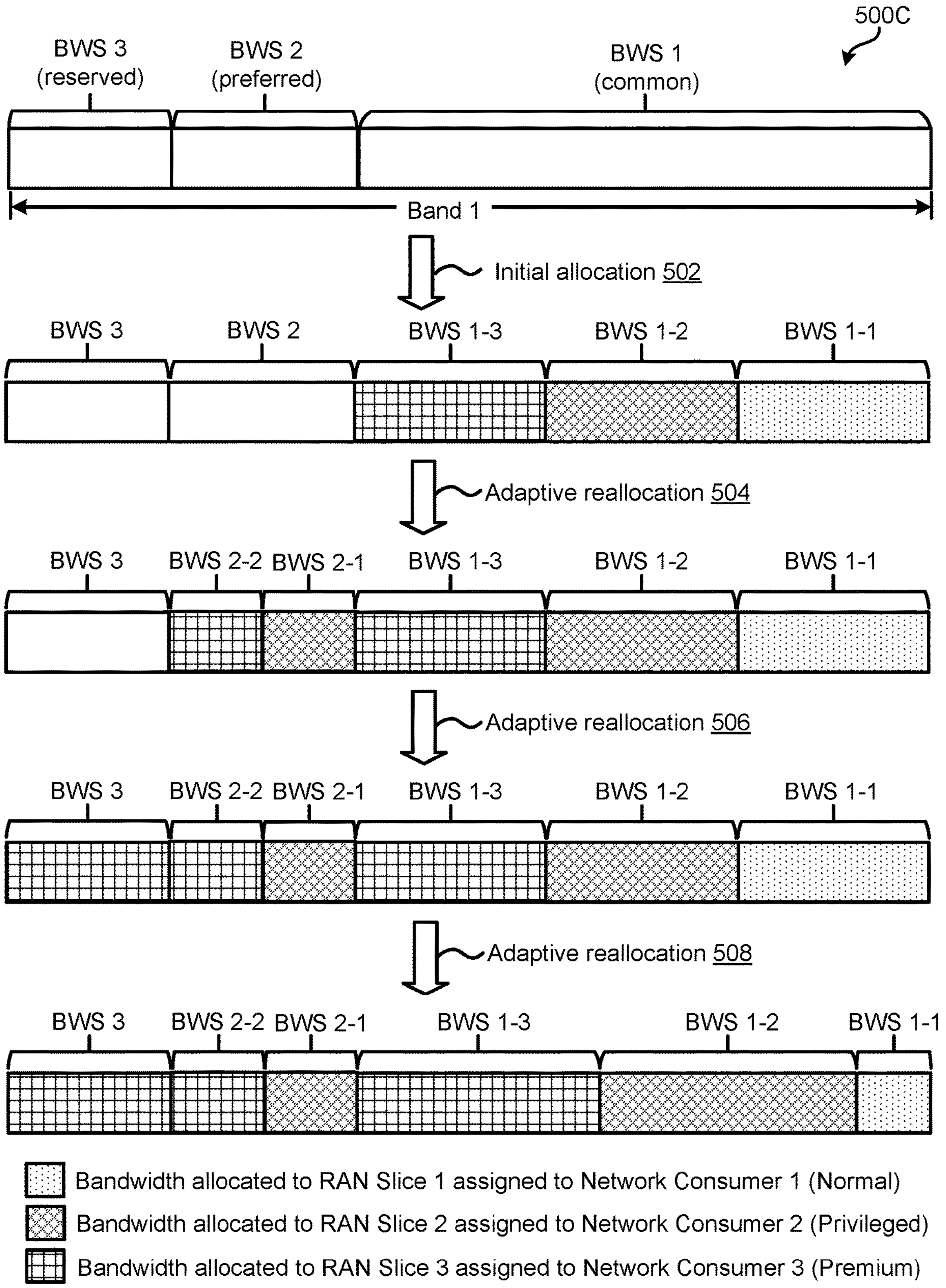
FIG. 5C illustrates another example of bandwidth allocation process according to various embodiments.

FIG. 5C illustrates another example of resource allocation process 500C according to various embodiments. The resource allocation process 500C may follow the allocation profile 500B. In the illustrated example, the process 500C may include steps 502, 504, 506, and 508. The process 500C begins with performing an initial allocation at 502, where BWS1, carrying the first level QoS priority indicator (common), is assigned to RAN slices 1, 2, and 3. BWS1 is further divided into three allotments (i.e., sub-segments of the BWS): BWS1-1, BWS1-2, and BWS1-3, and each allotment is respectively allocated to RAN slices 1, 2, and 3. At this stage, maximum throughput for each RAN slice is achieved.

When the total bandwidth usage of BWS1 by RAN slices 1, 2, and 3 reaches or exceeds a predetermined threshold (e.g., 90% of the total bandwidth of BWS1) or reaches its full capacity, and RAN slices 2 and 3 demand more bandwidth, an adaptive reallocation process may be performed at 504. BWS2 carrying a second level QoS priority indicator (preferred) is allocated to RAN slice 2 and RAN slice 3 to meet the demand of RAN slices 2 and 3, both are qualified for reallocation of additional bandwidth (e.g., RAN slices 2 and 3 are associated with the second level consumer priority indicator carried by network consumers 2 and 3). For instance, BWS2 may be further divided into two allotments, BWS2-1 and BWS2-2, which are respectively allocated to RAN slice 2 and RAN slice 3. Allocation of the three allotments BWS1-1, BWS1-2, and BWS1-3 of BWS 1 remains unchanged. As a result, RAN slice 1 retains BWS1-1, RAN slice 2 gains increased total bandwidth (BWS1-2 and BWS2-1), and RAN slice 3 gains increased total bandwidth (BWS1-3 and BWS2-2). Maximum throughput for RAN slices 2 and 3 is guaranteed.

When the total bandwidth usage of BWS2 by network consumers 2 and 3 reaches or exceeds a predetermined threshold (e.g., 90% of the total bandwidth of BWS2) or reaches its full capacity, and the allocation at the previous stage cannot meet the demand for RAN slice 3, a further adaptive reallocation process is initiated at 506. The reserved BWS3 or a portion thereof is allocated to RAN slice 3. Consequently, RAN slice 3 now has additional bandwidth (BWS1-3, BWS2-2, and BWS3). Maximum throughput for RAN slice 3 is guaranteed.

In the event that the total bandwidth usage of BWS3 reaches or exceeds a predetermined threshold (e.g., 90% of the total bandwidth of BWS3) or the allocation at the previous stage cannot meet the demand for RAN slices 2 and 3, another adaptive reallocation process may be performed at 508. An allotment or a portion thereof from BWS1 is allocated to RAN slices 2 and 3. For example, a portion of allotment BWS1-1 currently allocated to and used by RAN slice 1 can be reallocated to RAN slices 2 and 3. In other words, allotments BWS1-3 and BWS1-2 are increased in bandwidth at the expense of BWS1-1. As a result, maximum throughput for RAN slices 2 and 3 can be guaranteed.

FIG. 6A illustrates an example of an allocation profile 600A according to various embodiments. In the illustrated example, the allocation profile 600A defines association of consumer priority indicators and RAN slices in different time slots. Each time slot corresponds to a specific period during which network resources are allocated based on the consumer priority indicators. For example, in time slot 1, RAN slice 1 (assigned to network consumer 1) is associated with the "normal" consumer priority indicator, RAN slice 2 (assigned to network consumer 2) is associated with the "privileged" consumer priority indicator, RAN slice 3 (assigned to network consumer 3) is associated with the "normal" consumer priority indicator, and RAN slice 4 (assigned to network consumer 3) is associated with the "privileged" consumer priority indicator. During this time slot, the resource allocation process will prioritize the resource distribution accordingly based on the consumer priority levels.

In time slot 2, the allocation profile changes, and RAN slice 2 is now associated with the "normal" indicator, RAN slice 3 is associated with the "premium" indicator, and RAN slice 4 is associated with "normal" indicator, and RAN slice 2 remains unchanged. This means that in time slot 2, network consumer 3 will be treated as a highest-priority consumer compared to time slot 1. The allocation profile 600A may further change in subsequent time slots to dynamically assign different consumer priority indicators to different network consumers.

FIG. 6B illustrates another example of allocation profile 600B according to various embodiments. In the illustrated example, different QoS priority indicators are assigned to different RAN slices in different time slots, indicating the priority level of each RAN slice for specific frequency bands. The allocation profile 600B defines how the frequency bands are allocated to RAN slices based on their priority levels at different times. For example, band 1 carries the "common" QoS priority indicator and is assigned to RAN slices 1, 2, and 3 at all time slots. This means that band 1 is shared among all three RAN slices, and each RAN slice has access to band 1 during all time slots. Band 2 carries the "common" QoS priority indicator and also assigned to RAN slices 1, 2, and 3 at all time slots. Similar to band 1, band 2 is shared among all three RAN slices and is accessible by each RAN slice at all time slots. Band 1 and band 2 also carry the "preferred" QoS priority indicator and are assigned to RAN slice 2 for time slot 2 and RAN slice 3 for time slot 1. During these specific time slots, RAN slice 2 and RAN slice 3 have a higher priority to access band 1 and band 2 compared to other time slots. Band 3 carries both the "common" and "preferred" QoS priority indicators and is assigned to RAN slice 3 at all time slots. This means that during all time slots, RAN slice 3 has a higher priority to access band 3 compared to the other RAN slices. Band 3 also carries the "reserved" QoS priority indicator and is assigned to RAN slice 3 for time slot 2. During this specific time slot, RAN slice 3 has exclusive access to band 3 due to its "reserved" priority.

Figure 7A:
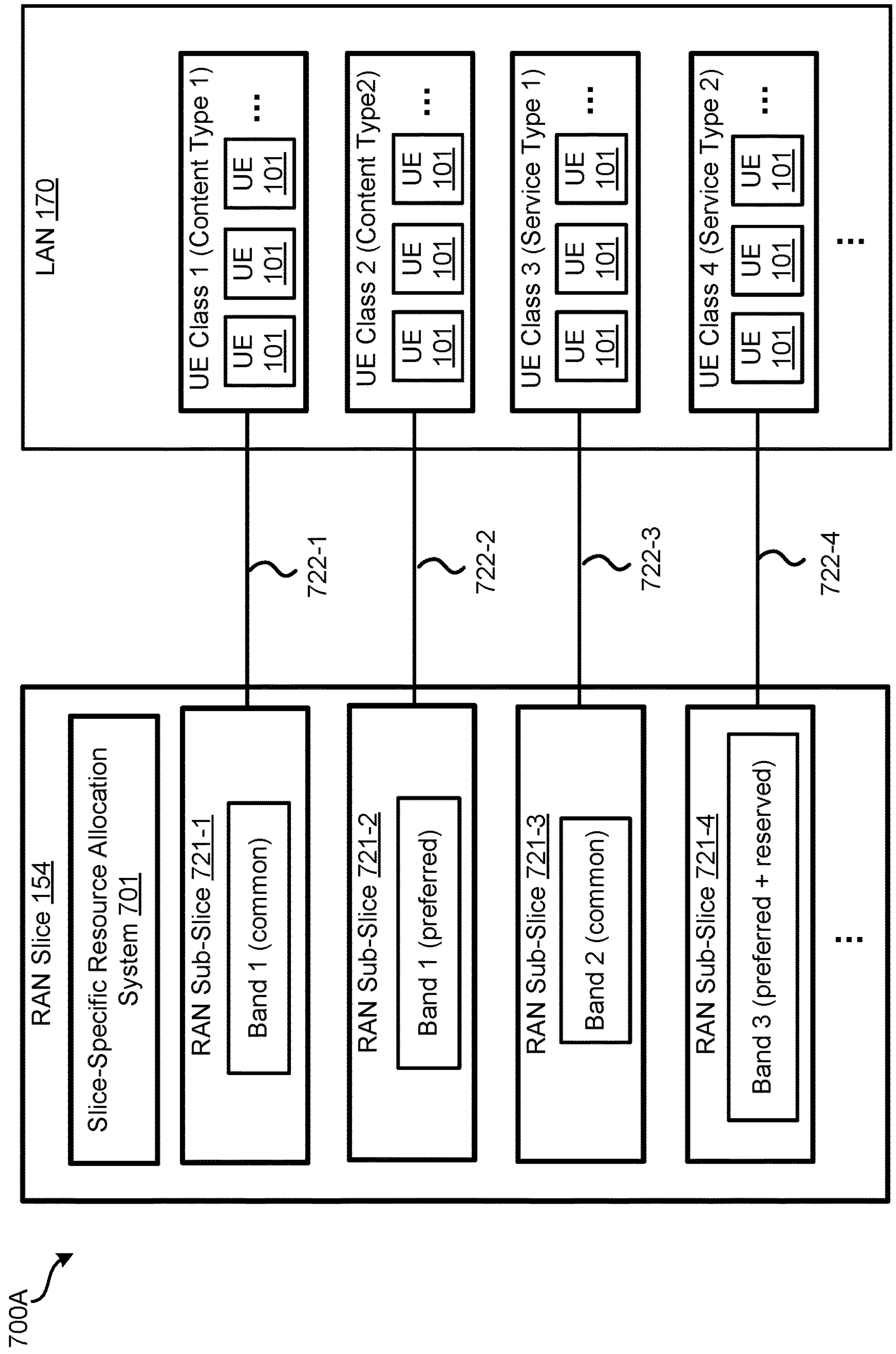
FIG. 7A is a schematic diagram illustrating a communications system for slice-specific resource allocation according to various embodiments.

FIG. 7A is a schematic diagram illustrating a communications system 700A for slice-specific resource allocation according to various embodiments. In the illustrated example, the communications system 700A includes, among other components, a specific RAN slice 154, the system 701, and LAN 170. The RAN slice 154 is assigned to a specific network consumer, and the LAN 170 provides UEs 101 associated with the network consumer with access to the RAN slice 154. In some embodiments, multiple RAN sub-slices 721 (e.g., 721-1, 721-2, 721-3, 721-4) are generated and respectively assigned to multiple groups of UEs 101 of the same characteristic, such as UE type, service type, application type, or content type. Generation and assignment of RAN sub-slices may be performed by the system 701. The system 701 may reside within the RAN slice creation and management system 203 or operate as an independent system.

"Network sub-slices" used herein refer to specialized and isolated network segments within a network slice, which is a virtual network partition in a 5G network infrastructure. RAN sub-slices are also referred to RAN network segments within one specific RAN slice. RAN sub-slices further divide the allocated resources of a RAN slice to cater to specific user categories, device types, service types, or application types. Each RAN sub-slice operates with its own dedicated bands, allotments of band, bandwidth, QoS attributes, and network operational parameters, such that resource utilization can be further optimized and performance characteristics for different groups of users or applications can be tailored within the same RAN slice. The hierarchical division of RAN slice may further enhance the slice-specific network performance efficiency, customization, and support for diverse use cases while maintaining isolation and efficient management of network resources.

In the communications system 700A, each RAN sub-slice 721 can be assigned one or more bands, BWPs, allotments of BWP, and each band or BWP can be tagged with a specific QoS priority indicator. The QoS priority indicators, such as "common," "preferred," or "reserved," determine the priority and level of resource allocation for the different classes of UE 101 associated with the network consumer within the RAN slice 154. A predetermined classification/assignment profile may be used to establish connections of UEs of different classes with different RAN sub-slices 721 via isolated network traffic 722 (e.g., 722-1, 722-2, 722-3, and 722-4). The network traffic isolation allows for tailored resource allocation and efficient utilization of bandwidth resources among the classes of UEs of the same network consumer within the corresponding RAN slice.

Figure 7B:
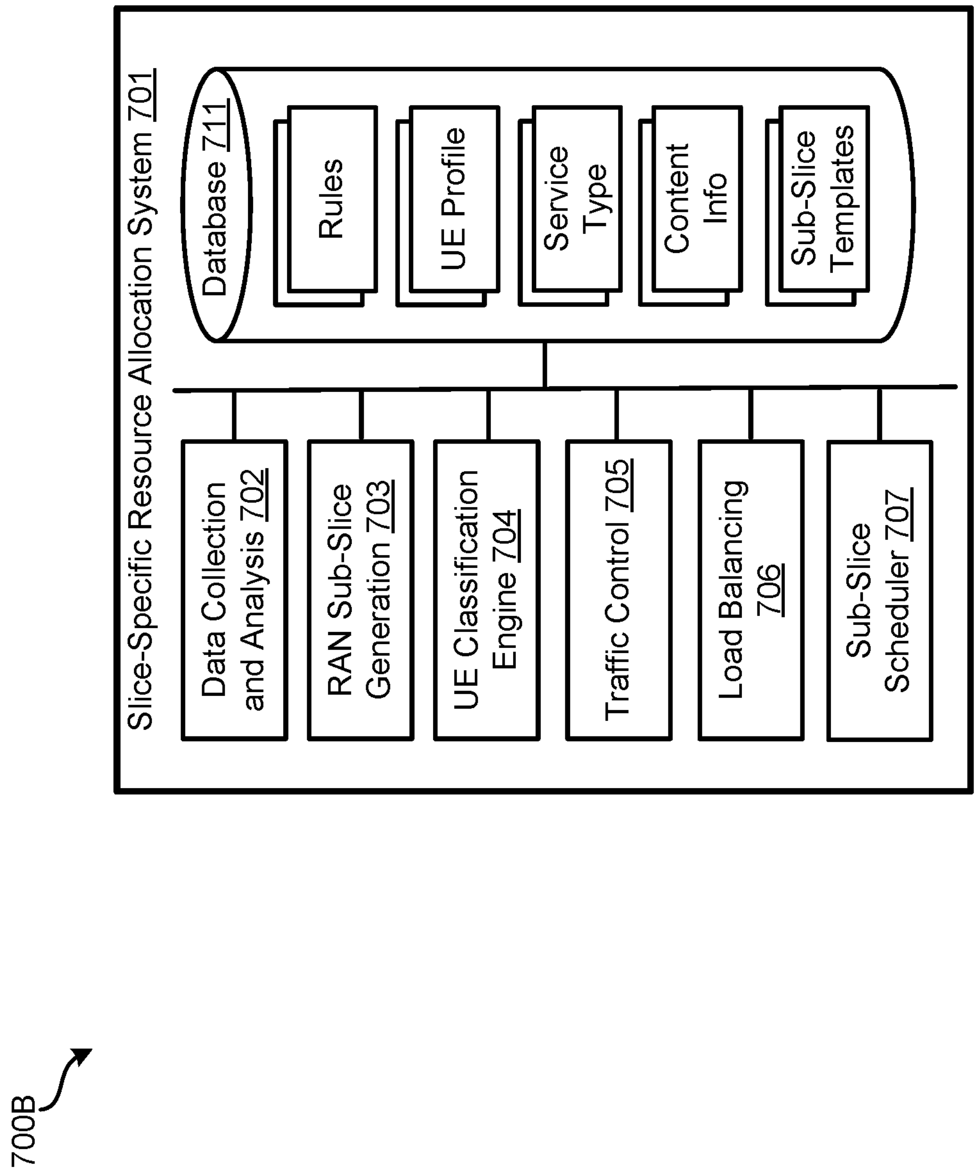
FIG. 7B is a schematic diagram illustrating an example of the slice-specific resource allocation system according to various embodiments.

FIG. 7B is a schematic diagram illustrating an example of the slice-specific resource allocation system 701 (hereinafter "system 701"). In the illustrated example, the system 701 includes, among other components, a data collection and analysis engine 702, a RAN sub-slice generation engine 703, a UE classification engine 704, a traffic control engine 705, a load balancing engine 706, a sub-slice scheduler 707, and a database 711. The data collection and analysis engine 702 is responsible for gathering and analyzing data pertaining to the performance of each individual UE 101 within the RAN slice 154. It monitors various metrics and parameters related to the UEs' interactions with the network and their usage patterns. The engine 702 may continuously monitor the performance metrics of each UE 101, such as signal strength, data transfer rates, latency, packet loss, and other performance metrics. The engine 702 may also track the amount of bandwidth used by each UE 101 and analyzes how the bandwidth is distributed across different services and applications. The engine 702 may further analyze the traffic patterns of each individual UE 101 and gain insights into the types of applications being used and the peak usage periods. Various performance data including throughput data, bandwidth usage data, service type data, application type data, traffic patterns data, etc., for each UE 101 may be stored in database 711.

The RAN sub-slice generation engine 703 is responsible for generating RAN sub-slices within the RAN slice 154. In some embodiments, the RAN sub-slice generation engine 703 may generate new RAN sub-slices within the RAN slice 154, based on UE profiles, service types, content types, application types, available bandwidth resources, among other factors. In some embodiments, the RAN sub-slice generation engine 703 uses predetermined RAN sub-slice templates stored in the database 711 to generate RAN sub-slice instances. In some embodiments, new RAN sub-slice templates may also be generated for new UEs 101 associated with the RAN slice 154.

The UE classification engine 704 is responsible for classifying various UEs 101 associated with the RAN slice 154 and/or tagging each UE 101 with a UE priority indicator (similar to the consumer priority indicator used for classification of network consumers), based on various factors such as UE type, service type, content type, application type, among others. In some embodiments, the UE classification engine 704 identifies the type of each UE, such as smartphones, tablets, IoT devices, etc. Different UE types may have distinct QoS requirements and capabilities. The UE classification engine 704 may also classify the type of service requested by each UE, such as voice calls, video streaming, web browsing, gaming, etc. Different services have varying bandwidth, latency, and QoS demands. The UE classification engine 704 may also analyze the content being accessed or transmitted by each UE 101 through RAN slice 154, distinguishing between multimedia content, text data, real-time applications, etc.

The traffic control engine 705 is responsible for managing and controlling the traffic flow within the RAN slice 154, routing the network traffic to the appropriate RAN sub-slices 721 based on UE classification. In some embodiments, the engine 705 classifies the incoming traffic from UEs 101 within each RAN sub-slice based on various attributes, such as service type, application type, QoS requirements, and UE priority indicators. The traffic control engine 705 enforces the predetermined policies for each RAN sub-slice, such that the allocated bandwidth, throughput, and other QoS attributes are met for each UE based on their UE priority indicator.

The load balancing engine 706 is responsible for distributing the network load across different resources and RAN sub-slices 721 within the RAN slice 154. The load balancing engine 708 can monitor the resource utilization and traffic patterns in real-time and dynamically allocate network resources to maintain balanced utilization across the RAN sub-slices 721. When multiple bands are assigned to the RAN sub-slices 721, the load balancing engine 706 can employ various algorithms to distribute the network load among these bands to maintain balanced resource utilization and prevent congestion.

The sub-slice scheduler 707 may allocate resources and time slots to the UEs 101 or classes of UEs within each RAN sub-slice 721, coordinate the transmission and reception of data, mitigate interference among UEs within the sub-slice and with neighboring sub-slices, operate to achieve a pre-determined fairness level among UEs.

The slice-specific resource allocation may be triggered and automatically performed when certain network conditions are met. Some illustrative use cases are provided below. In one use case, an initial resource allocation is performed to allocate band 1 and band 2 to a RAN slice 1 for network consumer 1 (e.g., a low-cost mobile service provider). Network consumer 1 demands fair QoS service with a normal outdoor coverage area while managing load and congestion, based on the extracted intent from the SLAs between the network consumer and network operator. Band 1 and band 2 both carry the "common" QoS priority indicator, indicating that they are shared among the network consumers. Both band 1 and band 2 are divided into multiple bandwidth segments (BWS) to accommodate different classes of UEs. The bandwidth usage of band 1 and band 2 in real-time is continuously monitored, for example, by the traffic control engine 705 of the system 701. When the usage of band 1 reaches or exceeds 80%, and the usage of band 2 reaches or exceeds 70%, the system 701 identifies that both bands are heavily loaded. The system 701 automatically triggers the offload process to alleviate the load on band 1 and band 2 and improve spectral efficiency. The system 701 may identify available resources in neighboring RAN slices or unutilized bands within the same RAN slice. The system 701 may offload selected UEs from band 1 and/or band 2. By offloading UEs from heavily loaded bands to less congested bands, the system 701 may balance the resource utilization across the RAN slice and improves overall spectral efficiency.

In another example use case, RAN slice 2 is allocated to network consumer 2 (e.g., a premium mobile service provider), which seeks the best combination of user experience and spectral efficiency for its customers. The SLA between network consumer 2 and the network operator may specify that the QoS requirements must be met with a high level of satisfaction. Both band 1 and band 2 are tagged with the "reserved" QoS priority indicator, indicating they are exclusively reserved for premium network consumers when they demand resources. Both band 1 and band 2 may be divided into multiple bandwidth segments (BWS) to serve different classes of UEs within the RAN slice 2. The sub-slice scheduler 709 may be configured to target proportional fair scheduling for the UEs within RAN slice 2. Proportional fair scheduling aims to balance resource allocation among UEs to provide a fair distribution of resources while maximizing overall network efficiency. The data collection and analysis engine 702 may continuously monitor the performance data of band 1 and band 2, including bandwidth usage, throughput, and QoS metrics, for all UEs within RAN slice 2. The system 701 may periodically check the bandwidth usage of band 1 and band 2 in real-time. If there is an imbalance in the load between band 1 and band 2, the system 701 identifies the discrepancy. The system 701 dynamically reallocates bandwidth resources between band 1 and band 2 to achieve a balanced load. If band 1 is underutilized while band 2 is heavily loaded, the system 701 will adjust the allocation to offload some UEs from band 2 to band 1, and vice versa. By balancing the load between band 1 and band 2, the system 701 allows customers of network consumer 2 to receive an equitable distribution of network resources.

In yet another example use case, RAN slice 3 and RAN slice 4 are both assigned to network consumer 3, which is a multi-service multi-device consumer. RAN slice 3 serves a first class of UEs associated with network consumer 3, while RAN slice 4 serves a second class of UEs (i.e., Internet-of-Things (IoT) devices), which has low data usage but have specific requirements for guaranteed data delivery and low latency. In initial resource allocation, RAN slice 3 is assigned band 1 and band 2, both carrying the "common" QoS priority indicator, which is shared among RAN slices. RAN slice 4 is assigned band 1 (common), band 2 (common), and band 3 (tagged with both preferred and reserved). The sub-slice scheduler 709 is configured with a target for proportional fair scheduling for the UEs within RAN slice 4. Proportional fair scheduling aims to balance resource allocation among UEs to provide fairness in data delivery. The load balancing engine 706 is configured to equalize the load between band 1 and band 2 for RAN slice 4, such that both bands are optimally utilized and that one is not overburdened while the other remains underutilized. The data collection and analysis engine 702 continuously monitors the performance data of band 1, band 2, and band 3 within RAN slice 4, including bandwidth usage, throughput, and QoS metrics. The system 701 periodically checks the bandwidth usage of band 1 and band 2 in real-time for RAN slice 4. If the usage of band 1 and band 2 exceeds 90%, the system 701 automatically triggers an offload process. If the load of band 1 and band 2 in RAN slice 4 exceeds 90%, the reserved portion of band 3 is automatically allocated to RAN slice 4. This allocation helps in alleviating the load on bands 1 and 2 and improves spectral efficiency. If the usage of band 1, band 2, and the reserved portion of band 3 in RAN slice 4 exceeds 95%, the portion of band 3 tagged with "preferred" is allocated to RAN slice 4. This additional allocation further balances the load and ensures fair resource distribution. The system 701 is configured to prioritize low data usage, guaranteed data delivery, and low latency for IoT UEs within RAN slice 4. In other words, the system 701 weighs more on providing a fair data delivery experience for each UE, with spectral efficiency being of lesser importance for IoT UEs. The system 701 allocates band 3 tagged with "reserved" first for IoT UEs in RAN slice 4 on demand. If the load of band 3 tagged with "reserved" exceeds 95%, the system 701 allocates the band 3 portion tagged with "preferred" to RAN slice 4. If the load of band 3 tagged with "reserved" drops below 90%, the system 701 stops using band 3 tagged with "preferred" to maintain efficiency.

Figure 8:
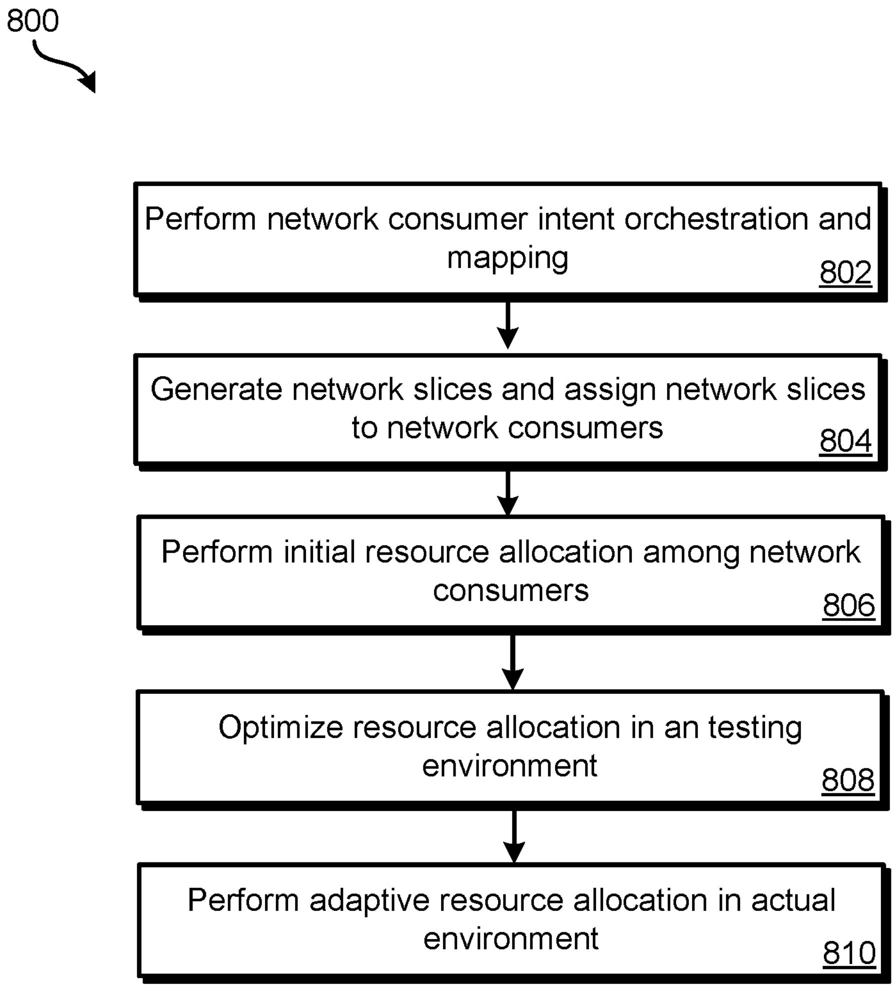
FIG. 8 is a flow diagram illustrating an example method for network slicing and resource allocation according to various embodiments.

Various methods may be performed using the systems and arrangements detailed in relation to FIGS. 1-7B. FIG. 8 is a flow diagram illustrates an example method 800 for network slicing and resource allocation according to various embodiments. Method 800 may be performed using system 100 of FIG. 1. More specifically, each step of method 800 can be performed, for example, using slice management system 201 of FIG. 1, spectrum partition and measurement device 303 of FIG. 3A, slice-specific resource allocation system 701 of FIG. 7B, or a combination thereof, or any other components included in the FIGS. 1-7B. Method 800 can also be performed using some other form of slice management system and/or resource allocation system that may function as part of, or in communication with, a cellular network. The cellular network may be a 5G network that allows for cellular network slicing and/or resource allocation. Other forms of cellular network that allow for cellular network slicing and/or resource allocation may also be possible. Depending on the implementation, the method 800 may include additional, fewer, or alternative steps performed in various orders or in parallel. Method 800 or any operations thereof may be combined with other methods described herein in any suitable manner.

At 802, network consumer intent orchestration and mapping are performed. Consumer intents are extracted from consumer inputs, and orchestration of network consumer intents is performed to generate a network consumer profile for each network consumer. The consumer intents are correlated to QoS attributes to establish a mapping between consumer expectations and corresponding QoS level.

At 804, multiple network slices are generated and respectively assigned to multiple network consumers. The multiple network slices may include multiple core network slices and multiple RAN slices. One core network slice may correspond to one or more RAN slices. Preliminary or initial allocations of network resources, encompassing frequency bands, amalgamations or combination of bands, and bandwidth allotments, are ascribed to individual network slices. In some embodiments, an initial network slice configuration profile is generated according to the preliminary or initial allocation process for the network slices.

At 806, the initial network slice configuration profile is executed to facilitate allocation of network resources among network consumers. At 808, an adaptive reallocation process is performed to optimize the initial resource allocation profile included in the network slice configuration profile. At 808, various network operational parameters are reconfigured to adjust band selection and assignment, adjust/modify combination of bands, adjust/modify bandwidth allocation for each RAN slice, and so on. Various factors may be considered in the reallocation process, including but not limited to, the consumer priority indicator carried by each network consumer, the QoS priority indicator carried by each band or a portion thereof, predetermined rules governing spectrum efficiency and fairness level of scheduling, load balancing, among others. An optimized network slice configuration profile is generated from optimization and includes an optimized resource allocation profile and reconfigured network operational parameters. At 810, the optimized network slice configuration profile is executed in an actual service-provisioning environment. In some embodiments, the network slice is a RAN slice, and the network slice configuration profile includes a RAN slice configuration profile.

Figure 9:
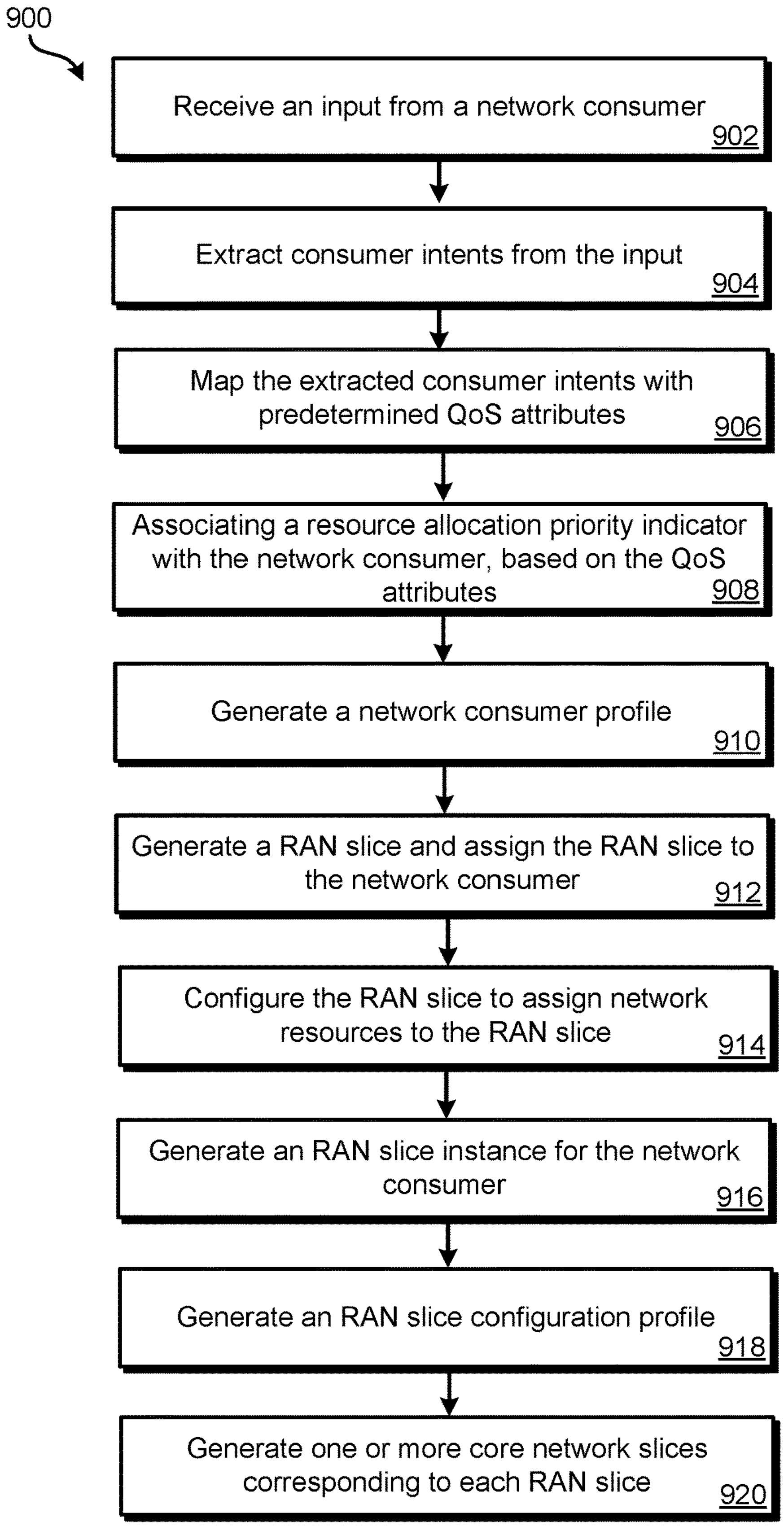
FIG. 9 is a flow diagram illustrating another example of a method for RAN slicing according to various embodiments.

FIG. 9 is a flow diagram illustrating another example of a method 900 for RAN slicing according to various embodiments. Depending on the implementation, the method 900 may include additional, fewer, or alternative steps performed in various orders or in parallel. Method 900 or any operations thereof may be combined with other methods described herein in any suitable manner. The steps/operations included in method 900 may be similar to the steps/operations of other methods or processes described in the disclosure, and the similar steps/operations will not be repeated unless otherwise indicated.

At 902, a network consumer input is received, in a RAN slice creation and management system, from a network consumer of a network. In some embodiments, the input from the network consumer may also include a request for a RAN slice. The network consumer input may be an SLA established between the network consumer and the network provider or other type of analogous information constructs including the consumer expectation for network resources, services, and performance. The input may include input data in various forms such as expressions in natural language, structured data representations, command sequences, or any other formality through which the network consumer conveys their expectations and demands on service and performance. The input data may further include the network consumer identity, service type data, UE type data, geographical location data, mobility characteristics, among others, reliability data, security data, time slot data, and traffic pattern data.

At 904, consumer intents of the network consumer are automatically extracted, by the analysis engine of the RAN slice creation and management system, from the input. The consumer intents may be recognized and separated from the input and undergo processing to further align with technical standards. In some embodiments, the process of extracting intents from consumer inputs may include transforming potentially ambiguous or natural language expressions into more formalized and standardized representations that align with technical specifications. For example, extracted intents can be normalized, by the NLP engine with the assistance of AI/ML engine, to conform to standardized terminology and language constructs in compliance with a predetermined technical specification or a set of predetermined protocols of the network operation.

In some embodiments, the extracted intents may be further parameterized to generate constituent parameters that define characteristics of the intent. For example, an intent for "real-time communication" might be parameterized into latency, jitter, coverage, reliability, data rate, and packet loss tolerance. An intent for "fair outdoor coverage and fair reliability" may be parameterized into maximum throughput and congestion limit. The extracted intents may be further transformed into measurable metrics or criteria that can be objectively assessed.

At 906, a matching process is performed, by the analysis engine of the RAN slice creation and management system, to match the extracted consumer intent and predetermined QoS attributes. In some embodiments, a RAN slice template may be identified from an inventory of RAN slice templates. The inventory of RAN slice templates may be stored in a RAN slice template repository. The identified RAN slice template may include a range of QoS attributes that are in compliance with a predetermined technical specification. Each of the QoS attributes are tailored to distinct service-level objectives. Examples of the QoS attribute include but are not limited to maximum throughput (e.g., downlink throughput and/or uplink throughput), latency, jitter, packet loss rates, voice quality (e.g., mean opinion score), video quality (e.g., video quality score), emergency call priority, access delay, handover success rate, service continuity, network accessibility, signal strength, signal-to-noise ratio, and signal-to-interference-plus-noise ratio, spectral efficiency, etc.

In some embodiments, a predetermined RAN slice template is selected from an inventory of RAN slice templates, and the RAN slice template includes a range of network operational parameters that correspond to the QoS attributes and can be configured to achieve the QoS attributes. A RAN slice instance may be generated for the network slice, based on the selected RAN slice template. The RAN slice instance includes, among other data, the configured network operational parameters for achieving the QoS attributes desired by the network consumer.

At 908, a resource allocation priority indicator is associated with the network consumer, by the tagging engine of the RAN slice creation and management system, based on the QoS attributes corresponding to the extracted consumer intent of the network consumer. The resource allocation priority indicator may be a consumer priority indicator tagged on the network consumer or a QoS priority indicator tagged on a network resource assigned to the network consumer. In some embodiments, the network resource is a band, and the resource allocation priority indicator is a bandwidth allocation priority indicator.

At 910, a network consumer profile may be generated, by the RAN slice creation and management system, for each network consumer. The network consumer profile may include various information regarding the network consumer characteristics, service requirements, intents, QoS attributes, as well as consumer priority indicators carried by the network consumer.

At 912, a RAN slice is generated, by the RAN slice generation engine. The generated RAN slice is assigned, by the RAN slice assignment engine, to the network consumer. In some embodiments, multiple RAN slices are generated and respectively assigned to the corresponding network consumers.

At 914, the RAN slice is configured, by the RAN slice configuration engine, to assign network resources to the RAN slice to be consumed by the corresponding network consumer. Various network resource types may be identified, defined, and further divided into unit share or allotment (e.g., one or more of unit shares). Each RAN slice may be assigned a certain amount of unit shares or allotments of a particular network resource. In some embodiments, multiple shares or allotments are derived from a network resource and are respectively assigned to multiple RAN slices. The relevant size of the share or allotment for each network consumer may be dynamically adjustable during operation and network service provisioning to the multiple network consumers.

At 916, a RAN instance is generated, by the RAN slice creation and management system, for the corresponding RAN slice. The RAN instance may include QoS attributes of the corresponding RAN slice template and specified network operational parameters for the RAN slice. The RAN instance may be executed during the network service provisioning and network resource allocation process. In some embodiments, multiple RAN instances are generated and orchestrated for multiple RAN slices. At 918, one or more RAN slice configuration profiles may be generated and include information regarding the allocation of network resources across the multiple RAN slices. The RAN slice configuration provides the arrangement and distribution of each of the network resources (e.g., bandwidth shares, frequency assignments, and other pertinent operational parameters). The RAN slice template, the RAN slice instance, and the RAN slice configuration profile collectively form a structured hierarchy that is used as a reference framework for dynamic network resource allocation.

At 920, one or more core network slices corresponding to each one of the RAN slices may be generated, by the core network slice creation and management system. As described above with reference to FIG. 2B, core network slices are distinct segments of the core network infrastructure that are tailored to meet the requirements and characteristics of the associated RAN slices. The core network slices are configured to handle the traffic and services originating from the respective RAN slices. The generation of core network slices may involve configuring and provisioning the necessary core network elements, functions, and core network resources to align with the demands of the associated RAN slices as well as the network consumers. In some embodiments, the RAN slices and the core network slices may be generated in a coordinated manner.

Figure 10:
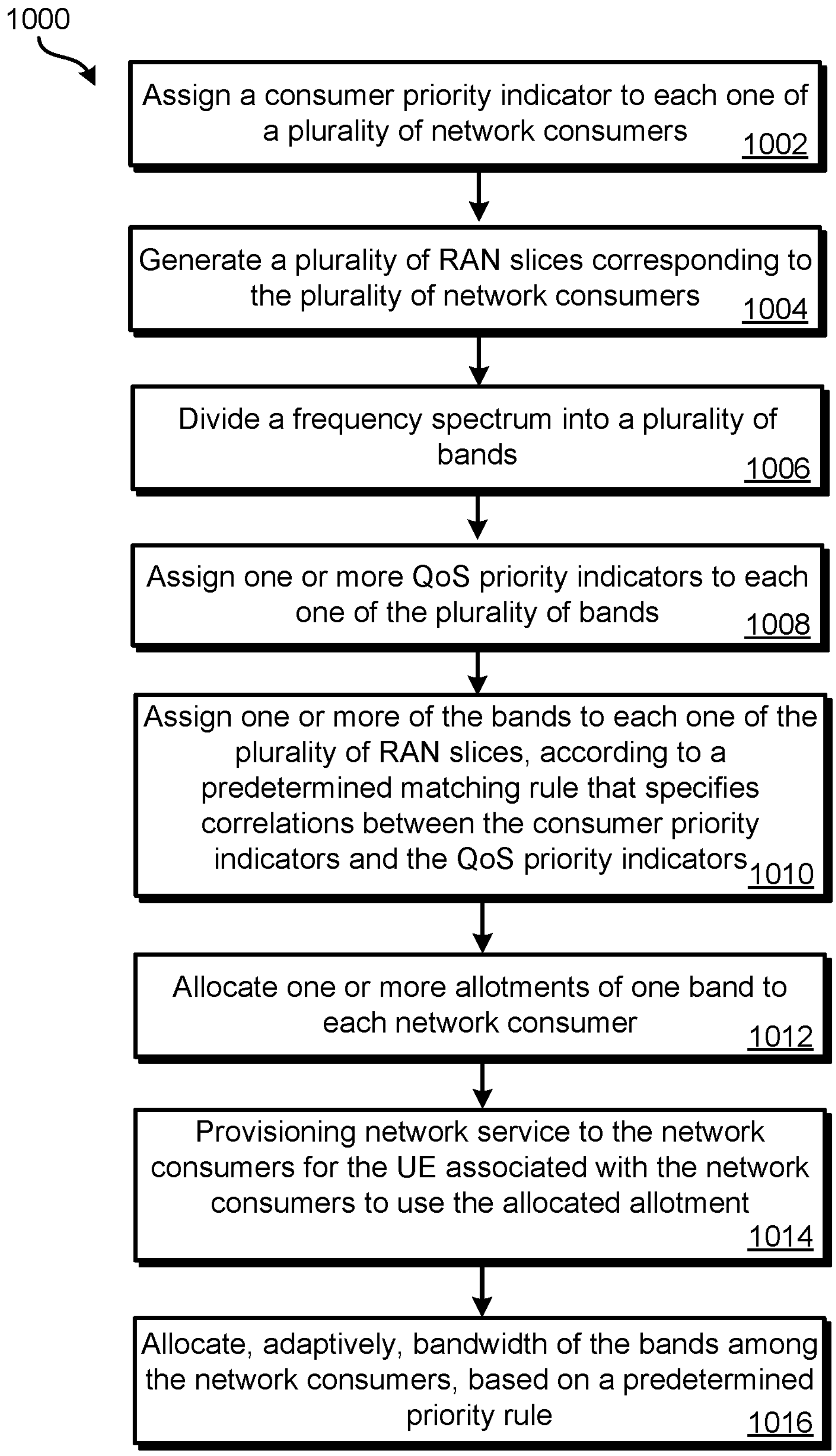
FIG. 10 is a flow diagram illustrating another example of a method for bandwidth allocation among RAN slices according to various embodiments.

FIG. 10 is a flow diagram illustrates another example of a method 1000 for bandwidth allocation among RAN slices according to various embodiments. Depending on the implementation, the method 1000 may include additional, fewer, or alternative steps performed in various orders or in parallel. Method 1000 or any operations thereof may be combined with other methods described herein in any suitable manner. The steps/operations included in method 1000 may be similar to the steps/operations of other methods or processes described in the disclosure, and the similar steps/operations will not be repeated unless otherwise indicated.

At 1002, a consumer priority indicator designating a level of priority for resource allocation and network service provisioning is assigned to each one of a plurality of network consumers of a network. In some embodiments, a plurality of time slots (e.g., a specific time interval during a day, or a specific number of days during a week, or a specific number of weeks during a month, or a specific number of months during a year, etc.) are determined, and a consumer priority indicator to each one of a plurality of network consumers for one or more of the determined time slots.

At 1004, a plurality of RAN slices are generated for the plurality of network consumers are generated. Each network consumer may be associated with one or more RAN slices to allocate dedicated network resources to different user segments or user groups within the same network consumer or different coverage areas for the same network consumer. For example, a network consumer may have a first group or devices (e.g., IoT devices) and a second group of devices (mobile communication devices). A first RAN slice is assigned to the first group of devices requiring fair throughput but extremely low latency, and a second RAN slice is assigned to the second group of devices requiring high throughput and fair latency. More than two RAN slices may be assigned to one network consumer.

At 1006, a frequency spectrum is divided, by a spectrum partition and measurement device, into a plurality of smaller frequency bands. The size (i.e., bandwidth) of each band may be adjustable. In some embodiments, an initial bandwidth is assigned to each one of the bands.

At 1008, one or more QoS priority indicators are assigned to each one of the plurality of bands. As described above with reference to FIG. 4A, the QoS priority indicators represent different priority levels guiding bandwidth allocation. At 1010, one or more of the bands are selected and assigned to each one of the plurality of RAN slices. In some embodiments, the assignment of the bands to the RAN slices may follow a predetermined matching rule that specify correlations between the consumer priority indicators and the QoS priority indicators, as described above with reference to FIG. 4C. In some embodiments, a band is divided into multiple BWPs. Each BWP is assigned with a QoS priority indicator, as described above with reference to FIG. 5A.

At 1012, one or more allotments of the one or more bands are allocated to each network consumer. The one or more allotments may belong to a particular BWP of the one or more bands, according to a predetermined allocation rule. As described above, a band may be assigned to multiple RAN slices and may have a shared BWP and a reserved BWP. The shared BWP may be shared among the multiple RAN slices and carry both a first level QoS priority indicator (common) and a second level QoS priority indicator (preferred). The reserved BWP carries a third level QoS priority indicator (reserved) and is reserved for qualified network consumers. A predetermined priority rule may specify the followings. If the band assigned to a RAN slice carries the first level priority indicator and/or the second level priority indicator, the one or more allotments belonging to the shared BWP are allocated to network consumer, and the RAN slice associated with the second level QoS priority indicator takes priority over the RAN slice associated with first level QoS priority indicator. If the band assigned to a RAN slice carries the third level priority indicator, one or more allotments belonging to the reserved BWP are allocatable to the network consumer associated with the RAN slice.

For another example, a band may be assigned to multiple RAN slices and may have first BWP, a second BWP, and a third BWP. The first BWP carries a first level QoS priority indicator (common) and is sharable among the multiple RAN slices. The second BWP carries a second level QoS priority indicator (preferred) and is allocatable to qualified RAN slices under certain conditions (e.g., during load). The third BWP carries a third level QoS priority indicator (reserved) and is reserved exclusively to qualified RAN slices. A predetermined priority rule may specify at least the followings. If the band assigned to a RAN slice carries the first level priority indicator, the one or more allotments belonging to the first BWP are allocatable to the network consumer. If the band assigned to a RAN slice carries the second level priority indicator, the one or more allotments belonging to the second BWP are allocatable to the network consumer. The RAN slice associated with the second level QoS priority indicator takes priority over the RAN slice associated with first level QoS priority indicator. If the band assigned to a RAN slice carries the third level priority indicator, one or more allotments belonging to the reserved BWP are allocatable to the network consumer associated with the RAN slice.

At 1014, network service is provisioned to the network consumers through the corresponding RAN slices assigned to the network consumers for one or more UE associated with the network consumers to use the allocated allotment of the band assigned to the RAN slices.

At 1016, bandwidth of the bands shared among the RAN slices may be allocated adaptively, by the RAN slice manager, based on a preestablished or predetermined priority rule to respectively meet QoS requirements of each network consumer. The rule may specify that one or more allotments of the band not currently allocated to a RAN slice may be allocatable to the RAN slice upon request or on demand, if the RAN slice is associated with a higher QoS priority indicator, at the expense of the RAN slices associated with a lower QoS priority indicator, under certain conditions.

Figure 11A:
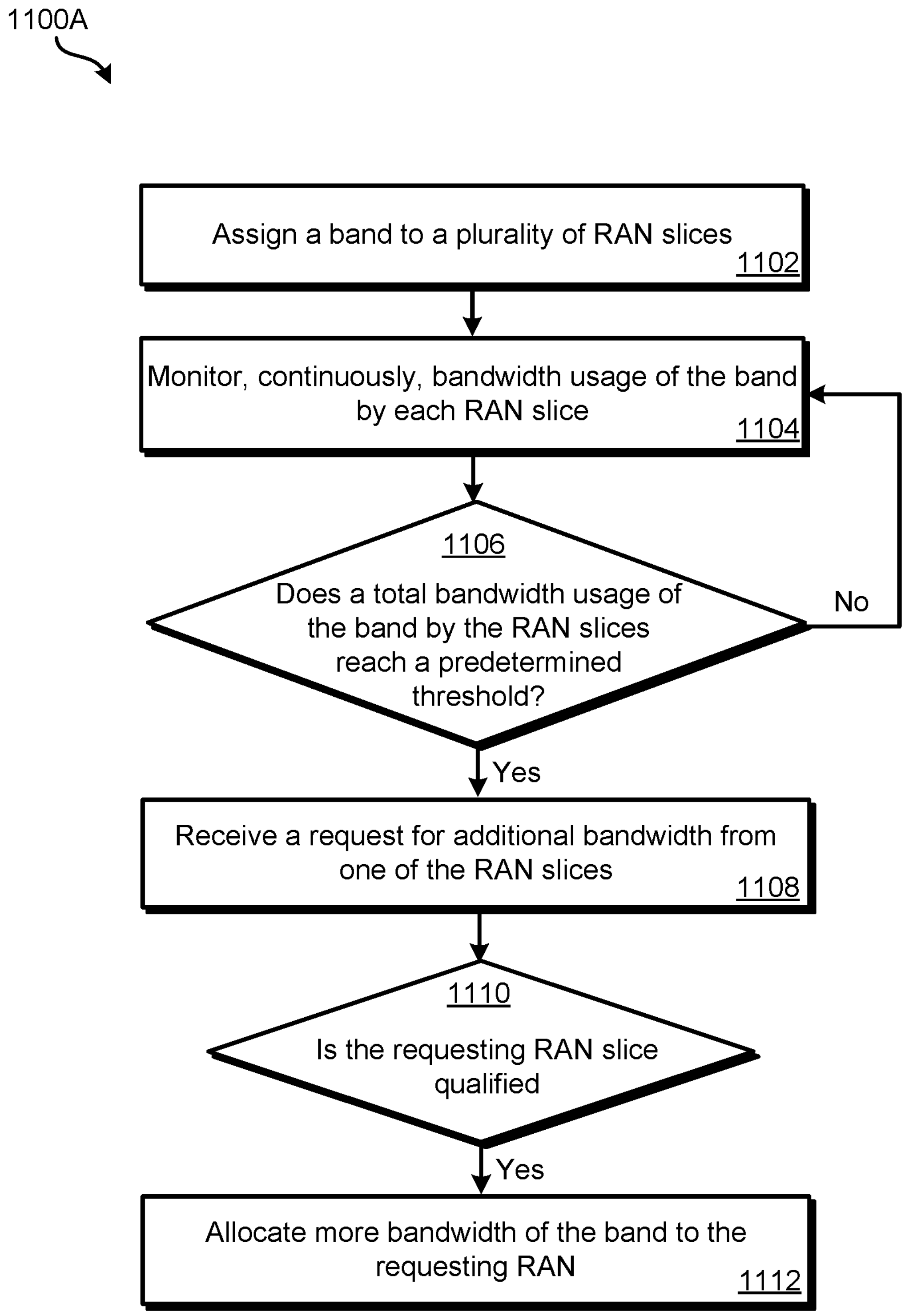
FIG. 11A is a flow diagram illustrating another example of a method for dynamic bandwidth allocation according to various embodiments.

FIG. 11A is a flow diagram illustrates another example of a method 1100A for dynamic bandwidth allocation according to various embodiments. Depending on the implementation, the method 1100A may include additional, fewer, or alternative steps performed in various orders or in parallel. Method 1100A or any operations thereof may be combined with other methods described herein in any suitable manner. The steps/operations included in method 1100A may be similar to the steps/operations of other methods or processes described in the disclosure, and the similar steps/operations will not be repeated unless otherwise indicated.

At 1102, a band is assigned to a plurality of RAN slices, each RAN slice corresponding to a network consumer that carries a specific consumer priority indicator. The bandwidth of the band is allocatable to and sharable by the plurality of RAN slices. At 1104, bandwidth usage of the band by each RAN slice is continuously monitored, by the RAN slice manager. At 1106, a determination is made on whether a total bandwidth usage of the band by the RAN slices reaches a predetermined threshold. For example, the predetermined threshold may be 80%, 90%, 95%, or 100% of the total bandwidth of the band. The threshold may be determined according to a balance of network traffic and spectral efficiency and/or other factors.

At 1108, a request for additional bandwidth of the band is received from one of the RAN slices, after the total bandwidth usage reaches a predetermined threshold. The request may be transmitted from a LAN gateway device or a network administrator of the LAN associated with the network consumer. At 1110, a determination is made on whether the requesting RAN slice is qualified for additional bandwidth. In some embodiments, the consumer priority indicator of the network consumer associated with the requesting RAN slice is identified to determine whether the consumer priority indicator indicates that the RAN slice is qualified for additional allocated bandwidth. For example, if the consumer priority indicator is identified as “privileged,” the requesting RAN slice is qualified for additional bandwidth from a portion of the band that is shared by the multiple RAN slices and not used by the requesting RAN slice. For another example, if the consumer priority indicator is identified as “premium,” the RAN slice is qualified for additional bandwidth from a portion of the band that is exclusively reserved for the RAN slices corresponding to network consumers having the “premium” consumer priority indicator. In some embodiments, the total bandwidth usage of the band is maintained at or below the predetermined threshold.

Figure 11B:
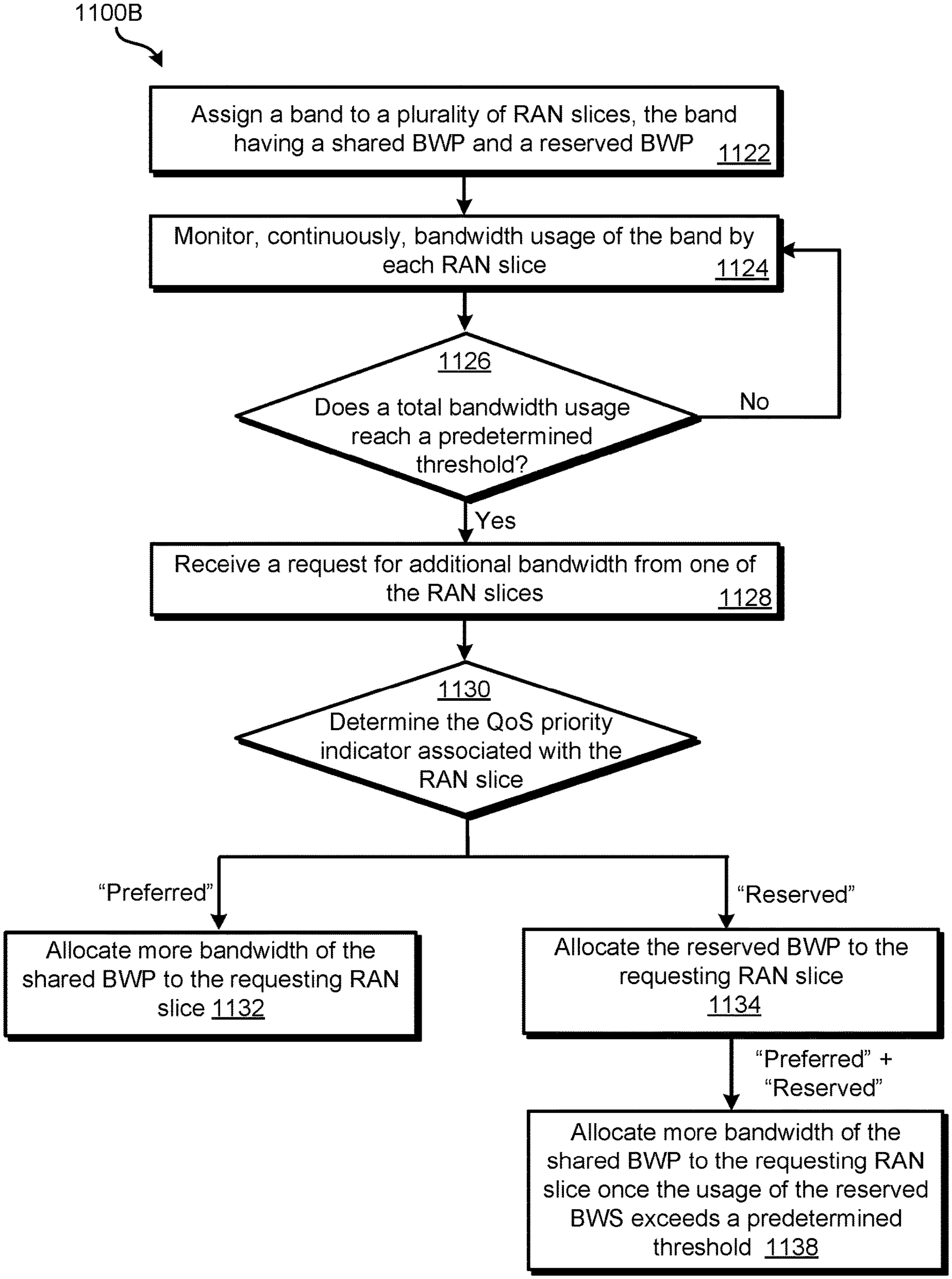
FIG. 11B is a flow diagram illustrating another example of a method for dynamic bandwidth allocation according to various embodiments.

FIG. 11B is a flow diagram illustrates another example of a method 1100B for dynamic bandwidth allocation according to various embodiments. Depending on the implementation, the method 1100B may include additional, fewer, or alternative steps performed in various orders or in parallel. Method 1100B or any operations thereof may be combined with other methods described herein in any suitable manner. The steps/operations included in method 1100B may be similar to the steps/operations of other methods or processes described in the disclosure, and the similar steps/operations will not be repeated unless otherwise indicated.

At 1122, a band is assigned to a plurality of RAN slices, the band having a shared BWP and a reserved BWP. Each RAN slice is associated with one or more QoS priority indicator, and the QoS priority indicator is carried by the network consumer corresponding to the RAN slice. At 1124, bandwidth usage of the band by each RAN slice is continuously monitored. At 1126, a determination is made on whether a total bandwidth usage of the shared BWP by the RAN slices reaches or exceeds a first predetermined threshold. At 1128, a request for additional bandwidth is received from one of the RAN slices, after the total bandwidth usage of the band by the RAN slices reaches the first predetermined threshold. At 1130, the QoS priority indicator associated with the RAN slice is identified and a determination is made on whether the requesting RAN slice is qualified for additional bandwidth.

At 1132, in response to a determination that the requesting RAN slice is associated with a “preferred” QoS priority indicator, at least a portion of the shared BWP that is not currently used by the requesting RAN slice is allocated to the requesting RAN slice. In some embodiments, the total usage of the shared BWP by the RAN slices is maintained at or below the predetermined threshold.

At 1134, in response to a determination that the requesting RAN slice is associated with the “reserved” QoS priority indicator, at least a portion of the reserved BWP that is not currently used by the requesting RAN slice is allocated to the requesting RAN slice. In some embodiments, the total usage of the reserved BWP is maintained at or below a second predetermined threshold.

At 1136, if the requesting RAN slice is associated with both the "privileged" QoS priority indicator and the "reserved" QoS priority indicator, at least a portion of the shared BWP that is not currently used by the requesting RAN slice is allocated to the requesting RAN slice. In some embodiments, a portion of the shared BWP that is not currently used by the requesting RAN slice is allocated to the requesting RAN slice when the total usage of the reserved BWP reaches or exceeds the second predetermined threshold. In some embodiments, the total bandwidth usage of band is maintained at or below a third predetermined threshold.

Figure 12A:
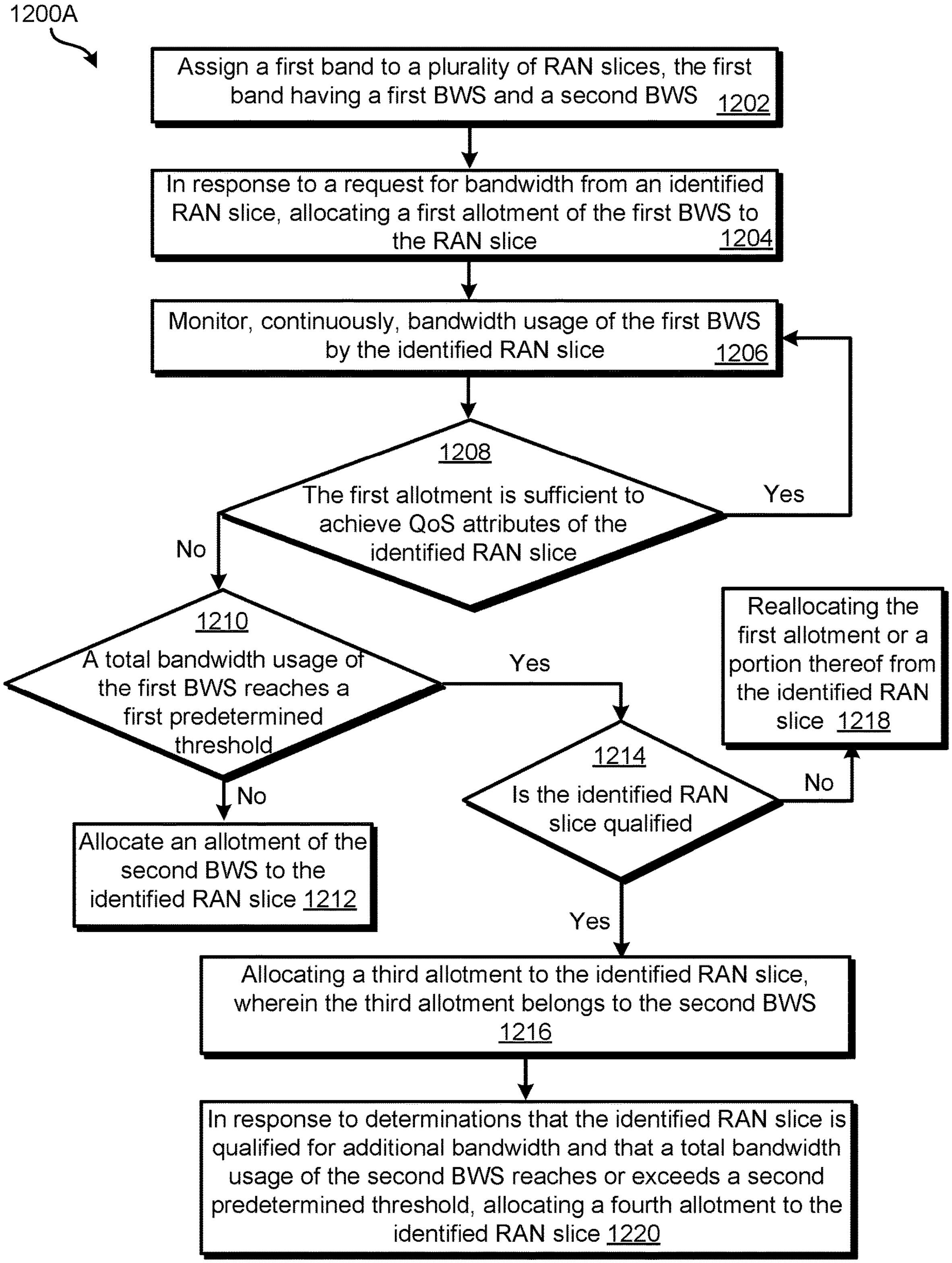
FIG. 12A is a flow diagram illustrating another example of a method for dynamic bandwidth allocation according to various embodiments.

FIG. 12A is a flow diagram illustrates another example of a method 1200A for dynamic bandwidth allocation according to various embodiments. Depending on the implementation, the method 1200A may include additional, fewer, or alternative steps performed in various orders or in parallel. Method 1200A or any operations thereof may be combined with other methods described herein in any suitable manner. The steps/operations included in method 1200A may be similar to the steps/operations of other methods or processes described in the disclosure, and the similar steps/operations will not be repeated unless otherwise indicated.

At 1202, a first band is assigned to a plurality of RAN slices of a network as a common bandwidth resource among the RAN slices. The first band comprises a first BWS and a second BWS, the first BWS is configured to be allocatable to every network slice of the plurality of RAN slices, and the second BWS is configured to be allocatable to qualified network slices of the plurality of RAN slices.

At 1204, in response to a request for bandwidth from an identified RAN slice of the plurality of RAN slices, a first allotment is allocated to the identified RAN slice, and the first allotment belongs to the first BWS. At 1206, real-time bandwidth usage of the first BWS by the identified RAN slice is continuously monitored. At 1208, a determination is made on whether the first allotment allocated to the identified RAN slice is sufficient to achieve predetermined QoS attributes of the identified RAN slice.

At 1210, in response to the determination that the first allotment allocated to the identified RAN slice is insufficient to achieve predetermined QoS attributes of the identified RAN slice, a determination is made on whether a total bandwidth usage of the first BWS by the RAN slices reaches a first predetermined threshold.

At 1212, in response to the determination that the total bandwidth usage of the first BWS by the RAN slices is below the first predetermined threshold, a second allotment is allocated to the identified RAN slice, and the second allotment belongs to the first BWS and is currently not used by the identified RAN slice. In some embodiments, the total bandwidth usage of the first BWS by the RAN slices is maintained at or below the first predetermined threshold.

At 1214, in response to the determination that the total bandwidth usage of the first BWS by the RAN slices reaches or exceeds the first predetermined threshold, a determination is made on whether the identified RAN slice is the qualified RAN slice for additional bandwidth. In some embodiments, the consumer priority indicator or QoS priority indicator associated with or carried by the identified RAN slice are identified, and a higher-level consumer priority indicator (e.g., privileged or premium) or high level QoS priority indicator (e.g., preferred or reserved) indicates that the identified RAN slice is qualified.

At 1216, in response to the determination that the identified RAN slice is the qualified RAN slice for additional bandwidth, a third allotment is allocated to the identified RAN slice, and the third allotment belongs to the second BWS.

At 1218, in response to the determination that the identified RAN slice is not the qualified RAN slice for additional bandwidth, the first or second allotment or a portion thereof is removed or reallocated from the identified RAN slice, such that the total bandwidth usage by the identified RAN slice is less than a sum of the first and second allotment.

At 1220, In response to a determination that the identified RAN slice is the qualified RAN slice for additional bandwidth and a determination that a total bandwidth usage of the second BWS by the RAN slices reaches or exceeds a second predetermined threshold, a fourth allotment is allocated to the identified RAN slice, and the fourth allotment belongs to the first BWS and is currently used by another RAN slice that is not a qualified RAN slice.

In some embodiments, a total bandwidth usage of the first band is maintained at or below a third predetermined threshold. In some embodiments, in response to a determination that the total bandwidth usage of the first band by the RAN slices reaches the third predetermined threshold and a determination that the total bandwidth of the allotments of the first band allocated to the identified RAN slice is insufficient to achieve the predetermined QoS attributes of the identified RAN slice, a second band is assigned to the identified RAN slice, and a fifth allotment belonging to the second band is allocated to the identified RAN slice. In some embodiments, a total bandwidth usage of the second band at or below a fourth predetermined threshold. In some embodiments, the fourth predetermined threshold (i.e., the percentage of the total bandwidth usage relative to the total bandwidth of the second band) is the same as the third predetermined threshold (i.e., the percentage of the total bandwidth usage relative to the total bandwidth of the first band).

Figure 12B:
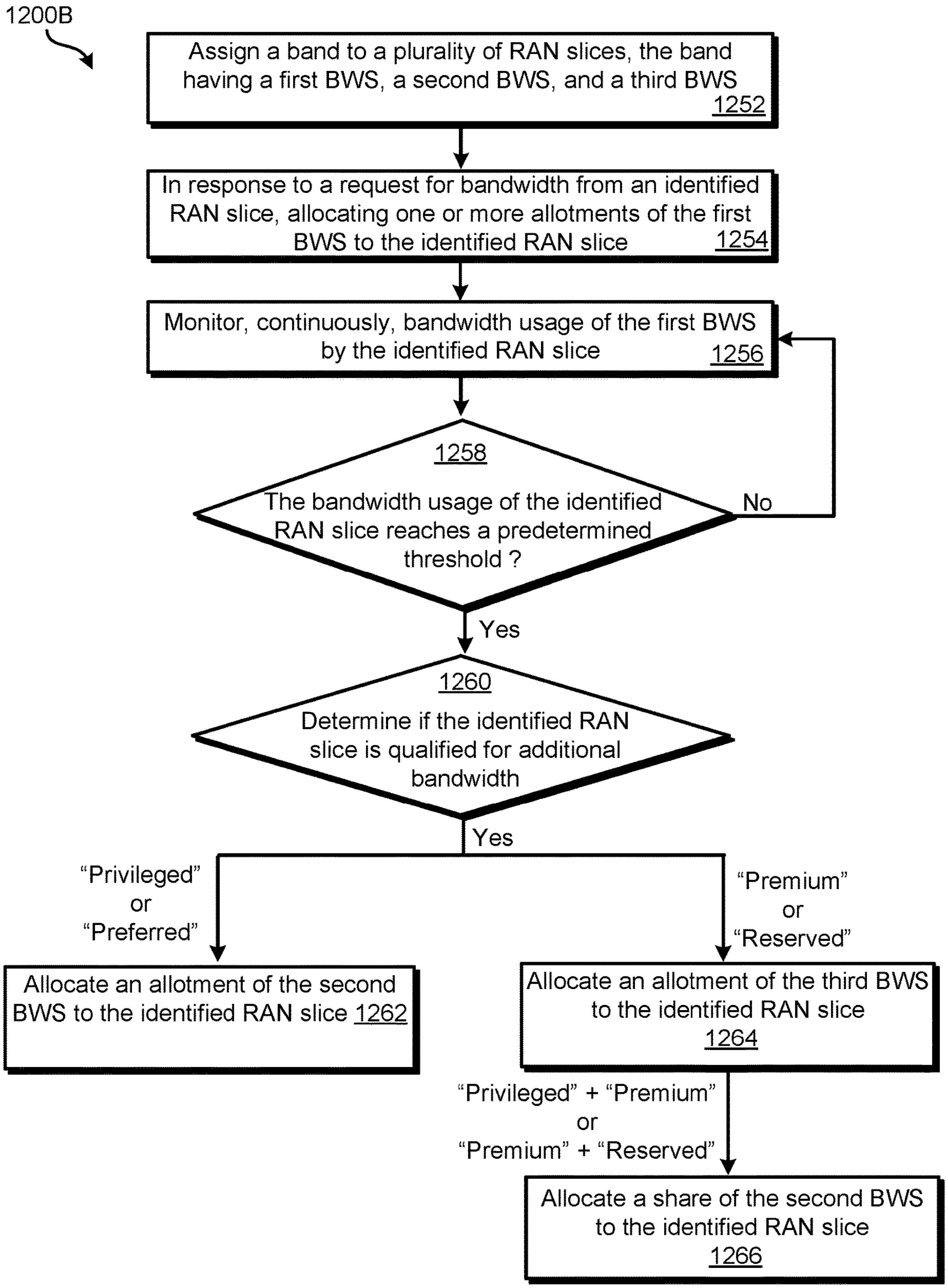
FIG. 12B is a flow diagram illustrating another example of a method for dynamic bandwidth allocation according to various embodiments.

FIG. 12B is a flow diagram illustrates another example of a method 1200B for dynamic bandwidth allocation according to various embodiments. Depending on the implementation, the method 1200B may include additional, fewer, or alternative steps performed in various orders or in parallel. Method 1200B or any operations thereof may be combined with other methods described herein in any suitable manner. The steps/operations included in method 1200B may be similar to the steps/operations of other methods or processes described in the disclosure, and the similar steps/operations will not be repeated unless otherwise indicated.

At 1252, a band is assigned to a plurality of RAN slices, the band having a first BWS with a first BW, a second BWS with a second BW, and a third BWS with a third BW. The first BWS is allocatable to and sharable by the plurality of RAN slices, the second BWS and third BWS are only allocatable to qualified RAN slices of the plurality of RAN slices. At 1254, in response to a request for bandwidth from one of the RAN slices, one or more allotments of the first BWS are allocated to the RAN slice. At 1256, bandwidth usage of the band and the BWS thereof by each RAN slice is continuously monitored, by the RAN slice manager. At 1258, a determination is made on whether the bandwidth usage of the first BWS by one of the RAN slices reaches a predetermined threshold. The predetermined threshold may be a predetermined maximum allowed bandwidth of the shared BWS allocatable to the RAN slice (e.g., 25% of the total bandwidth of the first BW).

At 1260, a determination is made on whether the identified RAN slice is qualified for additional bandwidth. At 1262, in response to a determination that the identified RAN slice is associated with a "privileged" consumer priority indicator and/or a "preferred" QoS priority indicator, at least a portion of the second BWS that is not currently used by the identified RAN slice is automatically allocated to the identified RAN slice, such that the total bandwidth usage of the identified RAN slice is increased. In some embodiments, the total usage of the first BWS by the RAN slices is maintained at or below the first predetermined threshold. In some embodiments, the total usage of the second BWS by the RAN slices is maintained at or below a second predetermined threshold. The second predetermined threshold may be a maximum allowed total bandwidth usage of the second BWS (e.g., 80% of the second BW).

At 1264, in response to a determination that the identified RAN slice is associated with a "premium" consumer priority indicator and/or a "reserved" QoS priority indicator, at least a portion of the third BWS that is not currently used by the identified RAN slice is automatically allocated to the identified RAN slice, such that the total bandwidth usage of the identified RAN slice is increased. In some embodiments, the total usage of the first BWS by the RAN slices is maintained at or below the first predetermined threshold. In some embodiments, the total usage of the third BWS by the RAN slices is maintained at or below a third predetermined threshold. The third predetermined threshold may be a maximum allowed usage of the third BWS (e.g., 80% of the second BW).

At 1266, in response to a determination that the identified RAN slice is associated with both the "premium" consumer priority indicator and the "privileged" consumer priority indicator, or that the identified RAN slice is associated with a both a "reserved" QoS priority indicator and the "preferred" QoS priority indicator, and if the total usage of the third BWS by the RAN slices reaches or exceeds the third predetermined threshold, at least a portion of the second BWS that is not currently used by the identified RAN slice is automatically allocated to the identified RAN slice, such that the total bandwidth usage of the identified RAN slice is further increased. In some embodiments, the total usage of the first BWS by the RAN slices is maintained at or below the first predetermined threshold, and the total usage of the second BWS by the RAN slices is maintained at or below a second predetermined threshold.

Figure 13:
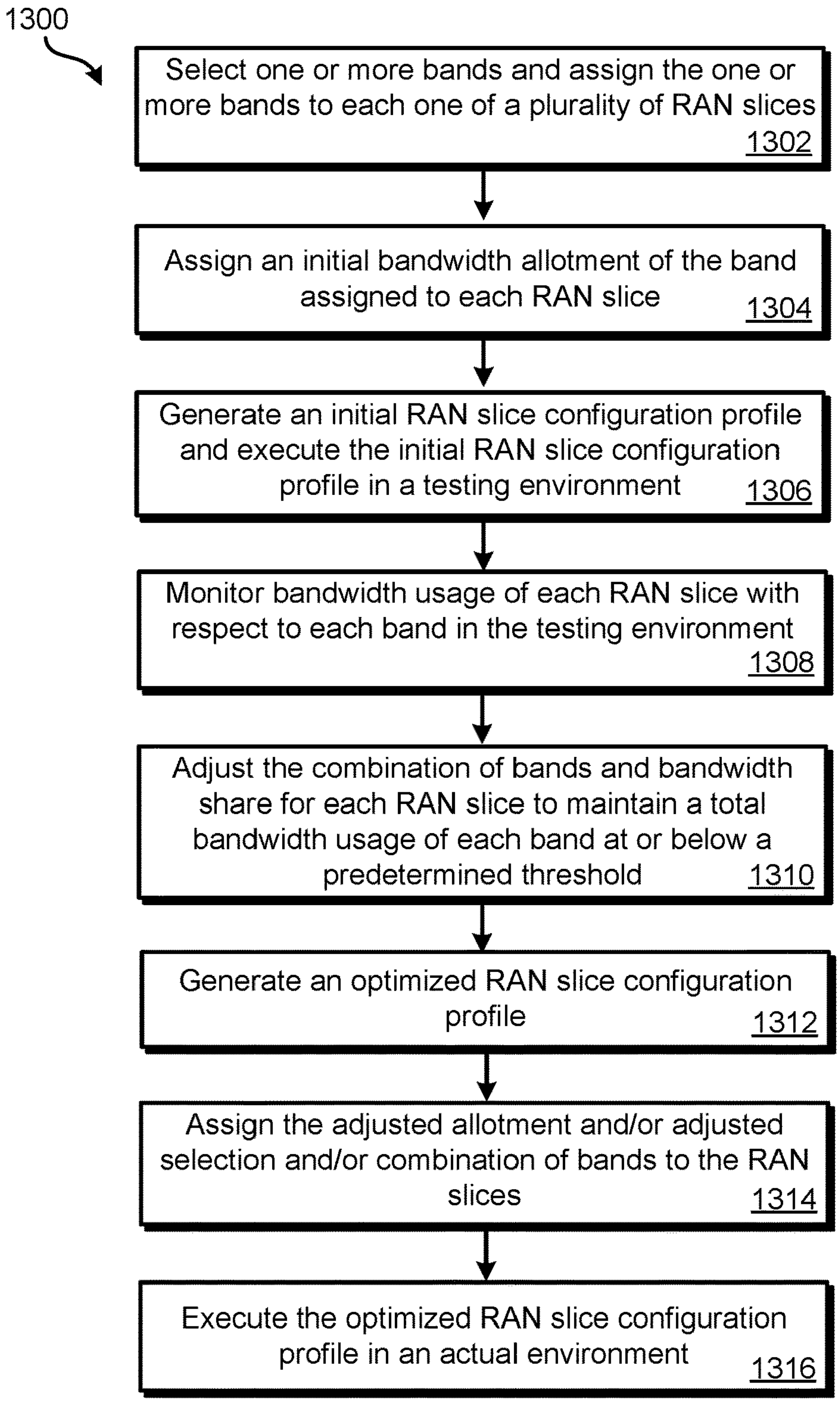
FIG. 13 is a flow diagram illustrating an example of a method for optimizing resource allocation according to various embodiments.

FIG. 13 is a flow diagram illustrates an example of a method 1300 for optimizing resource allocation according to various embodiments. Depending on the implementation, the method 1300 may include additional, fewer, or alternative steps performed in various orders or in parallel. Method 1300 or any operations thereof may be combined with other methods described herein in any suitable manner. The steps/operations included in method 1300 may be similar to the steps/operations of other methods or processes described in the disclosure, and the similar steps/operations will not be repeated unless otherwise indicated.

At 1302, one or more bands are selected and assigned to each one of a plurality or RAN slices for each one of a plurality of time slots. At 1304, an initial allotment of each one of the bands assigned to each RAN slice, the initial allotment having a first bandwidth. At 1306, an initial RAN slice configuration profile is generated, the initial RAN slice configuration profile including information regarding the assignment of the bands to the RAN slices and the initial allotment of each band for each RAN slice for each time slot. The initial RAN slice configuration profile is executed in a testing environment. At 1308, bandwidth usage of each band by each corresponding RAN slice is monitored continuously in the testing environment. At 1310, the selection and/or combination of the bands and the initial allotment of each band for each RAN slice are automatically and dynamically adjusted to maintain a total bandwidth usage of each band at or below a predetermined threshold. The adjusted allotment may have a second bandwidth different from the first bandwidth. At 1312, an optimized RAN slice configuration profile is generated, the optimized RAN slice configuration profile including information regarding the adjusted selection and/or assignment of the bands to the RAN slices and/or the adjusted allotment of each band for each RAN slice for each time slot. At 1314, the adjusted selection and/or combination of bands and/or the adjusted allotment are assigned to the plurality of RAN slices according to the optimized RAN slice configuration profile. At 1316, the optimized RAN slice configuration profile is executed in an actual environment.

Figure 14A:
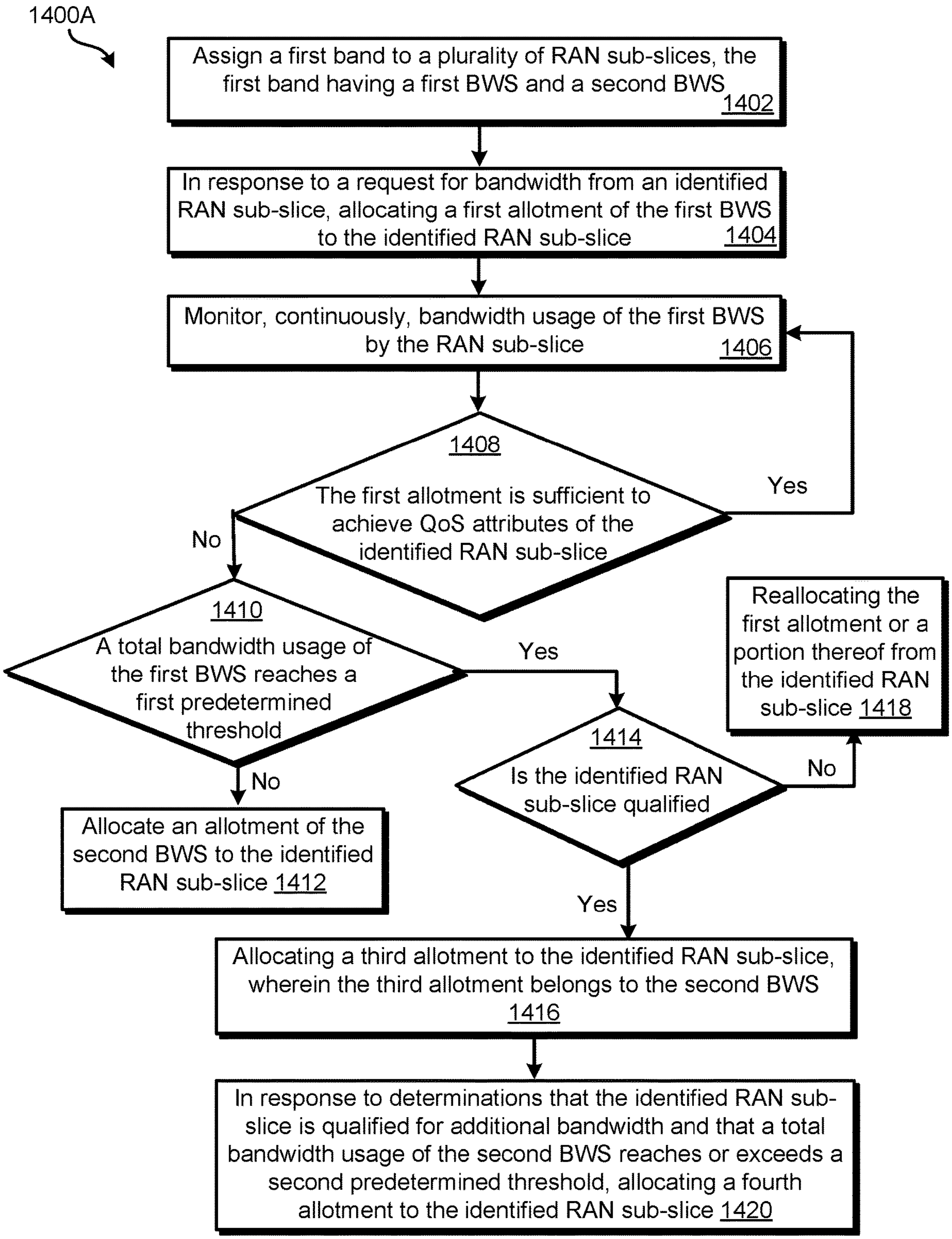
FIG. 14A is a flow diagram illustrating an example of a method for slice-specific bandwidth allocation according to various embodiments.

FIG. 14A is a flow diagram illustrates an example of a method 1400A for slice-specific bandwidth allocation according to various embodiments. Depending on the implementation, the method 1400A may include additional, fewer, or alternative steps performed in various orders or in parallel. Method 1400A or any operations thereof may be combined with other methods described herein in any suitable manner.

At 1402, a first band or a spectrum is assigned to a plurality of RAN sub-slices of a RAN slice. In some embodiments, a plurality of RAN sub-slices within a RAN slice of a network is generated. The RAN slice is assigned to a network consumer having a plurality of UE groups, the plurality of RAN sub-slices are respectively assigned to the plurality of UE groups of the network consumer, and each one of the UE groups comprises one or more UEs connected to the corresponding RAN sub-slice. The first band includes a first bandwidth segment (BWS) and a second BWS, the first BWS is configured to be allocatable to each one of the plurality of RAN sub-slices, and the second BWS is configured to be allocatable to qualified RAN sub-slices of the plurality of RAN sub-slices.

At 1404, a first allotment of the first BWS is assigned to the identified RAN sub-slice. In some embodiments, a request for bandwidth from is received from an identified RAN sub-slice. In response to the request, the first allotment is assigned to the identified RAN sub-slice. At 1406, real-time bandwidth usage of the first BWS by the RAN sub-slices is continuously monitored. At 1408, a determination is made on whether first allotment is sufficient to achieve QoS attributes of the identified RAN sub-slice.

At 1410, in response to the determination that the first allotment allocated to the identified RAN sub-slice is insufficient to achieve predetermined QoS attributes of the identified RAN sub-slice, a determination is made on whether a total bandwidth usage of the first BWS by the RAN sub-slices reaches a first predetermined threshold.

At 1412, in response to the determination that the total bandwidth usage of the first BWS by the RAN sub-slices is below the first predetermined threshold, a second allotment is allocated to the identified RAN sub-slice, and the second allotment belongs to the first BWS and is currently not used by the identified RAN sub-slice. In some embodiments, the total bandwidth usage of the first BWS by the RAN sub-slices is maintained at or below the first predetermined threshold.

At 1414, in response to the determination that the total bandwidth usage of the first BWS by the RAN sub-slices reaches or exceeds the first predetermined threshold, a determination is made on whether the identified RAN sub-slice is the qualified RAN slice for additional bandwidth. In some embodiments, the consumer priority indicator or QoS priority indicator associated with or carried by the identified RAN sub-slice are identified, and a higher-level consumer priority indicator (e.g., privileged or premium) or high level QoS priority indicator (e.g., preferred or reserved) indicates that the identified RAN sub-slice is qualified.

At 1416, in response to the determination that the identified RAN sub-slice is the qualified RAN sub-slice for additional bandwidth, a third allotment is allocated to the identified RAN sub-slice, and the third allotment belongs to the second BWS.

At 1418, in response to the determination that the identified RAN sub-slice is not the qualified RAN sub-slice for additional bandwidth, the first or second allotment or a portion thereof is removed or reallocated from the identified RAN sub-slice, such that the total bandwidth usage by the identified RAN sub-slice is less than a sum of bandwidth of the first and second allotment.

At 1420, In response to a determination that the identified RAN sub-slice is the qualified RAN sub-slice for additional bandwidth and a determination that a total bandwidth usage of the second BWS by the RAN sub-slices reaches or exceeds a second predetermined threshold, a fourth allotment is allocated to the identified RAN sub-slice, and the fourth allotment belongs to the first BWS and is currently used by another RAN sub-slice that is not a qualified RAN sub-slice.

In some embodiments, a total bandwidth usage of the first band is maintained at or below a third predetermined threshold. In some embodiments, in response to a determination that the total bandwidth usage of the first band by the RAN sub-slices reaches the third predetermined threshold and a determination that the total bandwidth of the allotments of the first band allocated to the identified RAN sub-slice is insufficient to achieve the predetermined QoS attributes of the identified RAN sub-slice, a second band is assigned to the identified RAN sub-slice, and a fifth allotment belonging to the second band is allocated to the identified RAN sub-slice. In some embodiments, a total bandwidth usage of the second band at or below a fourth predetermined threshold. In some embodiments, the fourth predetermined threshold (i.e., the percentage of the total bandwidth usage relative to the total bandwidth of the second band) is the same as the third predetermined threshold (i.e., the percentage of the total bandwidth usage relative to the total bandwidth of the first band).

Figure 14B:
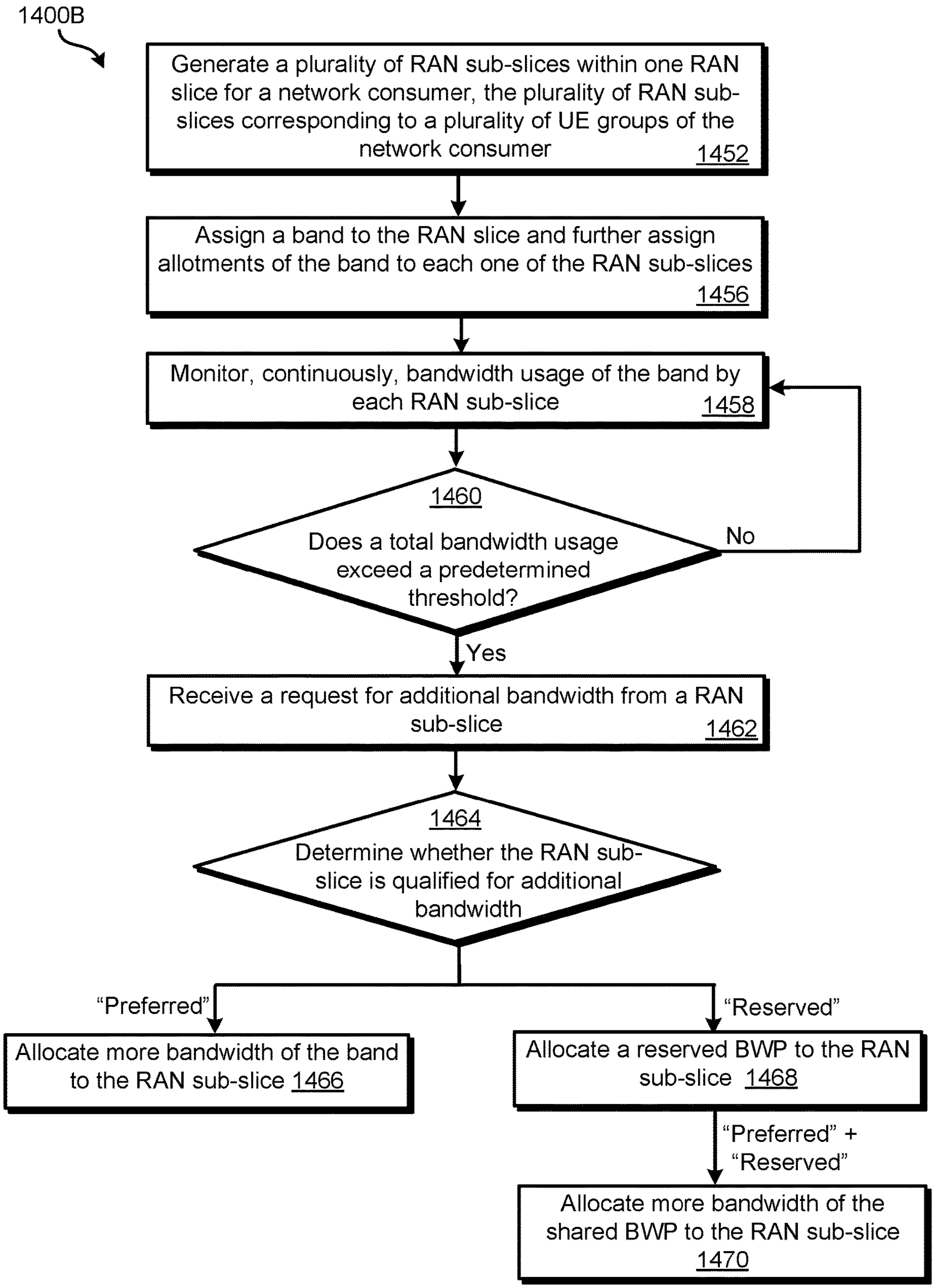
FIG. 14B is a flow diagram illustrating an example of a method for slice-specific bandwidth allocation according to various embodiments.

FIG. 14B is a flow diagram illustrates another example of a method 1400B for slice-specific bandwidth allocation according to various embodiments. Depending on the implementation, the method 1400B may include additional, fewer, or alternative steps performed in various orders or in parallel. Method 1400B or any operations thereof may be combined with other methods described herein in any suitable manner.

At 1452, a RAN slice is assigned to a network consumer and a plurality of RAN sub-slices are generated within the RAN slice for the network consumer. The plurality of RAN sub-slices corresponds to a plurality of UE groups of the network consumer. At 1456, a band or a share thereof is assigned to the RAN slice. In some embodiments, the band or the share thereof may further include a first portion, a second portion, and a third portion. The first portion includes a plurality of allotments sharable by the RAN sub-slices. The plurality of allotments is respectively assigned to the plurality of RAN sub-slices. The second and third portions of the band or the share thereof are allocatable to qualified RAN sub-slices. At 1458, bandwidth usage of the band or the share thereof by each RAN sub-slice is continuously monitored, by a slice-specific resource allocation system. At 1460, a determination is made on whether a total bandwidth usage of the first portion by the RAN sub-slice reaches or exceeds a first predetermined threshold (e.g., 80% of the total bandwidth of the first portion).

At 1462, a request for additional bandwidth from a RAN sub-slice is received after the total bandwidth usage by the RAN slice has reached or exceeded the first predetermined threshold. At 1464, a determination is made on whether the RAN sub-slice is qualified for additional bandwidth. At 1466, in response to a determination that the RAN sub-slice is associated with a "privileged" UE priority indicator and/or a "preferred" QoS priority indicator, at least a part of the second portion that is not currently used by the RAN sub-slice is automatically allocated to the RAN sub-slice, such that the total bandwidth usage of the RAN sub-slice is increased. In some embodiments, the total bandwidth usage of the second portion by the RAN sub-slices is maintained at or below a second predetermined threshold.

At 1468, in response to a determination that the RAN sub-slice is associated with a "premium" UE priority indicator and/or a "reserved" QoS priority indicator, at least a part of the third portion that is not currently used by the RAN sub-slice is automatically allocated to the RAN sub-slice, such that the total bandwidth usage of the RAN sub-slice is increased. In some embodiments, the total bandwidth usage of the first portion by the RAN sub-slices is maintained at or below a first predetermined threshold. In some embodiments, the total usage of the third portion by the RAN sub-slices is maintained at or below a third predetermined threshold.

At 1470, in response to a determination that the RAN sub-slice is associated with both the "premium" UE priority indicator and the "privileged" consumer priority indicator, or that the RAN sub-slice is associated with a both a "reserved" QoS priority indicator and the "preferred" QoS priority indicator, and if the total usage of the third portion by the RAN sub-slices reaches or exceeds the third predetermined threshold, at least a portion of the second portion that is not currently used by the RAN sub-slice is automatically allocated to the RAN sub-slice, such that the total bandwidth usage of the RAN sub-slice is further increased. In some embodiments, the total usage of the first portion by the RAN sub-slices is maintained at or below the first predetermined threshold, and the total usage of the second portion by the RAN sub-slices is maintained at or below a second predetermined threshold.

Figure 15:
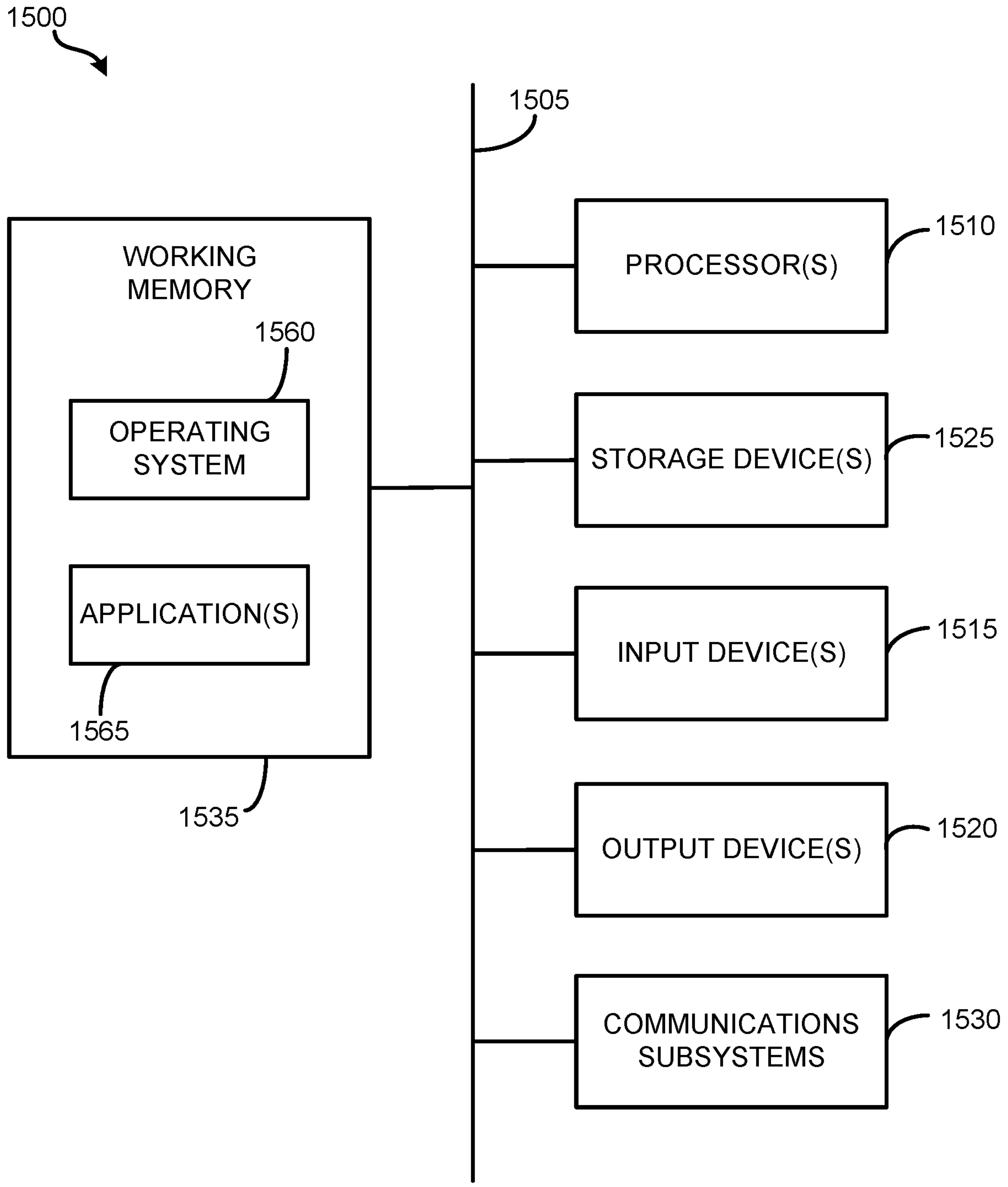
FIG. 15 is a schematic diagram illustrating an example computer system or computer device, according to various embodiments.

The slice management system shown in FIG. 1 and other components of any communications system or network described above may include a computer system that further includes computer hardware and software that form special-purpose network circuitry to implement various embodiments of the methods or processes described herein. FIG. 15 is a schematic diagram illustrating an example of computer system 1500. The computer system 1500 is a simplified computer system that can be used to implement various embodiments described and illustrated herein. A computer system 1500 as illustrated in FIG. 15 may be incorporated into devices such as a portable electronic device, mobile phone, server grade machines, or other device as described herein. FIG. 15 provides a schematic illustration of one embodiment of a computer system 1500 that can perform some or all of the steps of the methods and workflows provided by various embodiments. It should be noted that FIG. 15 is meant only to provide a generalized illustration of various components, any or all of which may be utilized as appropriate. FIG. 15, therefore, broadly illustrates how individual system elements may be implemented in a relatively separated or relatively more integrated manner.

The computer system 1500 is shown including hardware elements that can be electrically coupled via a bus 1505, or may otherwise be in communication, as appropriate. The hardware elements may include one or more processors 1510, including without limitation one or more general-purpose processors and/or one or more special-purpose processors such as digital signal processing chips, graphics acceleration processors, and/or the like; one or more input devices 1515, which can include without limitation a mouse, a keyboard, a camera, and/or the like; and one or more output devices 1520, which can include without limitation a display device, a printer, and/or the like.

The computer system 1500 may further include and/or be in communication with one or more non-transitory storage devices 1525, which can include, without limitation, local and/or network accessible storage, and/or can include, without limitation, a disk drive, a drive array, an optical storage device, a solid-state storage device, such as a random access memory ("RAM"), and/or a read-only memory ("ROM"), which can be programmable, flash-updateable, and/or the like. Such storage devices may be configured to implement any appropriate data stores, including without limitation, various file systems, database structures, and/or the like.

The computer system 1500 might also include a communications subsystem 1530, which can include without limitation a modem, a network card (wireless or wired), an infrared communication device, a wireless communication device, and/or a chipset such as a Bluetooth™ device, a 602.11 device, a WiFi device, a WiMax device, cellular communication facilities, etc., and/or the like. The communications subsystem 1530 may include one or more input and/or output communication interfaces to permit data to be exchanged with a network such as the network described below to name one example, other computer systems, television, and/or any other devices described herein. Depending on the desired functionality and/or other implementation concerns, a portable electronic device or similar device may communicate image and/or other information via the communications subsystem 1530. In other embodiments, a portable electronic device, e.g., the first electronic device, may be incorporated into the computer system 1500, e.g., an electronic device as an input device 1515. In some embodiments, the computer system 1500 will further include a working memory 1535, which can include a RAM or ROM device, as described above.

The computer system 1500 also can include software elements, shown as being currently located within the working memory 1535, including an operating system 1560, device drivers, executable libraries, and/or other code, such as one or more application programs 1565, which may include computer programs provided by various embodiments, and/or may be designed to implement methods, and/or configure systems, provided by other embodiments, as described herein. Merely by way of example, one or more procedures described with respect to the methods discussed above, such as those described in relation to FIG. 15, might be implemented as code and/or instructions executable by a computer and/or a processor within a computer; in an aspect, then, such code and/or instructions can be used to configure and/or adapt a general purpose computer or other device to perform one or more operations in accordance with the described methods.

A set of these instructions and/or code may be stored on a non-transitory computer-readable storage medium, such as the storage device(s) 1525 described above. In some cases, the storage medium might be incorporated within a computer system, such as computer system 1500. In other embodiments, the storage medium might be separate from a computer system e.g., a removable medium, such as a compact disc, and/or provided in an installation package, such that the storage medium can be used to program, configure, and/or adapt a general-purpose computer with the instructions/code stored thereon. These instructions might take the form of executable code, which is executable by the computer system 1500 and/or might take the form of source and/or installable code, which, upon compilation and/or installation on the computer system 1500 e.g., using any of a variety of generally available compilers, installation programs, compression/decompression utilities, etc., then takes the form of executable code.

It will be apparent that substantial variations may be made in accordance with specific requirements. For example, customized hardware might also be used, and/or particular elements might be implemented in hardware, software including portable software, such as applets, etc., or both. Further, connection to other computing devices such as network input/output devices may be employed.

As mentioned above, in one aspect, some embodiments may employ a computer system such as the computer system 1500 to perform methods in accordance with various embodiments of the technology. According to a set of embodiments, some or all of the operations of such methods are performed by the computer system 1500 in response to processor 1510 executing one or more sequences of one or more instructions, which might be incorporated into the operating system 1560 and/or other code, such as an application program 1565, contained in the working memory 1535. Such instructions may be read into the working memory 1535 from another computer-readable medium, such as one or more of the storage device(s) 1525. Merely by way of example, execution of the sequences of instructions contained in the working memory 1535 might cause the processor(s) 1510 to perform one or more procedures of the methods described herein. Additionally or alternatively, portions of the methods described herein may be executed through specialized hardware.

The terms "machine-readable medium" and "computer-readable medium," as used herein, refer to any medium that participates in providing data that causes a machine to operate in a specific fashion. In an embodiment implemented using the computer system 1500, various computer-readable media might be involved in providing instructions/code to processor(s) 1510 for execution and/or might be used to store and/or carry such instructions/code. In many implementations, a computer-readable medium is a physical and/or tangible storage medium. Such a medium may take the form of a non-volatile media or volatile media. Non-volatile media include, for example, optical and/or magnetic disks, such as the storage device(s) 1525. Volatile media include, without limitation, dynamic memory, such as the working memory 1535.

Common forms of physical and/or tangible computer-readable media include, for example, a floppy disk, a flexible disk, hard disk, magnetic tape, solid state drive, or any other magnetic medium, a CD-ROM, any other optical medium, punchcards, papertape, any other physical medium with patterns of holes, a RAM, a PROM, EPROM, a FLASH-EPROM, any other memory chip or cartridge, or any other medium from which a computer can read instructions and/or code.

Various forms of computer-readable media may be involved in carrying one or more sequences of one or more instructions to the processor(s) 1510 for execution. Merely by way of example, the instructions may initially be carried on a magnetic disk and/or optical disc of a remote computer. A remote computer might load the instructions into its dynamic memory and send the instructions as signals over a transmission medium to be received and/or executed by the computer system 1500.

The communications subsystem 1530 and/or components thereof generally will receive signals, and the bus 1505 then might carry the signals and/or the data, instructions, etc. carried by the signals to the working memory 1535, from which the processor(s) 1510 retrieves and executes the instructions. The instructions received by the working memory 1535 may optionally be stored on a non-transitory storage device 725 either before or after execution by the processor(s) 1510.

The methods, systems, and devices discussed above are examples. Various configurations may omit, substitute, or add various procedures or components as appropriate. For instance, in alternative configurations, the methods may be performed in an order different from that described, and/or various stages may be added, omitted, and/or combined. Also, features described with respect to certain configurations may be combined in various other configurations. Different aspects and elements of the configurations may be combined in a similar manner. Also, technology evolves and, thus, many of the elements are examples and do not limit the scope of the disclosure or claims.

Specific details are given in the description to provide a thorough understanding of exemplary configurations including implementations. However, configurations may be practiced without these specific details. For example, well-known circuits, processes, algorithms, structures, and techniques have been shown without unnecessary detail in order to avoid obscuring the configurations. This description provides example configurations only, and does not limit the scope, applicability, or configurations of the claims. Rather, the preceding description of the configurations will provide an enabling description for implementing described techniques. Various changes may be made in the function and arrangement of elements without departing from the spirit or scope of the disclosure.

Also, configurations may be described as a process which is depicted as a schematic flowchart or block diagram. Although each may describe the operations as a sequential process, many of the operations can be performed in parallel or concurrently. In addition, the order of the operations may be rearranged. A process may have additional steps not included in the figure. Furthermore, examples of the methods may be implemented by hardware, software, firmware, middleware, microcode, hardware description languages, or any combination thereof. When implemented in software, firmware, middleware, or microcode, the program code or code segments to perform the necessary tasks may be stored in a non-transitory computer-readable medium such as a storage medium. Processors may perform the described tasks.

As used herein and in the appended claims, the singular forms "a", "an", and "the" include plural references unless the context clearly dictates otherwise. Thus, for example, reference to "a network slice" may include a plurality of such network slices, and reference to "the processor" includes reference to one or more processors and equivalents thereof known in the art, and so forth.

Also, the words "comprise", "comprising", "contains", "containing", "include", "including", and "includes", when used in this specification and in the following claims, are intended to specify the presence of stated features, integers, components, or steps, but they do not preclude the presence or addition of one or more other features, integers, components, steps, acts, or groups.

Having described several example configurations, various modifications, alternative constructions, and equivalents may be used without departing from the spirit of the disclosure. For example, the above elements may be components of a larger system, wherein other rules may take precedence over or otherwise modify the application of the technology. Also, a number of steps may be undertaken before, during, or after the above elements are considered. Accordingly, the above description does not bind the scope of the claims.

What is claimed is:

1. A method comprising:

assigning a first radio frequency band to a plurality of radio access network (RAN) slices of a network, wherein each one of the RAN slices is assigned to a network consumer, the first band comprises a first bandwidth segment (BWS) and a second BWS, the first BWS is configured to be allocatable to each one of the plurality of RAN slices, and the second BWS is configured to be allocatable to qualified RAN slices of the plurality of RAN slices;

in response to a request for bandwidth from an identified RAN slice of the plurality of RAN slices, allocating a first allotment to the identified RAN slice, wherein the first allotment belongs to the first BWS;

monitoring, continuously, real-time bandwidth usage of the first BWS by the identified RAN slice;

determining whether the first allotment allocated to the identified RAN slice is sufficient to achieve predetermined Quality of Service (QoS) attributes of the identified RAN slice;

in response to a determination that the first allotment allocated to the identified RAN slice is insufficient to achieve the predetermined QoS attributes of the identified RAN slice, and that a total bandwidth usage of the first BWS by the RAN slices reaches a first predetermined threshold, allocating a second allotment to the identified RAN slice, wherein the identified RAN slice is a qualified RAN slice, and wherein the second allotment belongs to the second BWS;

determining that a total bandwidth usage of the second BWS by the RAN slices reaches or exceeds a second predetermined threshold; and in response, allocating a third allotment to the identified RAN slice, wherein the third allotment belongs to the first BWS and is currently used by another RAN slice that is not the qualified RAN slice.

2. The method of claim 1, further comprising:

in response to a request for bandwidth from a second identified RAN slice of the plurality of RAN slices, allocating an initial allotment to the second identified RAN slice, wherein the initial allotment belongs to the first BWS;

determining that the initial allotment is insufficient to achieve predetermined QoS attributes of the second identified RAN slice;

determining that the total bandwidth usage of the first BWS by the RAN slices is below the first predetermined threshold; and allocating an additional allotment to the second identified RAN slice, wherein the additional allotment belongs to the first BWS and is currently not used by the second identified RAN slice, wherein the total bandwidth usage of the first BWS by the RAN slices is maintained at or below the first predetermined threshold.

3. The method of claim 1, further comprising:

in response to a request for bandwidth from a second identified RAN slice of the plurality of RAN slices, allocating an initial allotment to the second identified RAN slice, wherein the initial allotment belongs to the first BWS;

determining that the initial allotment is insufficient to achieve predetermined QoS attributes of the second identified RAN slice;

determining that the total bandwidth usage of the first BWS by the RAN slices reaches or exceeds the first predetermined threshold;

determining that the second identified RAN slice is not a qualified RAN slice for additional bandwidth; and in response to the determination that the second identified RAN slice is not a qualified RAN slice for additional bandwidth, reallocating the initial allotment or a portion thereof from the second identified RAN slice, wherein the total bandwidth usage by the second identified RAN slice is less than the bandwidth of the initial allotment.

4. The method of claim 1, further comprising:

maintaining a total bandwidth usage of the first band at or below a third predetermined threshold.

5. The method of claim 4, further comprising:

determining that the total bandwidth usage of the first band by the RAN slices reaches or exceeds the third predetermined threshold;

determining that the total bandwidth of the allotments of the first band allocated to the identified RAN slice is insufficient to achieve the predetermined QoS attributes of the identified RAN slice;

in response, assigning a second band to the identified RAN slice; and allocating a fourth allotment to the identified RAN slice, wherein the fourth allotment belongs to the second band.

6. The method of claim 5, further comprising:

maintaining a total bandwidth usage of the second band at or below a fourth predetermined threshold, wherein the fourth predetermined threshold is the same as the third predetermined threshold.

7. The method of claim 1, further comprising:

assigning a first level QoS priority indicator to each one of the plurality of RAN slices; and assigning a second level QoS priority indicator to each one of the qualified RAN slices.

8. A network slice management system in connection with a network, the network slice management system comprising:

one or more processors; and a computer-readable storage media storing computer-executable instructions that, when executed by the one or more processors, cause the network slice management system to:

assign a first radio frequency band to a plurality of radio access network (RAN) slices of the network, wherein each one of the RAN slices is assigned to a network consumer, the first band comprises a first bandwidth segment (BWS) and a second BWS, the first BWS is configured to be allocatable to each one of the plurality of RAN slices, and the second BWS is configured to be allocatable to qualified RAN slices of the plurality of RAN slices;

in response to a request for bandwidth from an identified RAN slice of the plurality of RAN slices, allocate a first allotment to the identified RAN slice, wherein the first allotment belongs to the first BWS;

monitor, continuously, real-time bandwidth usage of the first BWS by the identified RAN slice;

determine whether the first allotment allocated to the identified RAN slice is sufficient to achieve predetermined Quality of Service (QoS) attributes of the identified RAN slice;

determine whether the first allotment allocated to the identified RAN slice is sufficient to achieve predetermined Quality of Service (QoS) attributes of the identified RAN slice;

in response to a determination that the first allotment allocated to the identified RAN slice is insufficient to achieve the predetermined QoS attributes of the identified RAN slice, and that a total bandwidth usage of the first BWS by the RAN slices reaches a first predetermined threshold, allocate a second allotment to the identified RAN slice, wherein the identified RAN slice is a qualified RAN slice, and wherein the second allotment belongs to the second BWS;

determine that a total bandwidth usage of the second BWS by the RAN slices reaches or exceeds a second predetermined threshold; and in response, allocate a third allotment to the identified RAN slice, wherein the third allotment belongs to the first BWS and is currently used by another RAN slice that is not the qualified RAN slice.

9. The network slice management system of claim 8, wherein the instructions when executed by the one or more processors further cause the network slice management system to:

in response to a request for bandwidth from a second identified RAN slice of the plurality of RAN slices, allocate an initial allotment to the second identified RAN slice, wherein the initial allotment belongs to the first BWS;

determine that the initial allotment is insufficient to achieve predetermined QoS attributes of the second identified RAN slice;

determine that the total bandwidth usage of the first BWS by the RAN slices is below the first predetermined threshold; and allocate an additional allotment to the second identified RAN slice, wherein the additional allotment belongs to the first BWS and is currently not used by the second identified RAN slice, wherein the total bandwidth usage of the first BWS by the RAN slices is maintained at or below the first predetermined threshold.

10. The network slice management system of claim 8, wherein the instructions when executed by the one or more processors further cause the network slice management system to:

in response to a request for bandwidth from a second identified RAN slice of the plurality of RAN slices, allocate an initial allotment to the second identified RAN slice, wherein the initial allotment belongs to the first BWS;

determine that the initial allotment is insufficient to achieve predetermined QoS attributes of the second identified RAN slice;

determine that the total bandwidth usage of the first BWS by the RAN slices reaches or exceeds the first predetermined threshold;

determine that the second identified RAN slice is not a qualified RAN slice for additional bandwidth; and in response to the determination that the second identified RAN slice is not a qualified RAN slice for additional bandwidth, reallocate the initial allotment or a portion thereof from the second identified RAN slice, wherein the total bandwidth usage by the second identified RAN slice is less than the bandwidth of the initial allotment.

11. The network slice management system of claim 8, wherein the instructions when executed by the one or more processors further cause the network slice management system to:

maintain a total bandwidth usage of the first band at or below a third predetermined threshold.

12. The network slice management system of claim 11, wherein the instructions when executed by the one or more processors further cause the network slice management system to:

determine that the total bandwidth usage of the first band by the RAN slices reaches or exceeds the third predetermined threshold;

determine that the total bandwidth of the allotments of the first band allocated to the identified RAN slice is insufficient to achieve the predetermined QoS attributes of the identified RAN slice;

in response, assign a second band to the identified RAN slice; and allocate a fourth allotment to the identified RAN slice, wherein the fourth allotment belongs to the second band.

13. The network slice management system of claim 12, wherein the instructions when executed by the one or more processors further cause the network slice management system to:

maintain a total bandwidth usage of the second band at or below a fourth predetermined threshold, wherein the fourth predetermined threshold is the same as the third predetermined threshold.

14. The network slice management system of claim 8, wherein the instructions when executed by the one or more processors further cause the network slice management system to:

assign a first level QoS priority indicator to each one of the plurality of RAN slices; and assign a second level QoS priority indicator to each one of the qualified RAN slices.

* * * * *